US011632480B2

(12) United States Patent
Okuma et al.

(10) Patent No.: US 11,632,480 B2
(45) Date of Patent: Apr. 18, 2023

(54) INFORMATION PROCESSING APPARATUS HAVING OPERATION PANEL THAT HAS DISPLAY FUNCTION AND ACCEPTS OPERATION FROM USER, CONTROL METHOD THEREFOR, AND STORAGE MEDIUM STORING CONTROL

(71) Applicant: CANON KABUSHIKI KAISHA, Tokyo (JP)

(72) Inventors: Satoshi Okuma, Ibaraki (JP); Daisuke Shibata, Ibaraki (JP); Jun Tanaka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/202,713

(22) Filed: Mar. 16, 2021

(65) Prior Publication Data

US 2021/0306489 A1 Sep. 30, 2021

(30) Foreign Application Priority Data

Mar. 27, 2020 (JP) ............................ JP2020-057827
Apr. 6, 2020 (JP) ............................ JP2020-068570
(Continued)

(51) Int. Cl.
*G06F 15/00* (2006.01)
*H04N 1/00* (2006.01)

(52) U.S. Cl.
CPC ..... *H04N 1/00503* (2013.01); *H04N 1/00395* (2013.01); *H04N 1/00411* (2013.01); *H04N 1/00424* (2013.01); *H04N 1/00896* (2013.01)

(58) Field of Classification Search
CPC ........... H04N 1/00503; H04N 1/00395; H04N 1/00411; H04N 1/00424; H04N 1/00896
(Continued)

(56) References Cited

U.S. PATENT DOCUMENTS

2010/0110488 A1* 5/2010 Tsujimoto .............. G03G 21/02 358/1.15

FOREIGN PATENT DOCUMENTS

JP 2006260544 A 9/2006
JP 2015064686 A 4/2015
(Continued)

OTHER PUBLICATIONS

Machine translation of Japanese Patent Application Document No. 2014-256212, Ko et al. Jan. 9, 2019 (related to IDS Document JP6447091) (Year: 2019).*
(Continued)

*Primary Examiner* — Mark R Milia
(74) *Attorney, Agent, or Firm* — Rossi, Kimms & McDowell LLP

(57) ABSTRACT

An information processing apparatus that is capable of managing information about operations preceding start of usage of a function while associating with information about operations performed between the start and end of usage of the function. The information processing apparatus includes an operation panel, a display control unit, and a recording unit. The operation panel has a display function and accepts an operation from a user. The display control unit controls the operation panel so as to display an operation object that causes to execute a predetermined function on a screen of the operation panel. The recording unit records information about events concerning operations performed between start and end of the predetermined function and information about an event preceding the start of the predetermined function into a storage unit while associating them to each other.

21 Claims, 41 Drawing Sheets

(30) Foreign Application Priority Data

| | | | |
|---|---|---|---|
| Apr. 6, 2020 | (JP) | ............................ | JP2020-068571 |
| May 29, 2020 | (JP) | ............................ | JP2020-094418 |
| Jul. 20, 2020 | (JP) | ............................ | JP2020-123847 |
| Jan. 15, 2021 | (JP) | ............................ | JP2021-005020 |

(58) Field of Classification Search
USPC ........................................................ 358/1.13
See application file for complete search history.

(56) References Cited

FOREIGN PATENT DOCUMENTS

| | | | |
|---|---|---|---|
| JP | 6447091 | B2 | 1/2019 |
| JP | 2019038142 | A | 3/2019 |

OTHER PUBLICATIONS

Machine translation of Japanese Patent Application Document No. 2013-197437, Nakatani et al. Apr. 9, 2015 (related to IDS Document JP2015-064686) (Year: 2015).*
Machine translation of Japanese Patent Application Document No. 2006-041662, Baba Ritsu, Sep. 28, 2009 (related to IDS Document JP2006-260544) (Year: 2006).*

* cited by examiner

FIG. 7

| | Collection (601) | Event Name (602) | Description | Basic System (603) | Operation Analysis System (604) |
|---|---|---|---|---|---|
| 605 | Power | DevicePowerOn | Power ON of Device | ○ | ○ |
| | | DeviceSleepStarted | Shift to Sleep State | ○ | ○ |
| | | DeviceSleepReverted | Reverting from Sleep State | ○ | ○ |
| | | DevicePowerOff | Power OFF of Device | ○ | ○ |
| 606 | Counter | CounterSnapshotted | List of Charge Counter | ○ | ○ |
| | | PartsCounterSnapshotted | List of Parts Counter | ○ | ○ |
| 607 | Alarm | ErrorOccurred | Occasion of Error | ○ | ○ |
| | | AlarmOccurred | アラームの発生 | ○ | ○ |
| 608 | Job | JobStarted | Entry of Job | ○ | ○ |
| | | JobCompleted | Completion of Job | ○ | ○ |
| | | JobExecuting | Execution of Job | ○ | ○ |
| 609 | User Operation | UserOperated | User Operation | | ○ |
| | | UserOperatedInSession | User Operations in Session Unit | | ○ |
| | | UserOperatedInJob | User Operations in Job Execution Unit | | ○ |
| | | DisplayChangeTriggerOccurred | Occasion of Display Change Trigger | | ○ |
| | | SettingsSnapshottedAtTransition | Set Value at Screen Transition | | ○ |

FIG. 8A 7001 7002 7003 7004 7005

| No | Event Name | Event Additional Information | | | | Content |
|---|---|---|---|---|---|---|
| | | Generation Time | User Name | Target | Parameter | |
| 1 | JobStarted | 10:00:25 | Tanaka | ScanInPrintOut | – | Job Entry |
| 2 | JobExecuting | 10:00:26 | Tanaka | ScanInPrintOut | – | Start of Job Execution |
| 3 | JobCompleted | 10:00:40 | Tanaka | ScanInPrintOut | Success | Job Completion |
| 4 | JobStarted | 10:30:10 | Yamada | Print | – | Job Entry (Print) |
| 5 | JobExecuting | 10:30:11 | Yamada | Print | – | Start of Job Execution (Print) |
| 6 | JobCompleted | 10:30:15 | Yamada | Print | Success | Job Completion (Print) |
| 7 | JobStarted | 10:30:43 | Tanaka | ScanInNetworkOut | – | Job Entry |
| 8 | JobExecuting | 10:30:44 | Tanaka | ScanInNetworkOut | – | Start of Job Execution |
| 9 | JobCompleted | 10:30:55 | Tanaka | ScanInNetworkOut | Success | Job Completion |

FIG. 8B 7101 7102 7103 7104 7105 7106 7107 7108

| No | Event Name | Event Additional Information | | | | | | | Content |
|---|---|---|---|---|---|---|---|---|---|
| | | Generation Time | Session ID | Job ID | Operation Content | User Name | Target | Parameter | |
| 1 | UserOperated | 10:00:00 | - | - | ButtonSelected | - | LoginButton | LoginDialog | Selection of Login Button |
| 2 | UserOperatedInSession | 10:00:01 | A001 | - | Login | Tanaka | - | - | Login |
| 3 | DisplayChangeTriggerOccurred | 10:00:05 | A001 | - | ADFPaperSet | Tanaka | SmartButtonShift | MainMenu | Setting of Document on ADF |
| 4 | UserOperatedInSession | 10:00:07 | A001 | - | ButtonSelected | Tanaka | CopyButton | MainMenu | Selection of Copy Button |
| 5 | SettingsSnapshottedAtTransition | 10:00:08 | A001 | 0001 | DisplayTransition | Tanaka | Copy | (Set Value) | Saving of Set Value at Screen Transition |
| 6 | UserOperatedInJob | 10:00:15 | A001 | 0001 | ButtonSelected | Tanaka | TwoSidePrintButton | CopySettings | Selection of Double-sided Setting Button |
| 7 | UserOperatedInJob | 10:00:17 | A001 | 0001 | ButtonSelected | Tanaka | TwoSideButton | TwoSideSettings | Selection of Double-sided Button |
| 8 | UserOperatedInJob | 10:00:19 | A001 | 0001 | ButtonSelected | Tanaka | OkButton | TwoSideSettings | Selection of OK Button |
| 9 | UserOperatedInJob | 10:00:23 | A001 | 0001 | KeySelected | Tanaka | StartKey | CopySettings | Selection of Start Key |
| 10 | SettingsSnapshottedAtTransition | 10:00:24 | A001 | 0001 | JobStart | Tanaka | Copy | (Set Value) | Saving of Set Value at Job Execution |
| 11 | JobStarted | 10:00:25 | - | - | - | Tanaka | ScanInPrintOut | - | Job Entry |
| 12 | JobExecuting | 10:00:26 | - | - | - | Tanaka | ScanInPrintOut | - | Start of Job Execution |
| 13 | JobCompleted | 10:00:40 | - | - | - | Tanaka | ScanInPrintOut | Success | Job Completion |
| 14 | UserOperatedInSession | 10:00:42 | A001 | - | KeySelected | Tanaka | LogoutKey | - | Selection of Logout Key |
| 15 | UserOperatedInSession | 10:00:43 | A001 | - | Logout | Tanaka | - | - | Logout |
| 16 | UserOperated | 10:10:00 | - | - | ButtonSelected | - | LoginButton | LoginDialog | Selection of Login Button |
| 17 | UserOperatedInSession | 10:10:01 | B002 | - | Login | Suzuki | - | - | Login |
| 18 | UserOperatedInSession | 10:10:03 | B002 | - | ButtonSelected | Suzuki | NextPageButton | MainMenu | Page Transition |
| 19 | UserOperatedInSession | 10:10:20 | B002 | - | KeySelected | Suzuki | LogoutKey | - | Selection of Logout Key |
| 20 | UserOperatedInSession | 10:10:21 | B002 | - | Logout | Suzuki | - | - | Logout |
| 21 | UserOperated | 10:30:00 | - | - | ButtonSelected | - | LoginButton | LoginDialog | Selection of Login Button |
| 22 | UserOperatedInSession | 10:30:01 | C003 | - | Login | Tanaka | - | - | Login |
| 23 | JobStarted | 10:30:02 | - | - | - | Yamada | Print | - | Job Entry (Print) |
| 24 | JobExecuting | 10:30:03 | - | - | - | Yamada | Print | - | Start of Job Execution (Print) |
| 25 | JobCompleted | 10:30:10 | - | - | - | Yamada | Print | Success | Job Completion (Print) |
| 26 | DisplayChangeTriggerOccurred | 10:30:15 | C003 | - | ADFPaperSet | Tanaka | SmartButtonShift | MainMenu | Setting of Document on ADF |
| 27 | UserOperatedInSession | 10:30:17 | C003 | - | ButtonSelected | Tanaka | NextPageButton | MainMenu | Transition to Next Page |
| 28 | UserOperatedInSession | 10:30:25 | C003 | - | ButtonSelected | Tanaka | PreviousPageButton | MainMenu | Transition to Previous Page |
| 29 | UserOperatedInSession | 10:30:27 | C003 | - | ButtonSelected | Tanaka | SendButton | MainMenu | Selection of Send Button |
| 30 | SettingsSnapshottedAtTransition | 10:30:28 | C003 | 0002 | DisplayTransition | Tanaka | Send | (Set Value) | Saving of Set Value at Screen Transition |
| 31 | UserOperated | 10:30:30 | - | - | RemoteLogin | Sato | - | - | Remote Login |
| 32 | UserOperatedInJob | 10:30:35 | C003 | 0002 | ButtonSelected | Tanaka | Address1Button | SendSettings | Selection of First Destination Button |
| 33 | UserOperatedInJob | 10:30:40 | C003 | 0002 | KeySelected | Tanaka | StartKey | SendSettings | Selection of Start Key |
| 34 | SettingsSnapshottedAtTransition | 10:30:41 | C003 | 0002 | JobStart | Tanaka | Send | (Set Value) | Saving of Set Value at Job Execution |
| 35 | UserOperated | 10:30:42 | - | - | RemoteLogout | Sato | - | - | Remote Logout |
| 36 | JobStarted | 10:30:43 | - | - | - | Tanaka | ScanInNetworkOut | - | Job Entry |
| 37 | JobExecuting | 10:30:44 | - | - | - | Tanaka | ScanInNetworkOut | - | Start of Job Execution |
| 38 | JobCompleted | 10:30:55 | - | - | - | Tanaka | ScanInNetworkOut | Success | Job Completion |
| 39 | UserOperatedInSession | 10:31:00 | C003 | - | KeySelected | Tanaka | LogoutKey | - | Selection of Logout Key |
| 40 | UserOperatedInSession | 10:31:01 | C003 | - | Logout | Tanaka | - | - | Logout |

```
<?xml version="1.0" encoding="UTF-8" ?>
<Fn Type="Copy"">
   <El id="COLOR_MODE">
      <It id="COLOR_MODE">BLACK_AND_WHITE</It>
   </El>
   <El id="COPIES">
      <It id="COPIES">1</It>
   </El>
   <El id="TWO_SIDED_ORIGINAL">
      <It id="TWO_SIDED_ORIGINAL">TRUE</It>
   </El>
   <El id="TWO_SIDED_PRINT">
      <It id="TWO_SIDED_PRINT">TRUE</It>
   </El>
   <El id="DOCUMENT_SIZE">
      <It id="DOCUMENT_SIZE">AUTO
      <It id="AUTO_DOCUMENT
   </El>
```

1502C

```
<?xml version="1.0" encoding="UTF-8" ?>
<Fn Type="Copy"">
   <El id="COLOR_MODE">
      <It id="COLOR_MODE">BLACK_AND_WHITE</It>
   </El>
   <El id="COPIES">
      <It id="COPIES">10</It>
   </El>
   <El id="TWO_SIDED_ORIGINAL">
      <It id="TWO_SIDED_ORIGINAL">TRUE</It>
   </El>
   <El id="TWO_SIDED_PRINT">
      <It id="TWO_SIDED_PRINT">TRUE</It>
   </El>
   <El id="DOCUMENT_SIZE">
      <It id="DOCUMENT_SIZE">A4
      <It id="AUTO_DOCUMENT
   </El>
```

| No | Event Name | Event/Additional Information | | | | | | | Content |
|---|---|---|---|---|---|---|---|---|---|
| | | Generation Time | Session ID | Job ID | Operation Content | User Name | Target | Parameter | |
| 1 | UserOperated | 9:00:00 | - | - | ButtonSelected | - | LoginButton | LoginDialog | Selection of Login Button |
| 2 | UserOperatedInSession | 9:00:01 | A001 | - | Login | Tanaka | - | - | Login |
| 3 | DisplayChangeTriggerOccurred | 9:00:05 | A001 | - | ADFPaperSet | Tanaka | SmartButtonShift | MainMenu | Setting of Document on ADF |
| 4 | UserOperatedInSession | 9:00:07 | A001 | - | ButtonSelected | Tanaka | CopyButton | MainMenu | Selection of Copy Button |
| 5 | SettingsSnapshottedAtTransition | 9:00:08 | A001 | 0001 | DisplayTransition | Tanaka | Copy | (Set Value) | Saving of Set Value at Screen Transition |
| 6 | UserOperatedInJob | 9:00:23 | A001 | 0001 | KeySelected | Tanaka | StartKey | CopySettings | Selection of Start Key |
| 7 | SettingsSnapshottedAtTransition | 9:00:24 | A001 | 0001 | JobStart | Tanaka | Copy | (Set Value) | Saving of Set Value at Job Execution |
| 8 | JobStarted | 9:00:25 | - | - | - | Tanaka | ScanInPrintOut | - | Job Entry |
| 9 | JobExecuting | 9:00:26 | - | - | - | Tanaka | ScanInPrintOut | - | Start of Job Execution |
| 10 | JobCompleted | 9:00:40 | - | - | - | Tanaka | ScanInPrintOut | Success | Job Completion |
| 11 | UserOperatedInSession | 9:01:03 | A002 | - | ButtonSelected | Tanaka | NextPageButton | MainMenu | Page Transition |
| 12 | DisplayChangeTriggerOccurred | 9:01:15 | A002 | - | ADFPaperSet | Tanaka | SmartButtonShift | MainMenu | Setting of Document on ADF |
| 13 | UserOperatedInSession | 9:01:27 | A002 | - | ButtonSelected | Tanaka | SendButton | MainMenu | Selection of Send Button |
| 14 | SettingsSnapshottedAtTransition | 9:01:28 | A002 | 0002 | DisplayTransition | Tanaka | Send | (Set Value) | Saving of Set Value at Screen Transition |
| 15 | UserOperatedInJob | 9:01:35 | A002 | 0002 | ButtonSelected | Tanaka | Address1Button | SendSettings | Selection of First Destination Button |
| 16 | UserOperatedInJob | 9:01:40 | A002 | 0002 | KeySelected | Tanaka | StartKey | SendSettings | Selection of Start Key |
| 17 | SettingsSnapshottedAtTransition | 9:01:41 | A002 | 0002 | JobStart | Tanaka | Send | (Set Value) | Saving of Set Value at Job Execution |
| 18 | JobStarted | 9:01:43 | - | - | - | Tanaka | ScanInNetworkOut | - | Job Entry |
| 19 | JobExecuting | 9:01:44 | - | - | - | Tanaka | ScanInNetworkOut | - | Start of Job Execution |
| 20 | JobCompleted | 9:01:55 | - | - | - | Tanaka | ScanInNetworkOut | Success | Job Completion |
| 21 | UserOperatedInSession | 9:02:00 | A003 | - | KeySelected | Tanaka | LogoutKey | - | Selection of Logout Key |
| 22 | UserOperatedInSession | 9:02:01 | A003 | - | Logout | Tanaka | - | - | Logout |

FIG. 19

| No | Event Name (7101B) | Event Additional Information | | | | | | | Content |
|---|---|---|---|---|---|---|---|---|---|
| | | Generation Time (7102B) | Session ID (7103B) | Job ID (7104B) | Operation Content (7105B) | User Name (7106B) | Target (7107B) | Parameter (7108B) | |
| 1 | UserOperated | 11:00:00 | - | - | ButtonSelected | - | SleepKey | Revert | Selection of Sleep Button |
| 2 | DeviceSleepReverted | 11:00:01 | - | - | - | - | DeviceStatus | SleepReverted | Reversion of Device from Sleep |
| 3 | UserOperatedInSession | 11:00:01 | G001 | - | OperationStart | - | - | - | Start of Operation |
| 4 | DisplayChangeTriggerOccurred | 11:00:05 | G001 | - | ADFPaperSet | - | SmartButtonShift | MainMenu | Setting of Document on ADFv |
| 5 | UserOperatedInSession | 11:00:07 | G001 | - | ButtonSelected | - | CopyButton | MainMenu | Selection of Copy Button |
| 6 | SettingsSnapshottedAtTransition | 11:00:08 | G001 | 0001 | DisplayTransition | - | Copy | (Set Value) | Saving of Set Value at Screen Transition |
| 7 | UserOperatedInJob | 11:00:23 | G001 | 0001 | KeySelected | - | StartKey | CopySettings | Selection of Start Key |
| 8 | SettingsSnapshottedAtTransition | 11:00:24 | G001 | 0001 | JobStart | - | Copy | (Set Value) | Saving of Set Value at Job Execution |
| 9 | JobStarted | 11:00:25 | - | - | - | - | ScanInPrintOut | - | Job Entry |
| 10 | JobExecuting | 11:00:26 | - | - | - | - | ScanInPrintOut | - | Start of Job Execution |
| 11 | JobCompleted | 11:00:35 | - | - | - | - | ScanInPrintOut | Success | Job Completion |
| 12 | UserOperated | 11:00:40 | - | - | ButtonSelected | - | SleepKey | Sleep | Selection of Sleep Button |
| 13 | UserOperatedInSession | 11:00:41 | G001 | - | OperationEnd | - | - | - | Completion of Operation |
| 14 | DeviceSleepStarted | 11:00:42 | - | - | - | - | DeviceStatus | Sleep | Transition of Device into Sleep |

FIG. 25

| | 1401D Collection | 1402D Event Name | Description | 1403D Basic System | 1404D Operation Analysis System |
|---|---|---|---|---|---|
| 1405D | Power | DevicePowerOn | Power ON of Device | ○ | ○ |
| | | DeviceSleepStarted | Shift to Sleep State | ○ | ○ |
| | | DeviceSleepReverted | Reverting from Sleep State | ○ | ○ |
| | | DevicePowerOff | Power OFF of Device | ○ | ○ |
| 1406D | Counter | CounterSnapshotted | List of Charge Counter | ○ | ○ |
| | | PartsCounterSnapshotted | List of Parts Counter | ○ | ○ |
| 1407D | Alarm | ErrorOccurred | Occasion of Error | ○ | ○ |
| | | AlarmOccurred | アラームの発生 | ○ | ○ |
| 1408D | Job | JobStarted | Entry of Job | ○ | ○ |
| | | JobCompleted | Completion of Job | ○ | ○ |
| | | JobExecuting | Execution of Job | ○ | ○ |
| 1409D | User Operation | UserOperated | User Operation | | ○ |
| | | UserOperatedInSession | User Operations in Session Unit | | ○ |
| | | UserOperatedInJob | User Operations in Job Execution Unit | | ○ |
| | | DisplayChangeTriggerOccurred | Occasion of Display Change Trigger | | ○ |
| | | SettingsSnapshottedAtTransition | Set Value at Screen Transition | | ○ |
| 1410D | User Operation Display ChangeDetail | UserOperated | User Operation | | ○ |
| | | UserOperatedInSession | User Operations in Session Unit | | ○ |
| | | UserOperatedInJob | User Operations in Job Execution Unit | | ○ |
| | | DisplayChangeTriggerOccurredDetail | Details of Occurred Display Change Trigger | | ○ |
| | | SettingsSnapshottedAtTransition | Set Value at Screen Transition | | ○ |

FIG. 26

| No (1501) | Event Name | Event Additional Information | | | | | | | | Content |
|---|---|---|---|---|---|---|---|---|---|---|
| | | Generation Time (1502) | Session ID (1503) | Job ID (1504) | Operation Content (1505) | User Name (1506) | Target (1507) | First Parameter (1508) | Second Parameter (1509) | |
| 1 | UserOperated | 10:00:00 | - | - | ButtonSelected | - | LoginButton | LoginDialog | | Selection of Login Button |
| 2 | UserOperatedInSession | 10:00:01 | A001 | - | Login | Tanaka | - | - | | Login |
| 3 | DisplayChangeTriggerOccurredDetail | 10:00:05 | A001 | - | ADFPaperSet | Tanaka | SmartButtonShift | MainMenu | (Detailed Information about Display Change) | Setting of Document on ADF |
| 4 | UserOperatedInSession | 10:00:07 | A001 | - | ButtonSelected | Tanaka | CopyButton | MainMenu | | Selection of Copy Button |
| 5 | SettingsSnapshottedAtTransition | 10:00:08 | A001 | 0001 | DisplayTransition | Tanaka | Copy | (Set Value) | | Saving of Set Value at Screen Transition |
| 6 | UserOperatedInJob | 10:00:15 | A001 | 0001 | ButtonSelected | Tanaka | TwoSidePrintButton | CopySettings | | Selection of Double-sided Setting Button |
| 7 | UserOperatedInJob | 10:00:17 | A001 | 0001 | ButtonSelected | Tanaka | TwoSideButton | TwoSideSettings | | Selection of Double-sided Button |
| 8 | UserOperatedInJob | 10:00:19 | A001 | 0001 | ButtonSelected | Tanaka | OkButton | TwoSideSettings | | Selection of OK Button |
| 9 | UserOperatedInJob | 10:00:23 | A001 | 0001 | KeySelected | Tanaka | StartKey | CopySettings | | Selection of Start Key |
| 10 | SettingsSnapshottedAtTransition | 10:00:24 | A001 | 0001 | JobStart | Tanaka | Copy | (Set Value) | | Saving of Set Value at Job Execution |
| 11 | JobStarted | 10:00:25 | - | - | - | Tanaka | ScanInPrintOut | - | | Job Entry |
| 12 | JobExecuting | 10:00:26 | - | - | - | Tanaka | ScanInPrintOut | - | | Start of Job Execution |
| 13 | JobCompleted | 10:00:40 | - | - | - | Tanaka | ScanInPrintOut | Success | | Job Completion |
| 14 | UserOperatedInSession | 10:00:42 | A001 | - | KeySelected | Tanaka | LogoutKey | - | | Selection of Logout Key |
| 15 | UserOperatedInSession | 10:00:43 | A001 | - | Logout | Tanaka | - | - | | Logout |

| Page | Order | ButtonID | |
|---|---|---|---|
| | | Previous | After |
| 1 | 1 | Print | Copy |
| 1 | 2 | Copy | Send to Oneself |
| 1 | 3 | Send to Oneself | Send |
| 2 | 1 | Send | Fax |
| 2 | 2 | Print Received Document | Print |
| 2 | 3 | Fax | Print Received Document |

FIG. 31

| | Collection (1401X) | Event Name (1402X) | Description | Basic System (1403X) | Operation Analysis System (1404X) |
|---|---|---|---|---|---|
| 1405X | Power | DevicePowerOn | Power ON of Device | ○ | ○ |
| | | DeviceSleepStarted | Shift to Sleep State | ○ | ○ |
| | | DeviceSleepReverted | Reverting from Sleep State | ○ | ○ |
| | | DevicePowerOff | Power OFF of Device | ○ | ○ |
| 1406X | Counter | CounterSnapshotted | List of Charge Counter | ○ | ○ |
| | | PartsCounterSnapshotted | List of Parts Counter | ○ | ○ |
| 1407X | Alarm | ErrorOccurred | Occasion of Error | ○ | ○ |
| | | AlarmOccurred | アラームの発生 | ○ | ○ |
| 1408X | Job | JobStarted | Entry of Job | ○ | ○ |
| | | JobCompleted | Completion of Job | ○ | ○ |
| | | JobExecuting | Execution of Job | ○ | ○ |
| 1409X | UserOperation | UserOperated | User Operation | | ○ |
| | | UserOperatedInSession | User Operations in Session Unit | | ○ |
| | | UserOperatedInJob | User Operations in Job Execution Unit | | ○ |
| | | DisplayChangeTriggerOccurred | Occasion of Display Change Trigger | | ○ |
| | | SettingsSnapshottedAtTransition | Set Value at Screen Transition | | ○ |
| 1410X | UserOperationHardware | UserOperated | User Operation | | ○ |
| | | UserOperatedHardware | User Operation to Hardware | | ○ |

| No | Event Name | Event Additional Information | | | | | | | | Content |
|---|---|---|---|---|---|---|---|---|---|---|
| | | Generation Time | Session ID | Job ID | Operation Content | User Name | Target | First Parameter | Second Parameter | |
| 1 | UserOperatedHardware | 9:59:59 | - | - | Touchdown | - | TouchPanel1 | 250, 200 | HD0001 | Press of Touch Panel |
| 2 | UserOperatedHardware | 9:59:59 | - | - | TouchUp | - | TouchPanel1 | 250, 201 | HD0002 | Lift-up from Touch Panel |
| 3 | UserOperated | 10:00:00 | - | - | ButtonSelected | - | LoginButton | LoginDialog | HD0001, HD0002 | Selection of Login Button |
| 4 | UserOperated | 10:00:01 | | - | Login | Tanaka | - | - | - | Login |
| 5 | UserOperatedHardware | 10:00:05 | - | - | Touchdown | - | TouchPanel1 | 240, 180 | HD0003 | Press of Touch Panel |
| 6 | UserOperatedHardware | 10:00:06 | - | - | TouchUp | - | TouchPanel1 | 240, 180 | HD0004 | Lift-up from Touch Panel |
| 7 | UserOperated | 10:00:07 | | - | ButtonSelected | Tanaka | CopyButton | MainMenu | HD0003, HD0004 | Selection of Copy Button |
| 8 | UserOperatedHardware | 10:00:14 | - | - | Touchdown | - | TouchPanel1 | 180, 220 | HD0005 | Press of Touch Panel |
| 9 | UserOperatedHardware | 10:00:14 | - | - | TouchUp | - | TouchPanel1 | 180, 221 | HD0006 | Lift-up from Touch Panel |
| 10 | UserOperated | 10:00:15 | | | ButtonSelected | Tanaka | TwoSidePrintButton | CopySettings | HD0005, HD0006 | Selection of Double-sided Setting Button |
| 11 | UserOperatedHardware | 10:00:16 | - | - | Touchdown | - | TouchPanel1 | 100, 150 | HD0007 | Press of Touch Panel |
| 12 | UserOperatedHardware | 10:00:16 | - | - | TouchUp | - | TouchPanel1 | 100, 150 | HD0008 | Lift-up from Touch Panel |
| 13 | UserOperated | 10:00:17 | | | ButtonSelected | Tanaka | TwoSideButton | TwoSideSettings | HD0007, HD0008 | Selection of Double-sided Button |
| 14 | UserOperatedHardware | 10:00:18 | - | - | Touchdown | - | TouchPanel1 | 410, 280 | HD0009 | Press of Touch Panel |
| 15 | UserOperatedHardware | 10:00:18 | - | - | TouchUp | - | TouchPanel1 | 409, 280 | HD0010 | Lift-up from Touch Panel |
| 16 | UserOperated | 10:00:19 | | | ButtonSelected | Tanaka | OkButton | TwoSideSettings | HD0009, HD0010 | Selection of OK Button |
| 17 | UserOperatedHardware | 10:00:22 | - | - | KeyDown | - | StartKey | - | HD0011 | Press of Hard Key |
| 18 | UserOperatedHardware | 10:00:22 | - | - | KeyUp | - | StartKey | - | HD0012 | Lift-up from Hard Key |
| 19 | UserOperated | 10:00:23 | | | KeySelected | Tanaka | StartKey | CopySettings | HD0011, HD0012 | Selection of Start Key |
| 20 | UserOperatedHardware | 10:00:19 | - | - | KeyDown | - | IDKey | - | HD0013 | Press of Hard Key |
| 21 | UserOperatedHardware | 10:00:19 | - | - | KeyUp | - | IDKey | - | HD0014 | Lift-up from Hard Key |
| 22 | UserOperated | 10:10:20 | | - | KeySelected | Tanaka | LogoutKey | - | HD0011, HD0012 | Selection of Logout Key |
| 23 | UserOperated | 10:10:21 | | - | Logout | Tanaka | - | - | - | Logout |

INFORMATION PROCESSING APPARATUS HAVING OPERATION PANEL THAT HAS DISPLAY FUNCTION AND ACCEPTS OPERATION FROM USER, CONTROL METHOD THEREFOR, AND STORAGE MEDIUM STORING CONTROL

BACKGROUND OF THE INVENTION

Field of the Invention

The present invention relates to an information processing apparatus having an operation panel that has a display function and accepts an operation from a user, a control method therefor, and a storage medium storing a control program therefor.

Description of the Related Art

There is a known information processing apparatus that receives various operations through a user interface displayed on a touch panel etc. At a development site of such a user interface, operation logs collected from past products are analyzed and an analysis result is utilized in order to provide better operability to a user. Related techniques are proposed by Japanese Laid-Open Patent Publication (Kokai) No. 2015-64686 (JP 2015-64686A) and Japanese Patent No. 6447091 (JP 6447091B). JP 2015-64686A discloses a technique that specifies an operation type and duration of each of a series of user operations performed until executing a job for each job, stores them as a log, and specifies a part that can be substituted with an alternative user operation that uses an operation assistant function. Moreover, JP 6447091B discloses a technique that displays a function relevant to an operation like a document setting performed to an image forming apparatus at a head of a functional list display.

Moreover, there is a method of changing a screen layout dynamically as a method of improving operability of a touch panel. Japanese Laid-Open Patent Publication (Kokai) No. 2006-260544 (JP 2006-260544A) proposes a related technique. The technique of JP 2006-260544A simplifies allocation of keys to various functions and registration of macros and enables to display indices like shortcut keys corresponding to the registered functions concerned at a desired timing.

As a technique of utilizing an analysis result of an operation log, a system that enables analysis of contents of an operation history of a WEB application by transmitting the operation history to a server is disclosed in Japanese Laid-Open Patent Publication (Kokai) No. 2019-38142 (JP 2019-38142A), for example.

Incidentally, there are various types of operation histories, such as a history of a direct operation to hardware like a touch panel, a history of an operation of a software button displayed on a screen, and a history of an operation that means what is performed as a result of an operation of a button. A type and degree of a history used in analysis depend on analysis contents. Then, the analysis contents depend on a period and an environment. It can be considered to record the operation histories of all the types and to transmit the recorded operation histories of all the types to a server so as to deal with the variation of the analysis contents.

However, the technique of JP 2015-64686A cannot analyze the operation log in consideration of information about user operations performed before pressing an icon. When a user operates a function using a touch panel etc., a user action may be affected by a factor preceding the operation of the function. For example, when a set content preset to an icon for calling a function is displayed, an action of a user who visually confirms the displayed content may be affected. Accordingly, it is preferable to analyze an operation log in consideration of information about a user operation that is performed before using the function. The technique of JP 6447091B also does not consider this point.

In the meantime, the technique of JP 2006-260544A has a space for improvement from a viewpoint of improvement in operability. For example, a dynamic change of a screen layout of a touch panel may cause an operation mistake during a screen operation by a user, which may degrade operability of the touch panel. Accordingly, when analyzing past operation logs, it is preferable to properly analyze or evaluate a process of a dynamic change of a screen layout and a changed result. For example, when a shortcut key is generated, the technique of JP 2006-260544A is difficult to determine whether the shortcut key is generated in response to a user operation or is generated automatically.

Moreover, if the operation histories of all the types are recorded by using the technique of JP 2019-38142A and the recorded operation histories of all the types are transmitted to the server, the data volume to be processed will become huge, which causes adverse effects, such as increase of the power consumption of the apparatus, degradation of the life of the apparatus, and pressure of a network communication band. In order to reduce occurrence of such adverse effects, a mechanism that can appropriately collect the desired operation histories is desired strongly.

Moreover, user actions may not be analyzed in detail on the basis of an operation log of a series of user operations performed after pressing the icon until execution of the job. For example, when setting of double-sided printing is preset to an icon for calling a copy function, and when a user who selected this icon changes the setting into single-sided printing from the double-sided printing, the technique of JP 2015-64686A cannot analyze whether the setting is changed into the single-sided printing from another setting. It is preferable that an operation log be analyzed by considering settings preset at a time of starting to use a function in a viewpoint of providing better operability to a user. The technique of JP 2006-260544A also does not consider this point.

SUMMARY OF THE INVENTION

A first aspect of the present invention provides an information processing apparatus that is capable of managing information about operations preceding start of usage of a function while associating with information about operations performed between the start and end of usage of the function.

A second aspect of the present invention provides an information processing apparatus that is capable of managing information about a change factor of a screen layout while associating with an operation history on a screen of which layout has been changed dynamically.

A third aspect of the present invention provides an information processing apparatus that is capable of changing an item of an operation history to be collected.

A fourth aspect of the present invention provides an information processing apparatus that is capable of managing setting information preset to a function while associating with an operation history between the start and end of usage of the function.

Accordingly, the first aspect of the present invention provides an information processing apparatus including an operation panel configured to have a display function and to accept an operation from a user, a display control unit configured to control the operation panel so as to display an operation object that causes to execute a predetermined function on a screen of the operation panel, and a recording unit configured to record information about events concerning operations performed between start and end of the predetermined function and information about an event preceding the start of the predetermined function into a storage unit while associating them to each other.

Accordingly, the second aspect of the present invention provides an information processing apparatus including an operation panel configured to have a display function and to accept an operation from a user, a display control unit configured to arrange a predetermined operation object dynamically on a screen of the operation panel in response to occurrence of a predetermined event, and a recording unit configured to record information about the predetermined event and history information about operations to the predetermined operation object into a storage unit while associating them to each other.

Accordingly, the third aspect of the present invention provides an information processing apparatus including an operation panel configured to have a display function and to accept an operation from a user, an acceptance unit configured to accept a designation of information to collect operations to the operation panel as history information, and an output unit configured to output the information collected according to the designation.

Accordingly, the fourth aspect of the present invention provides an information processing apparatus including an operation panel configured to have a display function and to accept an operation from a user, a display control unit configured to control the operation panel so as to display a predetermined operation object that causes to execute a predetermined function to which a predetermined setting is preset on a screen of the operation panel, and a recording unit configured to record information about events concerning operations performed between start and end of the predetermined function and information about a predetermined setting preset at a time of the start of the predetermined function into a storage unit while associating them to each other.

According the first aspect of the present invention, information about operations preceding start of usage of a function can be managed while associating with information about operations performed between the start and end of usage of the function.

According to the second aspect of the present invention, information about a change factor of a screen layout can be managed while associating with an operation history on a screen of which layout has been changed dynamically.

According to the third aspect of the present invention, an item of an operation history to be collected can be changed.

According to the fourth aspect of the present invention, setting information preset to a function can be managed while associating with an operation history between the start and end of usage of the function.

Further features of the present invention will become apparent from the following description of exemplary embodiments with reference to the attached drawings.

BRIEF DESCRIPTION OF THE DRAWINGS

FIG. 7 is a view showing examples of events that the MFP of the first embodiment transmits to a server.

FIG. 8A is a view showing an example of an event log in the basic system that is a premise of the first embodiment.

FIG. 8B is a view showing an example of an event log in the system of the first embodiment.

FIG. 12B is a view showing a part of set values obtained for each screen.

FIG. 16 is a view showing an example of an event log in a system of a second embodiment.

FIG. 19 is a view showing an example of an event log in a system of a third embodiment.

FIG. 25 is a view showing examples of events that an MFP of a sixth embodiment transmits to the server.

FIG. 26 is a view showing an example of an event log in a system of the sixth embodiment.

FIG. 27 is a view showing an example of detailed information about screen change in the sixth embodiment.

FIG. 31 is a view showing examples of events that an MFP of an eighth embodiment transmits to a server.

FIG. 32 is a view showing an example of an event log in a system of the eighth embodiment.

DESCRIPTION OF THE EMBODIMENTS

Figure 1:
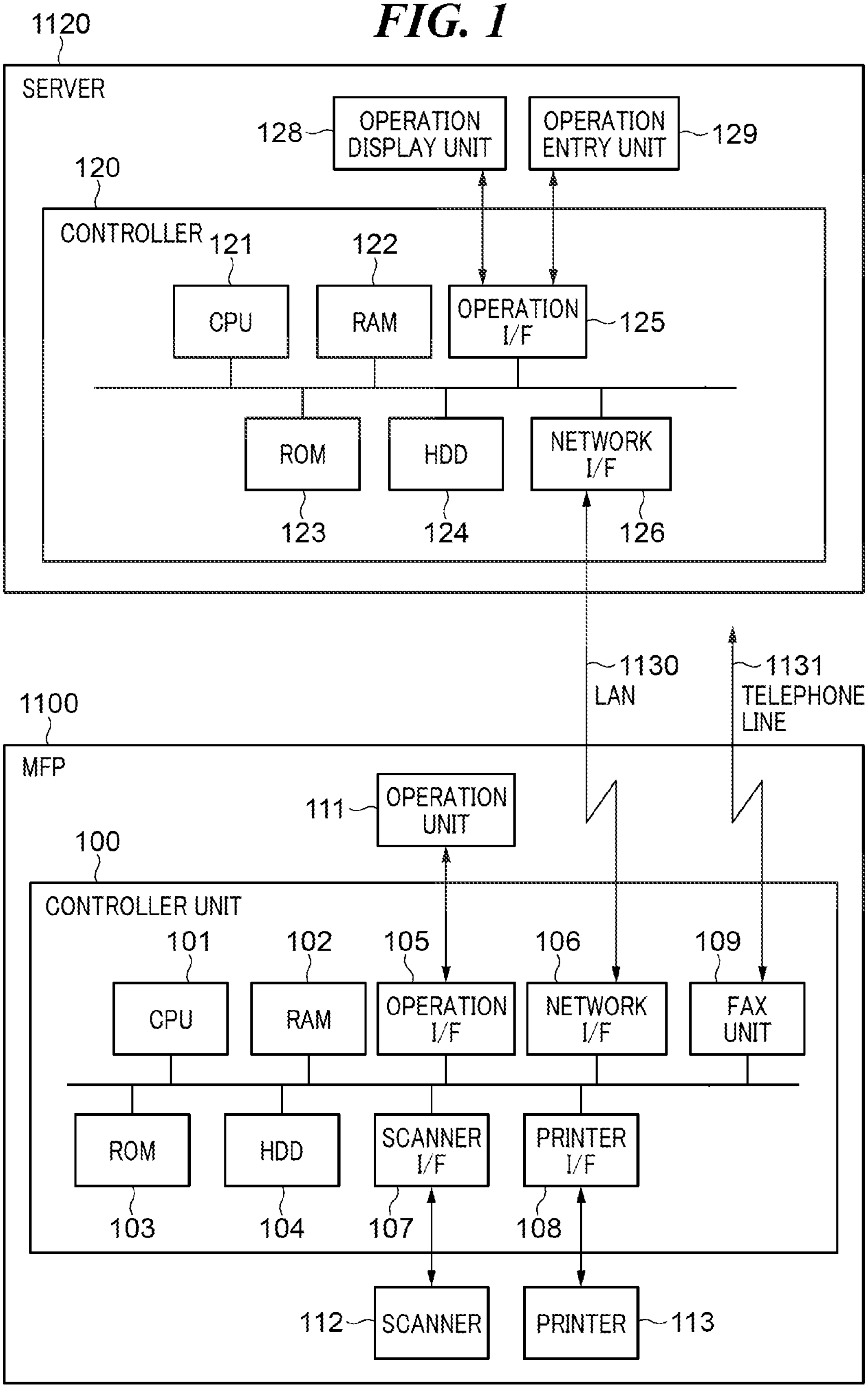
FIG. 1 is a block diagram schematically showing a configuration of an entire system including an MFP as an information processing apparatus according to a first embodiment of the present invention.

Hereafter, embodiments according to the present invention will be described in detail by referring to the drawings. Configurations described in the following embodiments are mere examples, and the scope of the present invention is not limited by the configurations described in the embodiments.

Hereinafter, a first embodiment will be described by referring to the drawings. FIG. 1 is a block diagram showing an example of an entire system. In the example of FIG. 1, the system includes an MFP 1100 and a server 1120. The MFP 1100 as an information processing apparatus has a copy function, a print function, etc. The information processing apparatus may be an optional apparatus other than an image forming apparatus, such as an MFP. The MFP 1100 is connected to the server 1120 through a network like a LAN 1130. In the MFP 1100, a scanner 112, a printer 113, an operation unit 111, and the LAN 1130 are connected to the controller unit 100.

The controller unit 100 has a CPU 101 that runs various control programs. The CPU 101 activates the MFP 1100 on the basis of a boot program stored in a ROM 103. Moreover, the CPU 101 reads a control program stored in an HDD 104 and executes a predetermined process using the RAM 102 as a work area. The various control programs that achieve the copy function, print function, etc. are stored in the HDD 104. Scan data read by the scanner 112 is stored in the HDD 104. An operation I/F 105 controls input and output of data of the operation unit 111. A process of each embodiment is achieved because the CPU 101 runs a control program. The CPU 101 corresponds to a display control unit.

A network I/F (interface) 106 is connected to the LAN 1130 and controls information communication through the LAN 1130. A scanner I/F 107 receives image data from the scanner 112, outputs and inputs control data that controls the scanner 112. A printer I/F 108 outputs image data to the printer 113, outputs and inputs control data that controls the printer 113. A FAX unit 109 transmits and receives facsimile data through a telephone line 1131.

The operation unit 111 has input functions (input devices), such as a touch panel and hard keys, and has display functions (display devices), such as an LCD and LED. A user interface (UI) that accepts an operation from a user and presents information to the user is displayed on the touch panel of the operation unit 111. The hard keys include a start button that is used to start scanning a paper document. The input function and display function of the operation unit 111 may be provided separately.

The scanner 112 has an optical reader, such as a CCD, and has a function to read a paper medium as electronic image data by scanning the paper medium optically. Moreover, an automatic document feeder (ADF) can be installed in the scanner 112. In this case, paper documents of a document bundle original that is set on a document tray are automatically fed to the scanner one by one. A paper document that has been scanned is ejected to a discharge tray etc. Setting of a paper document on the document tray of the ADF is detected by a sensor. The printer 113 has a function that forms electronic image data as an image on a recording medium like a paper sheet.

When executing a copy process, a print process, or the like, the MFP 1100 saves information like an execution result as a log to the HDD 104. The HDD 104 stores a user operation applied to the operation unit 111 and information displayed on the operation unit 111 as the log. The MFP 1100 is able to transmit the log saved in the HDD 104 to an external apparatus outside the MFP 1100 through the network I/F 107. Although the external apparatus is the server 1120 in the example of FIG. 1, it may be an apparatus other than the server 1120. The MFP 1100 is able to transmit the saved log to the external apparatus at an optional timing. The saved log may be transmitted immediately after executing a predetermined process or may be transmitted at a certain time interval.

The MFP 1100 displays a login screen to which pieces of user information, such as a user ID and a password, are entered on the operation unit 111, and authenticates a user management function of the MFP 1100 and a user management function of the external apparatus on the basis of the input user information. When valid user information is input, the MFP 1100 determines that the authentication succeeds and brings the MFP 1100 into an operatable state. Moreover, when accepting a logout operation that instructs termination of operation, the MFP 1100 displays the login screen on the operation unit 111 again.

The server 1120 is connected to the MFP 1100 through the network like the LAN 1130 and instructs the MFP 1100 to transmit the above-mentioned log. Moreover, the server 1120 receives information including a log that the MFP 1100 transmitted. The server 1120 has a controller 120 that is connectable to the LAN 1130. The controller 120 has a CPU 121 that runs various control programs. Operations of the entire server 1120 are controlled because the CPU 121 runs the various control programs. The CPU 121 reads a control program stored in the ROM 123 or the HDD 124 and executes a predetermined process while using the RAM 122 as a work area. The HDD 124 stores various control programs, such as a program that instructs the MFP 1100 to transmit a log. Moreover, the HDD 124 stores information including a type of a log that is transmitted to the MFP 1100. The information like the log received from the MFP 1100 is stored in the HDD 124, for example. The controller 120 analyzes the information about the log saved in the HDD 124.

A network I/F 126 controls information communications through the LAN 1130. An operation I/F 125 controls data output to an operation-display unit 128 and controls data input/output with an operation input unit 129. The operation-display unit 128 has a display device, such as an LCD or an LED. The operation-display unit 128 displays predetermined information. The operation input unit 129 has input devices, such as a keyboard and a mouse. The operation input unit 129 accepts an operation from a user.

Figure 2:
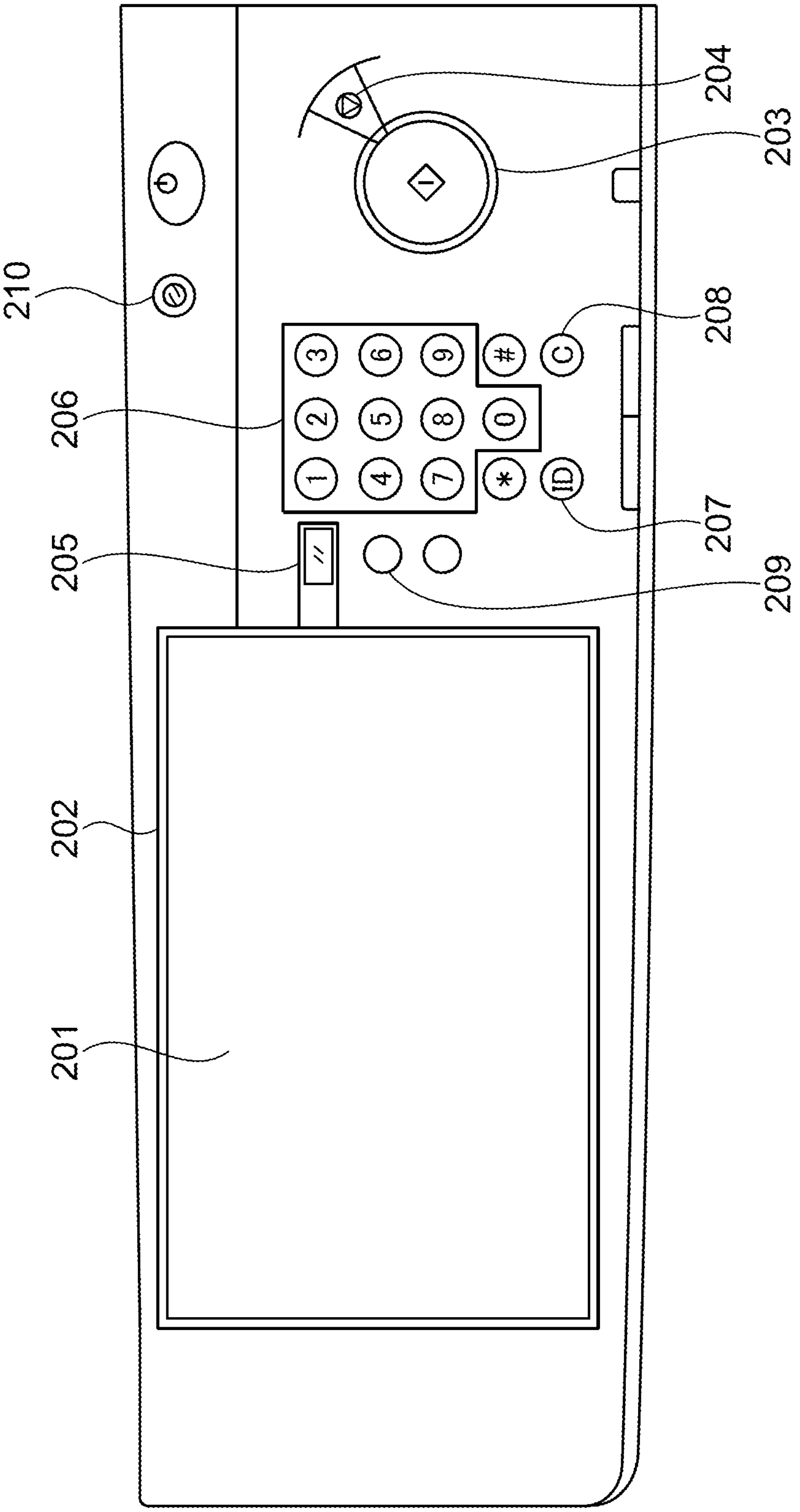
FIG. 2 is an external view of an operation unit included in the MFP in FIG. 1.

FIG. 2 is an external view of the operation unit 111 of the MFP 1100. A touch panel 201 is mounted on a surface of an LCD panel 202. The LCD panel 202 displays an operation screen for performing various settings and set information. The touch panel 201 corresponds to an operation panel. When a user touches an operation target displayed on the LCD panel 202 through the touch panel 201, an input operation (input instruction) for a setting corresponding to the operation target can be performed. The CPU 101 determines which operation target is instructed on the basis of a positional relationship between a touched position by the user on the touch panel 201 and the operation target like a software key displayed on the LCD panel 202. An operation target corresponds to an operation object. At this time, the CPU 101 records the positional coordinate of the touched position by the user on the touch panel 201 as an operation log.

The start key 203 is a hard key that is used to start scanning a paper medium with the scanner 112. A stop key 204 is a hard key that is used to stop a process of a job. A reset key 205 is a hard key that is used to clear a set value that is currently set on the setting screen displayed on the LCD panel 202 so as to restore the set value to a standard set value. A ten-key pad 206 includes hard keys that are used to input a numerical value, such as the number of copies. An ID key 207 is a hard key that is used to instruct execution of a logout process by a user who is logging in to the MFP 1100. A clear key 208 is a hard key that is used to clear input contents. A home key 209 is a hard key that is used to display a home screen on which a user selects each application. A sleep button 210 is a hard key that is used to execute a process that causes transition of the MFP 1100 into a sleep mode (power saving mode) and to execute a process that restores the MFP 1100 from the sleep mode (reverts the MFP 1100 to a normal mode). The power saving mode saves power consumption. For example, the touch panel 201 is in a non-display state where display information is cleared in the power saving mode. When a user operates each of above-mentioned hard keys, the CPU 101 records the operation to the hard key as an operation log.

Figure 3:
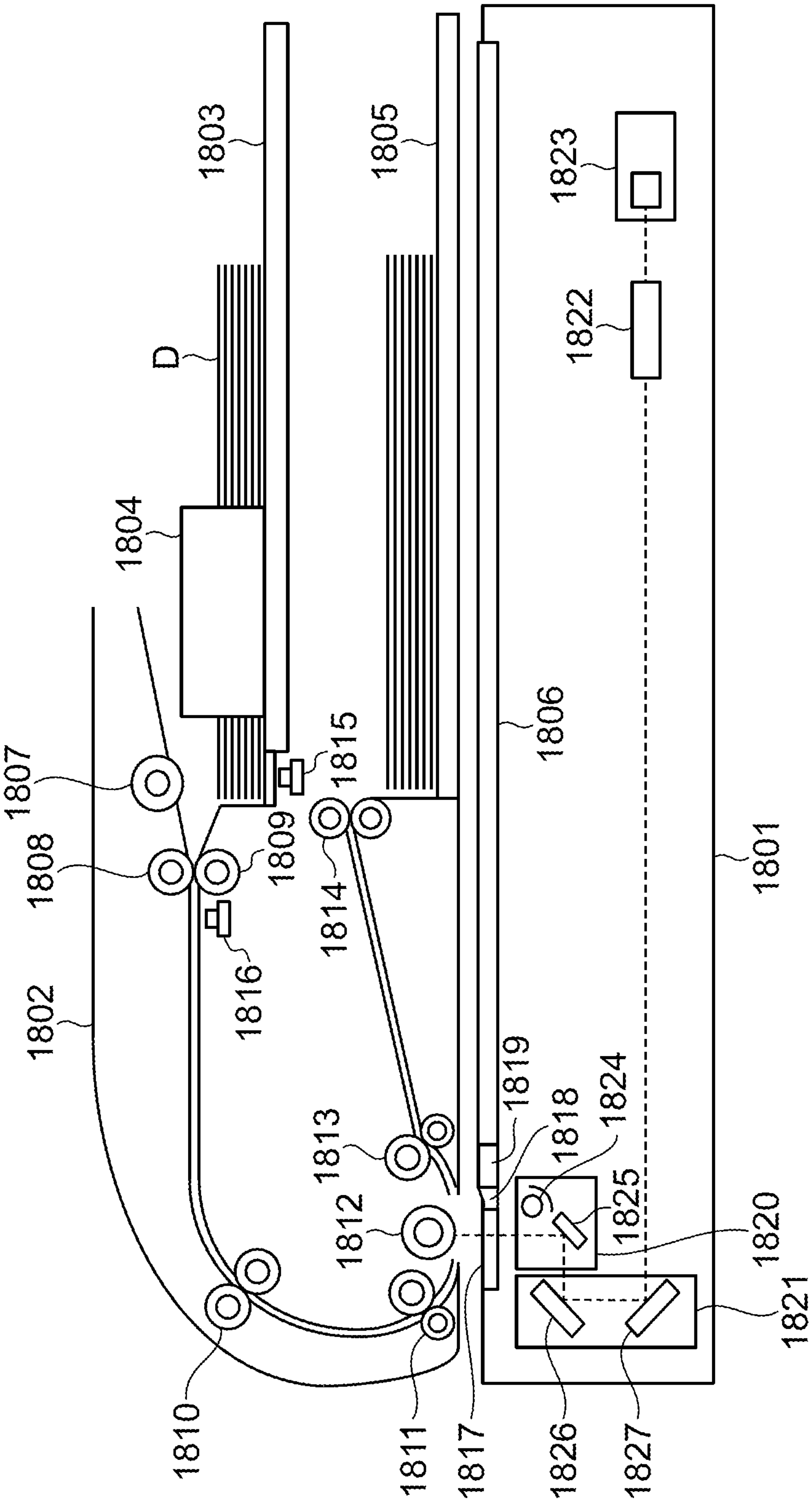
FIG. 3 is a view showing a hardware configuration of a scanner included in the MFP in FIG. 1.

The scanner 112 of the MFP 1100 will be described by referring to FIG. 3. FIG. 3 is a view showing a hardware configuration of the scanner 112. The scanner 112 has an image reading unit 1801 and the ADF 1802 installed above the image reading unit 1801. The ADF 1802 includes the document tray 1803, a pair of regulation plates 1804 that are arranged at both sides of documents on the document tray 1803 and are moved so as to contact both sides of the documents, and the discharge tray 1805 to which a document fed from the document tray 1803 is ejected.

The image reading unit 1801 optically reads a document conveyed by the ADF 1802. The ADF 1802 is rotatably supported by the image reading unit 1801 with a hinge so that a platen glass 1806 can be exposed. The ADF 1802 has a pickup roller 1807 to feed a document on the document tray 1803, a separation drive roller 1808, and a separation driven roller 1809. Furthermore, the ADF 1802 has a conveyance roller pair 1810, read roller pairs 1811 and 1813, a platen guide roller 1812, and an ejection roller pair 1814. Moreover, the ADF 1802 has a document detection sensor 1815 that detects a document D on the document tray 1803 and a post-separation sensor 1816 that is arranged in a downstream position of the separation drive roller 1808 in a sheet feeding direction and detects the document D. When a user sets documents on the document tray 1803, the document detection sensor 1815 detects the set documents.

The image reading unit 1801 has a first platen glass 1817, jump base 1818, reference white board 1819, second platen glass 1806, first mirror base 1820, second mirror base 1821, lens 1822, and CCD unit 1823. A lamp 1824 and mirror 1825 are arranged inside the first mirror base 1820. Mirrors 1826 and 1827 are arranged inside the second mirror base 1821. The first mirror base 1820 and the second mirror base 1821 are movable in an auxiliary scanning direction by a wire and a drive motor. The scanner 112 reads image information from a document in a flow-reading mode by scanning the document D that is set on the document tray 1803 and is fed by the ADF 1801 or in a fixed-reading mode by scanning a document set on the second platen glass 1806. Image information is read by driving the drive roller and movable members of the scanner 112.

Figure 4:
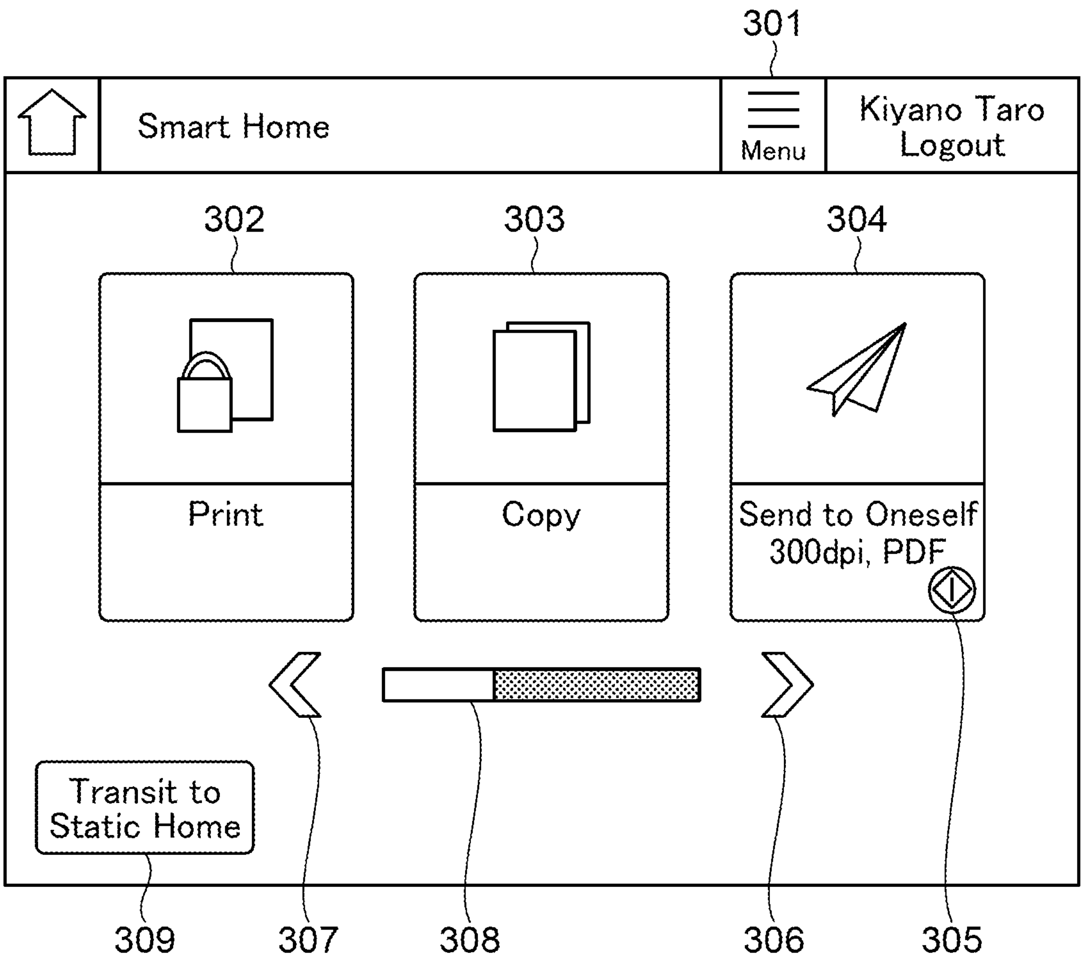
FIG. 4 is a view showing an example of a display screen displayed on a touch panel of the operation unit in FIG. 2.

Next, a display screen displayed on the touch panel 201 of the operation unit 111 will be described. FIG. 4 is a view showing an example of a display screen. FIG. 4 shows an example of a home screen as an initial screen displayed after a user logs in to the MFP 1100. In this embodiment, the initial screen is a smart home screen on which buttons displayed are dynamically changed by a user operation. As shown in FIG. 4, a plurality of smart buttons 302, 303, and 304 are displayed on the smart home screen. Each smart button is a shortcut button accompanied by screen transition. The smart buttons are operation objects of which arrangement is dynamically changed in response to occurrence of an event. The smart buttons 302 and 303 are application buttons for transition to various function application screens. An operation object may be a button other than a smart button.

When a user operates (selects) the smart button 302 on the displayed smart home screen of FIG. 4, the screen transition to a screen of a print application occurs. Moreover, when the user operates (selects) the smart button 303 on the displayed smart home screen of FIG. 4, the screen transition to a screen of a copy application occurs. The smart button 304 is an execution button that starts to execute a job immediately using predetermined set values. The smart button 304 in FIG. 4 is a button for sending scanned data to a user's terminal. When the user operates the smart button 304, a scan-sending job is executable in a state where a destination address, resolution, a format of scanned document, etc. are set to predetermined set values. An icon 305 indicating a job that is executed immediately is displayed on the smart button 304. Thereby, the user is able to recognize that the smart button 304 is accompanied by execution of a job in addition to the screen transition.

Page feeding buttons 306 and 307 are used to switch shortcut buttons displayed on a home screen in a page unit. A page display scale 308 is a scale display that consists of a short rectangle and long rectangle. A ratio of the rectangles indicates a percentage of a currently displayed screen among all display pages. A position of the short rectangle in the long rectangle of the page display scale 308 shows a displayed part among all the display pages. A menu button 301 is used to display a menu screen for setting set values, such as the number of buttons displayed in one page of the home screen. Moreover, a home-screen switching button 309 is used to cause a screen transition from the smart home screen to a static home screen (for example, see FIG. 29) in which display buttons are fixed.

When a user operates a button on a screen displayed on a touch panel 201 of the operation unit 111, the CPU 101 records an operation log and identification information that identifies an operated button. Moreover, a display order of the above-mentioned smart buttons displayed on the smart home screen is automatically switched according to matters, such as document setting on the ADF (ADF document setting) and a print job entry, that are other than a direct user operation to the touch panel 201. Details of this point will be mentioned later.

Figure 5:
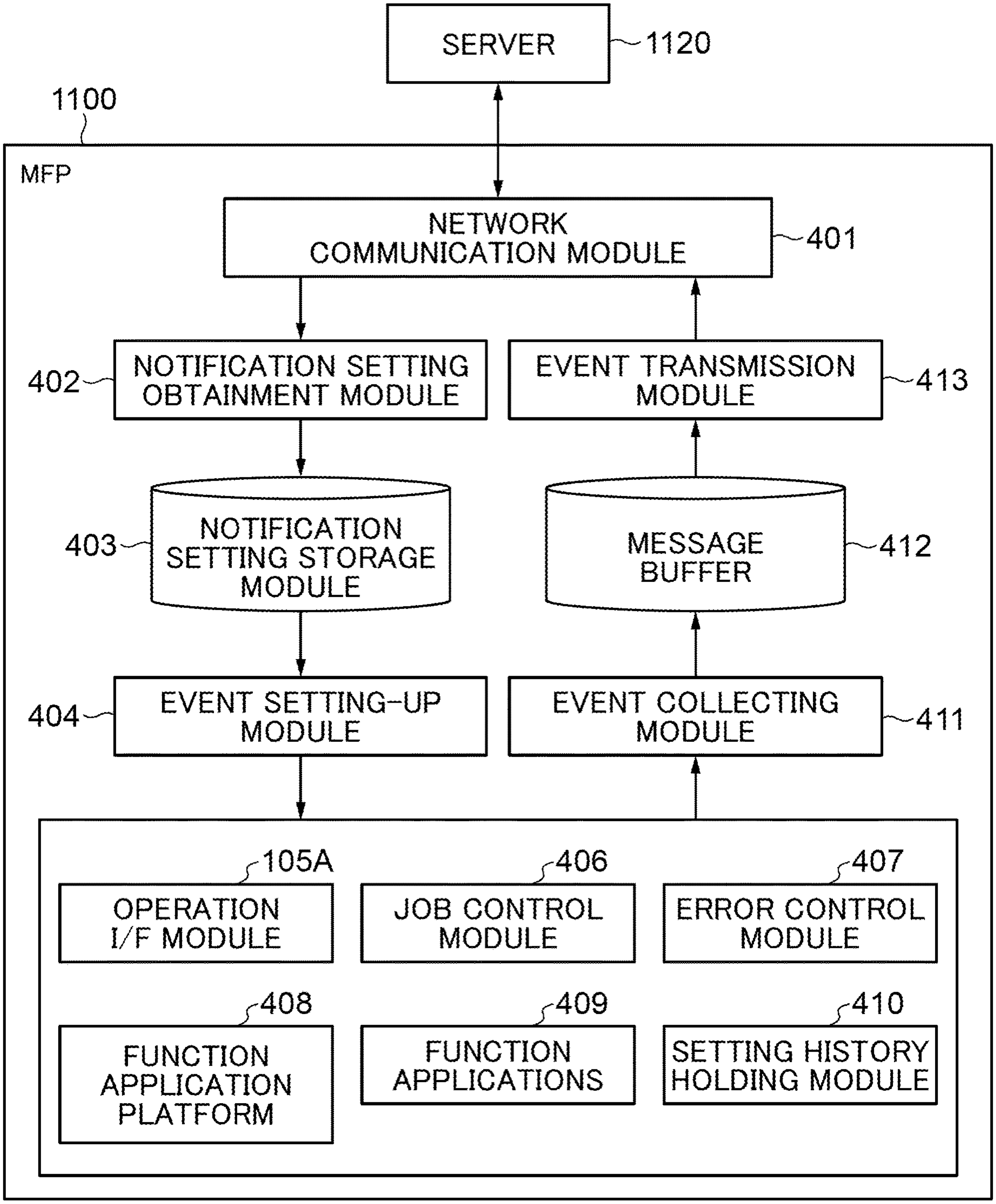
FIG. 5 is a functional block diagram of the MFP shown in FIG. 1.

Next, a software configuration of the MFP 1100 will be described. FIG. 5 is a functional block diagram of the MFP 1100. Function blocks in FIG. 5 are achieved because the CPU 101 runs control programs stored in the RAM 102, ROM 103, or HDD 104. However, a notification setting storage module 403 and a message buffer 412 may be achieved by the RAM 102 or the HDD 104. Moreover, a network communication module 401 may be achieved by the network I/F 106. Moreover, software modules that achieve various functions using the printer, scanner, network, and memory storage operate in the MFP 1100. An operation I/F module 105A is a software function of the operation I/F 105 in FIG. 1, has a function to display a screen operated by a user on the touch panel 201, and has a function to transmit contents of user operations to other software modules. The operation I/F module 105A mainly controls the operation and the display to hardware of the operation unit 111.

A function application platform 408 converts a hardware input accepted by the operation I/F module 105A into an instruction to a button on the operation screen and transmits it to function applications 409. The function applications 409 control the operation screen. Moreover, the function application platform 408 switches the operation screen display from each of the function applications 409 and displays it on the touch panel 201 of the operation unit 111 through the operation I/F module 105A. The function applications 409 constitute a software group for performing functions, such as copy, print, and mail sending. Accordingly, the function applications 409 are given for respective functions. The function applications 409 operate in response to triggers, such as an instruction from a user through the operation unit 111 and data reception through the network like the LAN 1130.

When receiving a job execution instruction from one of the function applications 409, a job control module 406 controls so as to execute the instructed job. For example, when execution of a scan job is instructed, the job control module 406 controls the scanner 112 through the scanner I/F 107 to execute scan. Moreover, when execution of a print job is instructed, the job control module 406 controls the printer 113 through the printer I/F 108 to execute print. An error control module 407 receives a notification of an abnormal condition that mainly occurs in the job control module 406, the printer 113, the scanner 112, or the like, and controls stop of the entire system and an instruction of a degeneration operation. A setting history holding module 410 manages nonvolatile information including an operation history, various set values, etc. in the MFP 1100. The setting history holding module 410 holds settings required for control of a time of job execution in the MFP 1100, and holds a user operation history, an execution result of a job, occurrence of an error, etc. Moreover, the setting history holding module 410 is able to hold a setting history that includes a set value that is called when the smart button 304 is operated, a set value that was setting when a job was executed, and a job setting that was executed in the past, etc. The setting history holding module 410 can hold the setting history in a format that enables job setting. Contents of set values of jobs will be mentioned later. The held information is stored in the HDD 104, for example.

The network communication module 401 transmits and receives information with the server 1120 through the network like the LAN 1130. The network communication module 401 receives an event notification instruction from the server 1120. When the network communication module 401 of the MFP 1100 receives the event notification instruction, a notification setting obtainment module 402 recognizes a received instruction content and saves an event notification setting included in the instruction to the notification setting storage module 403. The event notification setting is saved in the notification setting storage module 403 as a file in the HDD 104. A content that shows which matter is selected and reported as an event from among matters that occur inside a target apparatus and can become events is saved in the notification setting storage module 403.

When the MFP 1100 is started or when the notification setting obtainment module 402 receives a change notification of the event notification setting in the notification setting storage module 403, an event setting-up module 404 sets up the controllers and applications so as to obtain the event that is subjected to the notification instruction. That is, the event setting-up module 404 sets up the operation I/F module 105A and the applications including the job control module 406 through the setting history holding module 410 so as to obtain the event that is subjected to the notification instruction.

An event collection module 411 as a recording unit receives an event from each of the applications that are set so as to obtain the event, shapes data after selecting and adding event information, and saves the data as event notification data in the message buffer 412. The event notification data is saved as a log file in the HDD 104 in the message buffer 412 as a storage unit. The storage unit is not limited to the HDD 104 and may be the RAM 102 etc. When detecting that the event notification data is written in the message buffer 412, an event transmission module 413 reads the event notification data and transmits it to the server 1120 through the network communication module 401. The event transmission module 413 may transmit the event notification data whenever the event notification data is written in the message buffer 412. Moreover, the event transmission module 413 may transmit the event notification data collectively, when the event notification data reaches a certain amount of information.

Figure 6A:
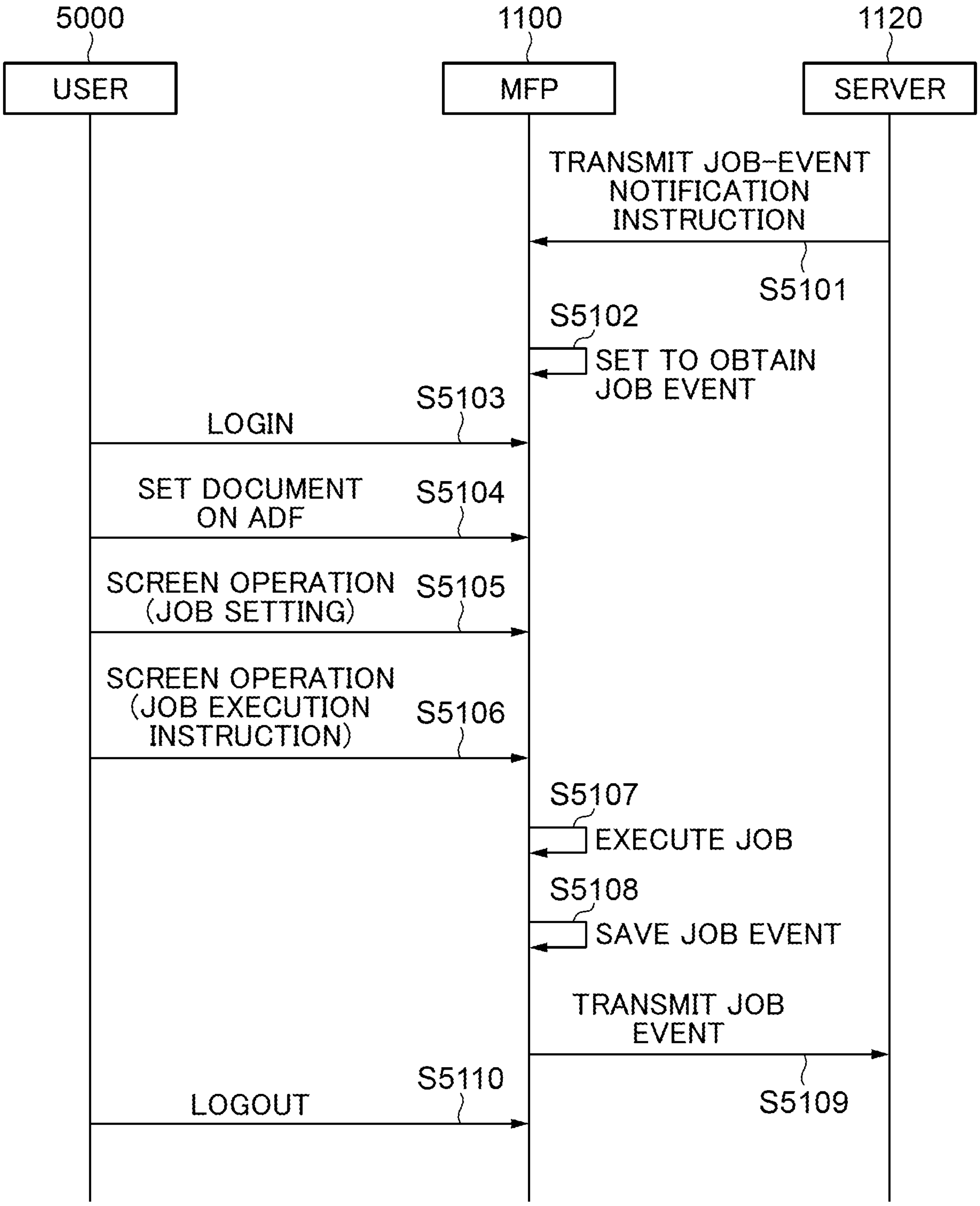
FIG. 6A is a sequential chart showing a flow of a process executed by a basic system that is a premise of the first embodiment.

Next, the flow of the process of the entire system will be described. FIG. 6A is a sequential chart showing a flow of a process executed by a basic system that is a premise of the first embodiment. The server 1120 transmits a job-event notification instruction to the MFP 1100 (S5101). When the network communication module 401 of the MFP 1100 receives the job-event notification instruction, the notification setting obtainment module 402 recognizes a received instruction content and saves an event notification setting in the notification setting storage module 403. After that, the event setting-up module 404 sets up each module in the apparatus for obtaining contents of the event that is subjected to the job-event notification instruction so as to obtain an internal event (S5102). In S5102, the event setting-up module 404 shall mainly set up the job control module 406 to obtain an event.

Next, the MFP 1100 accepts a login operation by a user 5000 (S5103). When accepting the login operation, the MFP 1100 performs an authentication process for login. In the example of FIG. 6A, the authentication shall succeed, and the user shall set a document on the ADF 1802 (S5104). Then, when the user gives a screen operation, the MFP 1100 accepts a setting about a job corresponding to the screen operation (S5105). Moreover, when receiving a job execution instruction, such as a press of the start key 203, from a user, the MFP 1100 accepts the job execution instruction (S5106).

The MFP 1100 executes a job, such as a copy job or a scan job, with the instructed set value (S5107). The MFP 1100 receives the events, such as a job start and a job execution, about the job from the job control module 406. Then, the event collection module 411 applies data shaping to the events about the job and necessary information and saves the information about the events in the message buffer 412 (S5108). After that, the MFP 1100 transmits a job event to the server 1120 through the network communication module 401 (S5109). When the user gives a logout operation to the MFP 1100, the MFP 1100 accepts the logout operation (S5110). When accepting the logout operation, the MFP 1100 performs a logout process.

Figure 6B:
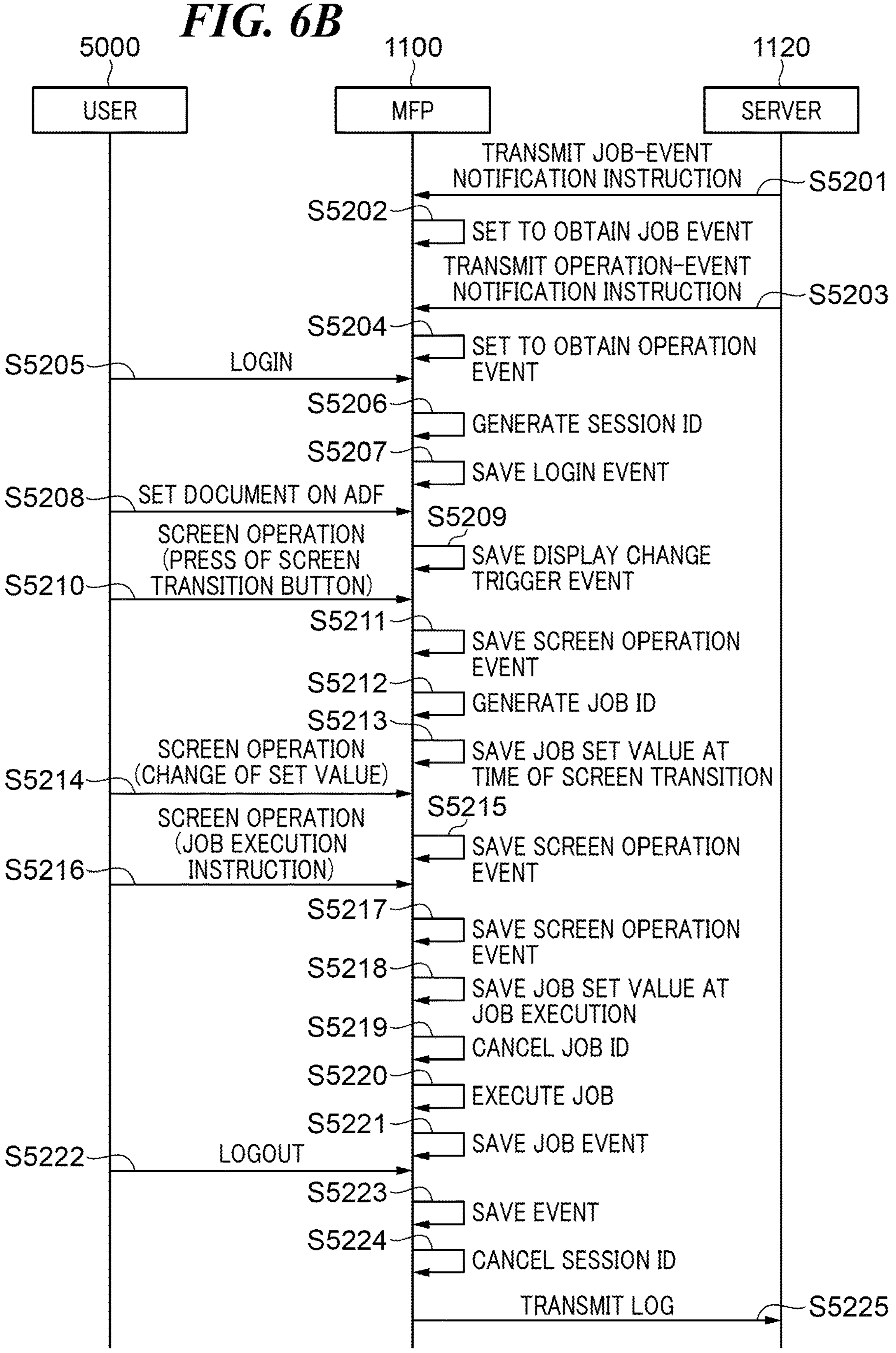
FIG. 6B is a sequential chart showing a flow of a process executed by the system of the first embodiment.

FIG. 6B is a sequential chart showing a flow of a process executed by the system of the first embodiment. The operations by the user are identical to that of FIG. 6A except for a part of screen operations. The server 1120 transmits the job-event notification instruction that requires the event about a job to MFP 1100 (S5201). When the network communication module 401 of the MFP 1100 receives the job-event notification instruction, the notification setting obtainment module 402 recognizes a received instruction content and saves an event notification setting in the notification setting storage module 403. The event setting-up module 404 sets up each module inside the MFP 1100 so as to obtain the job event that is subjected to the notification instruction (S5202).

The server 1120 transmits an operation-event notification instruction that requires an event about a user operation (S5203). The operation-event notification instruction is a notification instruction of the event about the user operation and is used in order to analyze the user operation to the MFP 1100. When the network communication module 401 of the MFP 1100 receives the event notification instruction, the notification setting obtainment module 402 recognizes the received instruction content and saves the event notification setting in the notification setting storage module 403. The event setting-up module 404 sets up each module inside the MFP 1100 so as to obtain the operation event that is subjected to the notification instruction (S5204).

When the user performs a login operation, the MFP 1100 accepts the login operation (S5205). Then, the MFP 1100 performs the authentication process for login. The authentication shall succeed in the example of FIG. 6B. The event collection module 411 that is notified of the login event from the function application 409 that controls the login process generates a session ID to be added to the operation event (S5206). The session ID is mainly used to distinguish a series of user operations that are given from login to logout from an operation of the same user of a time of another login. The event collection module 411 generates an event (login event) about the login operation that the server 1120 is notified, adds the session ID to the generated event, and then saves it in the message buffer 412 (S5207). The event collection module 411 holds the session ID until the logout of the user is detected and adds the same session ID to each event generated until logout.

Next, the user sets a document on the ADF 1802 (S5208). When the document is set on the ADF 1802, the document detection sensor 1815 detects the setting of the document. Thereby, the CPU 101 of the MFP 1100 dynamically changes the arrangement of the smart buttons on the smart home screen shown in FIG. 4. The event collection module 411 receives the layout change of the smart buttons due to the document setting on the ADF 1802 as an event, generates a screen change trigger event, and saves it in the message buffer 412 (S5209).

When the user performs an operation accompanied by screen transition, such as a press of a smart button to the touch panel 201 of the operation unit 111, the MFP 1100 accepts the operation (S5210). The event collection module 411 receives the event of the button operation, generates a screen operation event, and saves it in the message buffer 412 (S5211). As mentioned above, the MFP 1100 is accepting an operation accompanied by screen transition. The event collection module 411 accepts the event of the button operation. When determining that the event is a screen operation event accompanied by screen transition, the event collection module 4111 generates a job ID added to this screen operation event (S5212). The job ID is used to identify an operation for each time when a job is executed. Furthermore, the event collection module 411 obtains a job set value of the time of the screen transition corresponding to the button pressed in S5210 from the setting history holding module 410, adds the job set value and the job ID to the screen operation event, and saves it in the message buffer 412 (S5213).

When the user gives an operation on the job setting screen so as to change a set value to a job that is executed by pressing a button displayed on the screen, the MFP 1100 accepts the change operation (S5214). The event collection module 411 receives the event of the button operation, generates the screen operation event in the same manner as S5211, and saves it in the message buffer 412 (S5215). Next, when receiving a job execution instruction, such as a press of the start key 203 of the operation unit 111, from the user, the MFP 1100 accepts the execution instruction (S5216). The event collection module 411 receives the event of the key operation, generates the screen operation event, and saves it in the message buffer 412 (S5217). Moreover, the event collection module 411 receives an event of a job execution start, obtains a job set value of the time of the job execution instruction from the setting history holding module 410, adds the job set value to the event of the job execution instruction, and saves it to the message buffer 412 (S5218). After that, the event collection module 411 cancel the job ID generated in S5212 (S5219).

The job control module 406 of the MFP 1100 executes a job, such as a copy job or a scan job, with the instructed set value (S5220). Then, the event collection module 411 receives the events, such as a job start and a job execution, about the job from the job control module 406, and saves the job events together with required information in the message buffer 412 (S5221). When the user gives a logout operation to the MFP 1100, the MFP 1100 accepts the logout operation (S5222). When accepting the logout operation, the MFP 1100 performs the logout process. After that, the event collection module 411 generates an event of the logout operation and saves it in the message buffer 412 (S5223). Moreover, the event collection module 411 cancels the session ID generated at the time of login (S5224). Then, the event transmission module 413 transmits the information about the events saved in the message buffer 412 as a log to the server 1120 through the network communication module 401 (S5225).

FIG. 7 is a view showing a first group example of the events that the MFP 1100 transmits to the server 1120. Each event includes a plurality of items. An event name 602 among the plurality of items shows a name of an event reported when a specific matter occurs in the MFP 1100. For example, a DevicePowerOn event is reported from the MFP 1100 to the server 1120 when a matter that the power of the apparatus turns ON occurs. Each event is transmitted together with information relevant to the event.

A collection 601 shows a unit of events that are designated as targets that the server 1120 obtains when transmitting an event notification instruction. The collection 601 shows a group of events of which meanings are similar. Usually, when the collection 601 is designated, events of targets obtained are designated collectively. For example, when a Counter collection 606 is designated, the server 1120 is notified when one of two events including a CounterSnapshotted event and PartsCounterSnapshotted event occurs. Moreover, when a Power collection 605 is designated, four events including a DevicePowerOn event, DeviceSleepStarted event, DeviceSleepReverted event, and DevicePowerOff event are designated. Thereby, an event of which occurrence is reported to the server 1120 is designated.

In a basic system column 603, an event that can be reported by the basic system is indicated by a round mark. In an operation analysis system column 604, an event that can be reported by the system of this embodiment is indicated by a round mark. The basic system can report the events of the four collections including the Power collection 605, the Counter collection 606, an Alarm collection 607, and a Job collection 608 as shown in the basic system column 603. In addition, the operation analysis system can report events of a UserOperation collection 609. When the UserOperation collection 609 is designated, it can be designated that five events concerning a user operation are collectively collected and are reported to the server 1120.

A UserOperated event of the UserOperation collection 609 is reported when a user instruction to the operation unit 111, such as press of a smart button on the smart home screen of FIG. 4, occurs. Although a UserOperatedInSession event and the UserOperated event are reported because of occurrence of the same matter, session information (a session ID) that distinguishes a series of user operations in a session unit is added to the UserOperatedInSession event. Although a UserOperatedInJob event and the UserOperated event are reported because of occurrence of the same matter, job information (a job ID) that distinguishes a series of user operations in a job unit is added to the UserOperatedInJob event. A DisplayChangeTriggerOccurred event is reported when the arrangement of the smart buttons is changed (when display change of the operation screen occurs) without a direct user operation to the operation unit 111. The DisplayChangeTriggerOccurred event is reported, for example, when a document is set on the ADF 1802. A SettingSnapshottedAtTransition event is reported when a set value of a time of transition to a screen of a specific application or a set value of a time of execution of a job of the application is set up.

FIG. 8A is a view showing an example of an event log in the basic system. It should be noted that the event log of FIG. 8A is table-format data and each line indicates one event. However, the event log may be in a format like JSON etc. An event name 7001 shows a name of an event that is transmitted. A generation time 7002 shows a generation time of an event. A user name 7003 shows a name of a user who causes generation of an event. The user name 7003 is an ID that identifies a user. The user name 7003 is not added to an event resulting from the MFP 1100 itself, such as issuance of alarm and to an event of which a user cannot be specified.

A target 7004 shows a target of an event generated. A content of the target 7004 differs for each event. For example, a JobStarted event is an event of job start. And type information showing which job is started is registered into the corresponding target 7004. A parameter 7005 is detailed added information about the target 7004 of the corresponding event. A content of added information of the parameter 7005 also differs according to an event or a target. For example, a JobCompleted event is an event of job completion, a type showing which job has been completed is registered in the target 7004, and information like a status showing whether the job has been normally completed is registered in the parameter 7005. In the basic system, each event is saved, and the saved event is transmitted to the server 1120.

Next, a notification event transmitted in the sequence chart of the basic system shown in FIG. 6A will be described. The Job collection 608 (a job-event notification instruction) in FIG. 7 is transmitted in S5101. In response to the transmission of the Job correction 608, the JobStarted event, a JobExecuting event, and the JobCompleted event among the events in FIG. 8A are generated in S5108. The generation time 7002 of the event, the user name 7003 who executes the job, and the information about the target 7004 that represents the job type are added to each Job event. Moreover, status information of the time of completion of the job is added as the parameter 7005 to the JobCompleted event. In S5109, the JobStarted event, JobExecuting event, and JobCompleted event are transmitted to the server 1120 from the MFP 1100.

Next, the event in the system (operation analysis system) of the first embodiment will be described. FIG. 8B is a view showing an example of the event log in the system of the first embodiment. As with FIG. 8A, the event log of FIG. 8B is table-format data and each line indicates one event. However, the event log may be in a format like JSON etc. An event name 7101, a generation time 7102, and a user name 7106 are the same as that of FIG. 8A. A session ID 7103 specifies a range of a series of user operations. The same ID "A001" is allocated to the session ID 7103 of all the operation events generated between the user's login to the MFP 1100 and logout. The allocated session ID facilitates analysis of the operations given by the user who logs in to the MFP 1100.

Although a job ID 7104 also specifies a range of a series of user operations as with the session ID 7103, the range of operations specified by the job ID 7104 differs from the range specified by the session ID 7103. Whenever a job is executed, the same job ID is allocated to user operations performed when the corresponding job is executed. The allocated job ID facilitates analysis of the operations given by the user when the job is executed. An operation content 7105 is type information indicating a content of a user operation and is set to an event concerning a user operation. Although a target 7107 and parameter 7108 are similar to the target 7004 and parameter 7005 in FIG. 8A, their contents differ for respective events. An event collection module 411 generates the above items as information about one event. Then, the generated information about the event is saved in the message buffer 412. The saved information about the event is transmitted to the server 1120 as a log.

Next, the notification event transmitted in the sequence chart of the first embodiment shown in FIG. 6B will be described. In S5201, the server 1120 transmits the Job collection 608 (the job-event notification instruction) in FIG. 7 to the MFP 1100. Moreover, the server 1120 transmits the UserOperation collection 609 (an operation-event notification instruction) in FIG. 7 to the MFP 1100 in S5203. Thereby, the MFP 1100 is set so as to collect the information about the job events and the user operation events and to transmit the information to the server 1120 in S5202 and S5204. Then, when a login process is executed in S5205, the MFP 1100 generates the UserOperated event as an event of No. 1 of FIG. 8B. The MFP 1100 sets the operation content 7105 of the generated event to a ButtonSelected identifier indicating a selection of a button on a screen. Moreover, the MFP 1100 sets the target 7107 to a LoginButton identifier indicating an operation of a login button and sets the parameter 7108 to a LoginDialog identifier indicating the screen on which the operated button has been displayed.

After the login process of S5205 is executed, the MFP 1100 generates the session ID "A001" in S5206. Then, the MFP 1100 generates the UserOperatedInSession event as an event of No. 2. The MFP 1100 adds the session ID "A001" to the session ID 7103 of the generated event and adds a Login identifier indicating execution of the login process to the operation content 7105.

When a document is set on the ADF in S5208, a screen change trigger event is generated and saved in S5209. At this time, the MFP 1100 generates the DisplayChangeTriggerOccurred event as an event of No. 3. The MFP 1100 sets the operation content 7105 to an ADFPaperSet identifier indicating a screen change due to the ADF document setting. Moreover, the MFP 1100 sets the target 7107 to a SmartButtonShift identifier indicating rearrangement of the smart buttons and sets the parameter 7108 to a MainMenue identifier indicating the screen on which the smart buttons are displayed.

Next, when the smart button (copy button) is selected by the screen operation of S5210, the MFP 1100 generates the UserOperatedInSession event as an event of No. 4 in a screen operation event saving process of S5211. The MFP 1100 sets the operation content 7105 to an identifier of ButtonSelected indicating a selection of a button on a screen. Moreover, the MFP 1100 sets the target 7107 to a CopyButton identifier indicating that the copy button has been operated. Then, the MFP 1100 sets the parameter 7108 to the MainMenu identifier indicating the screen on which the operated copy button has been displayed. Moreover, the MFP 1100 adds "0001" indicating the job ID generated by the job ID generation process of S5212 to the job ID 7104.

When a smart button is selected, the screen transition to a setting screen of an application (an application setting screen) corresponding to the selected smart button occurs. The MFP 1100 generates the SettingsSnapshottedAtTransition event as an event of No. 5 in a process of S5213 for saving set values of the time of screen transition. The MFP 1100 sets the operation content 7105 of the generated SettingsSnapshottedAtTransition event to a DisplayTransition identifier indicating the screen transition to the setting screen. Moreover, the MFP 1100 sets the target 7107 to a Copy identifier indicating that a copy application will be executed. Furthermore, the MFP 1100 converts the set values that are obtained from the setting history holding module 410 and are used to execute the job of the application into information in accordance with the format of the event and adds the information to the parameter 7108. For example, when the copy application is executed, the set values are settings, such as the number of copies, an output paper size, and a scaling magnification, that are needed to execute the copy job. The contents of the set values differ for the respective applications. Moreover, the MFP 1100 adds the job ID 7104 generated by the job ID generation process of S5212 in addition to the session ID 7103 to the event of No. 5.

When the series of the screen operations for changing the set values are performed in S5214, the screen operation event is saved in S5215. Thereby, the MFP 1100 generates the UserOperatedInJob events as events of No. 6 through No. 8 and sets the job IDs 7104 to the same value "0001". When the screen operation of a job execution instruction is performed in S5216, the MFP 1100 generates a UserOperatedInJob event as an event of No. 9 in the screen operation event saving process of S5217. When job execution is instructed by pressing the start key 203, the MFP 1100 adds an identifier of KeySelected indicating selection of a hard key to the operation content 7105. Furthermore, the MFP 1100 sets the target 7107 to an identifier of StartKey indicating that the start key has been operated and sets the parameter 7108 to an identifier of CopySettings indicating the screen that has been displayed when the hard key has been selected.

When the set values of the time of job execution is saved in S5217, the MFP 1100 generates the SettingsSnapshottedAtTransition event as an event of No. 10. The set values of the time of job execution that are obtained from the setting history holding module 410 are converted into information in accordance with the format of the SettingsSnapshottedAtTransition event and the information is added to the event. The event name of the event generated is the same as that of No. 5. The MFP 1100 sets the operation content 7105 to an identifier of JobStart indicating job execution. Furthermore, the MFP 1100 generates events of JobStarted, JobExecuting, and JobCompleted as events of No. 11 through No. 13 in the job event saving process of S5221. No information is set to the session ID 7103 and job ID 7104 corresponding to the events of No. 11 through No. 13.

In S5222, when the logout operation is performed, the MFP 1100 generates a UserOperatedInSession event as an event of No. 14. Although the event of No. 14 is the same as the event of No. 2, it is the event indicating the logout operation by the ID key 207. Accordingly, the MFP 1100 sets the operation content 7105 to the identifier of KeySelected indicating selection of a hard key and sets the target 7107 to an identifier of LogoutKey showing the operated hard key.

When the logout operation event is saved in S5223, the MFP 1100 generates the UserOperatedInSession event as an event of No. 15. Although the event of No. 15 is the same as the event of No. 2, the MFP 1100 sets the operation content 7105 of the event of No. 15 to the identifier of Logout indicating the logout process. As mentioned above, the events of No. 1 through No. 15 of FIG. 8B are generated by performing the series of sequences of FIG. 6B. Then, the MFP 1100 controls to transmit the information about the respective events to the server 1120 as a log. Thereby, the above-mentioned log is transmitted to the server 1120 from the MFP 1100.

The values of the session ID 7103 of the events of No. 2 through No. 10, No. 14, and No. 15 are identical. Thereby, the series of processes performed between the user's login to the MFP 1100 and logout are easily extracted on the basis of the values of the session ID 7103 and are analyzed. Moreover, the values of the job ID 7104 of the events of No. 5 through No. 10 are identical. Thereby, the user operations performed when the specific job is executed are easily extracted on the basis of the values of the job ID 7104 and are analyzed.

The event of No. 3 is generated by the MFP 1100 in response to the ADF document setting. And the operation content 7105 and target 7107 of the event of No. 3 indicate that the operation screen has been changed by the cause (ADF document setting) other than the direct user operation to the touch panel 201. Accordingly, it is easily analyzed that the event of No. 3 has been generated because of the cause other than the direct user operation. Moreover, the job set values of the time of transition to the job setting screen and the set values of the time of executing the job are obtained on the basis of the events of No. 5 and No. 10. Since the event names 7101 of both the obtained set values are set to the same value, both the obtained set values are extracted easily. Then, the settings by the user performed until the job is executed are easily analyzed by comparing both the obtained set values, without analyzing key operations and button operations. Events from No. 16 are examples of events generated by a process other than the sequence of FIG. 6B. For example, a screen operation event is generated when a password is input at a time of login.

Figure 9A:
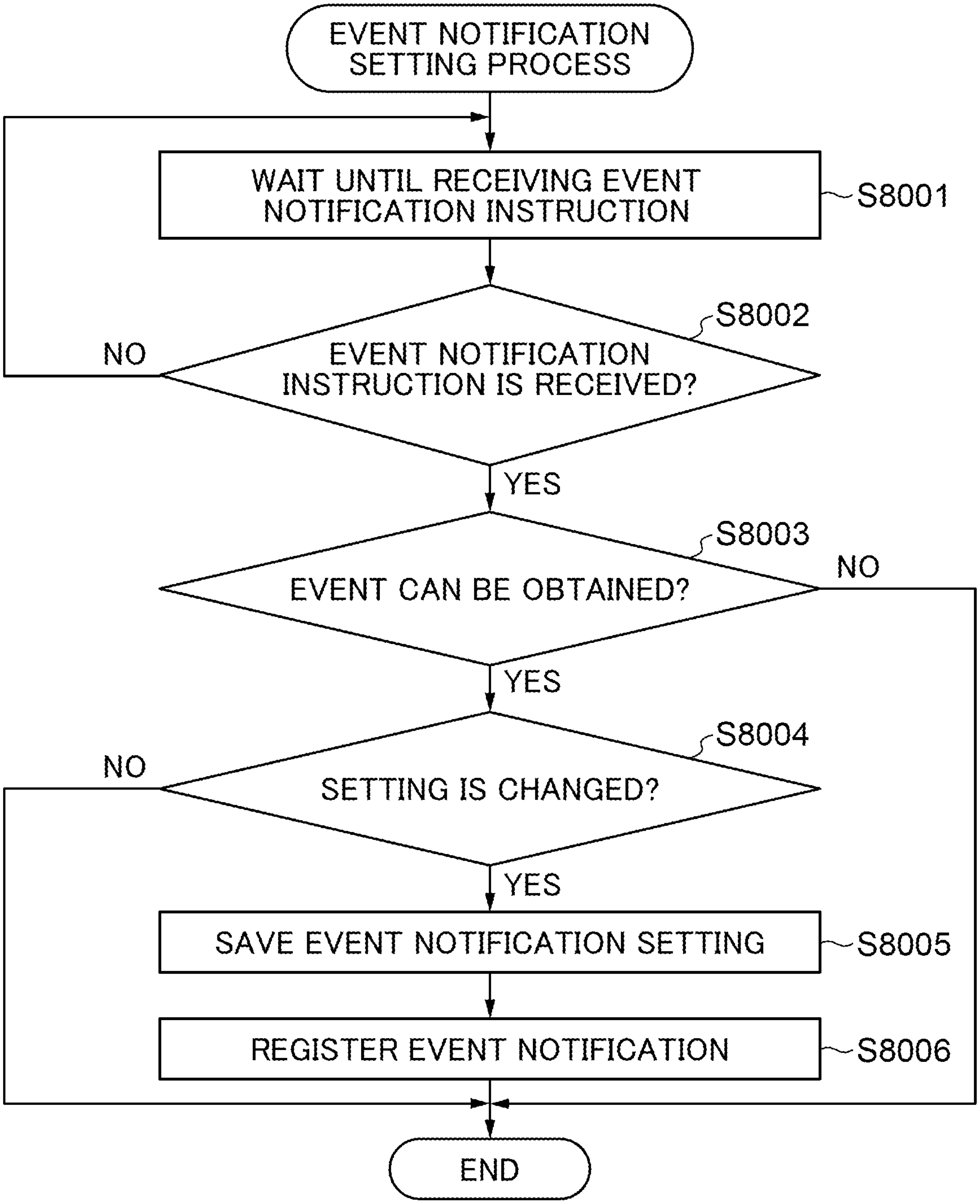
FIG. 9A is a flowchart showing a flow of an event notification setting process executed by the MFP shown in FIG. 1.

Next, an event process that the MFP 1100 executes will be described. FIG. 9A is a flowchart showing a flow of an event notification setting process. The process of the flowchart of FIG. 9A is achieved because the CPU 101 runs a control program. The network communication module 401 waits until receiving an event notification instruction from the server 1120 (S8001). The network communication module 401 determines whether an event notification instruction is received from an external apparatus like the server 1120 (S8002). When determining to be NO in S8002, the network communication module 401 returns the process to S8001. In the meantime, when determining to be YES in S8002, the network communication module 401 transfers the received event notification instruction to the notification setting obtainment module 402. The notification setting obtainment module 402 determines whether the event of the obtained event notification instruction can be obtained by the MFP 1100 (S8003). The notification setting obtainment module 402 determines to be YES in S8003, when the event of the event notification instruction received is included in a list of obtainable events that is held beforehand.

When the notification setting obtainment module 402 determines to be NO in S8003, the process is finished. In the meantime, when the notification setting obtainment module 402 determines to be YES in S8003, it is determined whether the event notification setting of the received event notification instruction has been changed from the event notification setting saved in the notification setting storage module 403 (S8004). The event notification setting prescribes a type of an event to be obtained, an obtainment timing, an obtainment interval, etc. When the notification setting obtainment module 402 determines to be NO in S8004, the process is finished. When determining to be YES in S8004, the notification setting obtainment module 402 saves the event notification setting changed into the notification setting storage module 403 (S8005). Then, the event setting-up module 404 registers internal event notifications to the internal modules like the function applications 409 on the basis of the saved event notification setting (S8006). Then, this process is finished. The process of FIG. 9A is executed repeatedly as needed.

Figure 9B:
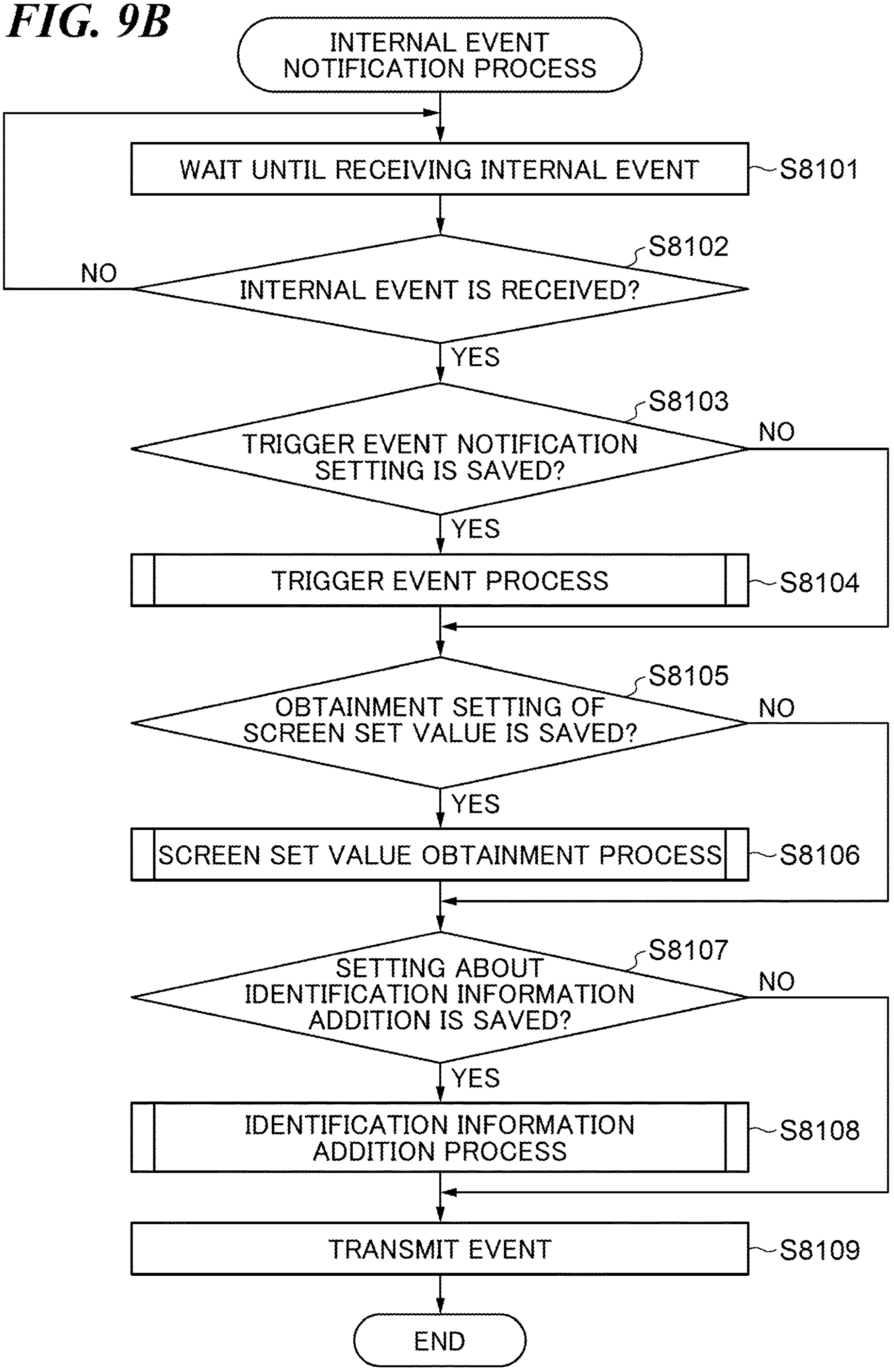
FIG. 9B is a flowchart showing a flow of an internal event notification process executed by the MFP shown in FIG. 1.

FIG. 9B is a flowchart showing a flow of an internal event notification process executed by the MFP 1100. The event collection module 411 waits until receiving an internal event from an internal module (S8101). Then, the event collection module 411 determines whether an internal event is received from an internal module (S8102). When determining to be NO in S8102, the event collection module 411 returns the process to S8101. When determining to be YES in S8102, the event collection module 411 determines whether a notification setting of a trigger event to an operation screen change is saved in the notification setting storage module 403 (S8103). The event collection module 411 determines to be YES in S8103, when a DisplayChangeTriggerOccurred event in FIG. 7 is set to be notified.

Figure 11:
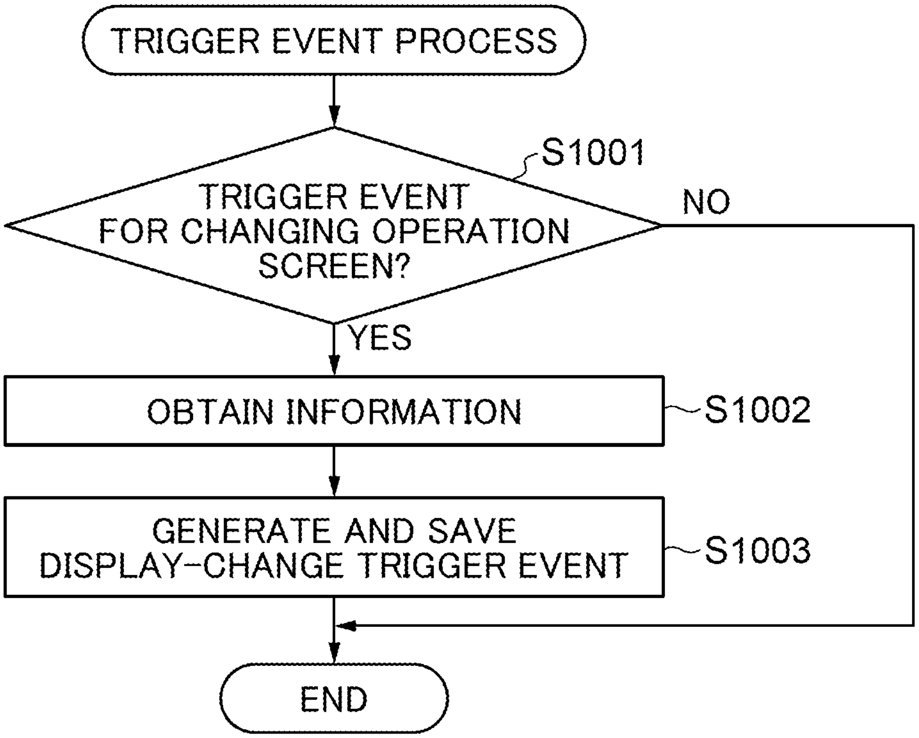
FIG. 11 is a flowchart showing a flow of a trigger event process of the first embodiment executed in S8104 in FIG. 9B.

When determining to be YES in S8103, the event collection module 411 executes a trigger event process (S8104). The trigger event process is executed to generate and save a trigger event as shown in FIG. 11 mentioned later. In the meantime, when determining to be NO in S8103, the event collection module 411 proceeds with the process to S8105 without executing the trigger event process.

Figure 13:
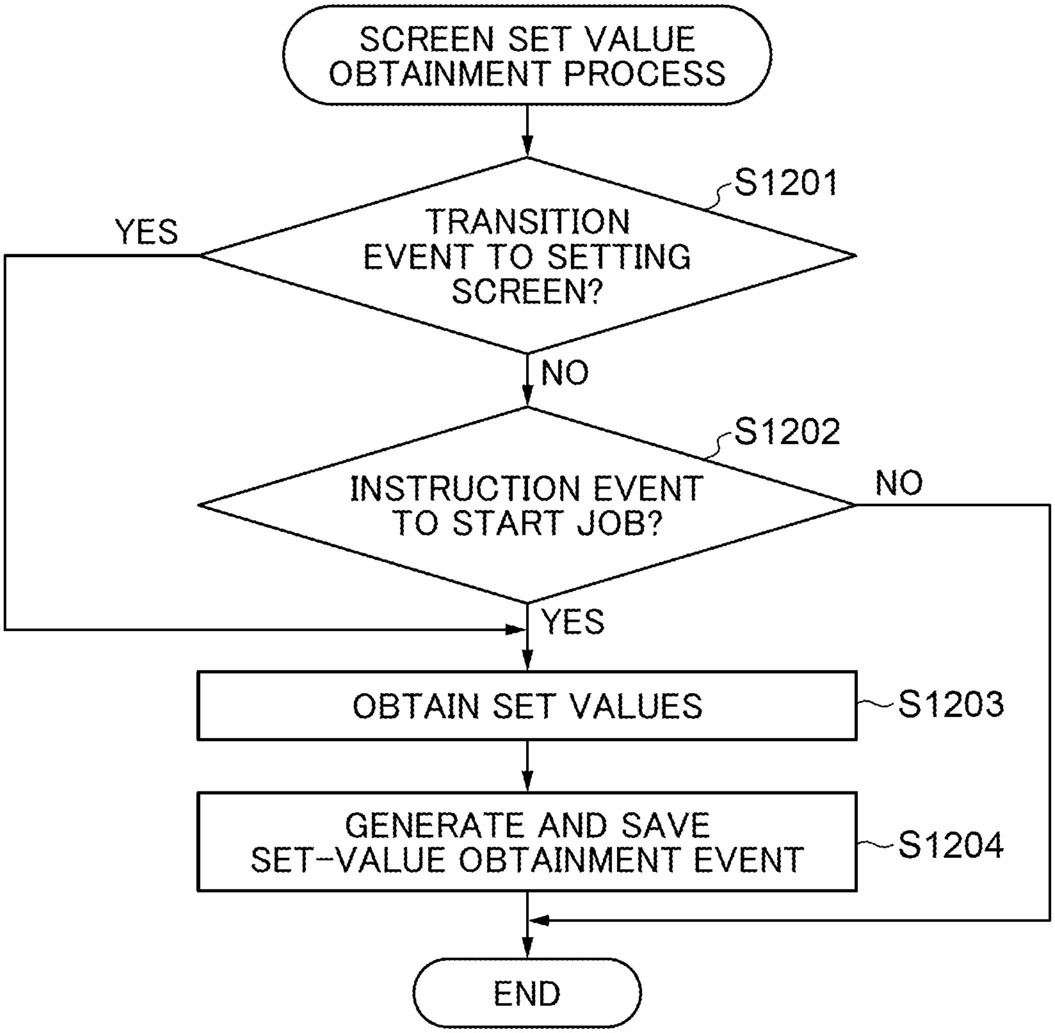
FIG. 13 is a flowchart showing a flow of a screen-set-value obtainment process of the first embodiment executed in S8106 in FIG. 9B.

The event collection module 411 determines whether an obtainment setting of a screen set value is saved in the notification setting storage module 403 (S8105). The event collection module 411 determines to be YES in S8105, when the SettingsSnapshottedAtTransition event in FIG. 7 is set to be notified. When determining to be YES in S8105, the event collection module 411 executes a screen-set-value obtainment process (S8106). The screen-set-value obtainment process is executed to generate an event by obtaining job set values and converting them into a format to be output as an event whenever a job setting screen for a function application is displayed as shown in FIG. 13 mentioned later. In the meantime, when determining to be NO in S8105, the event collection module 411 proceeds with the process to S8107 without executing the screen-set-value obtainment process.

Figure 9C:
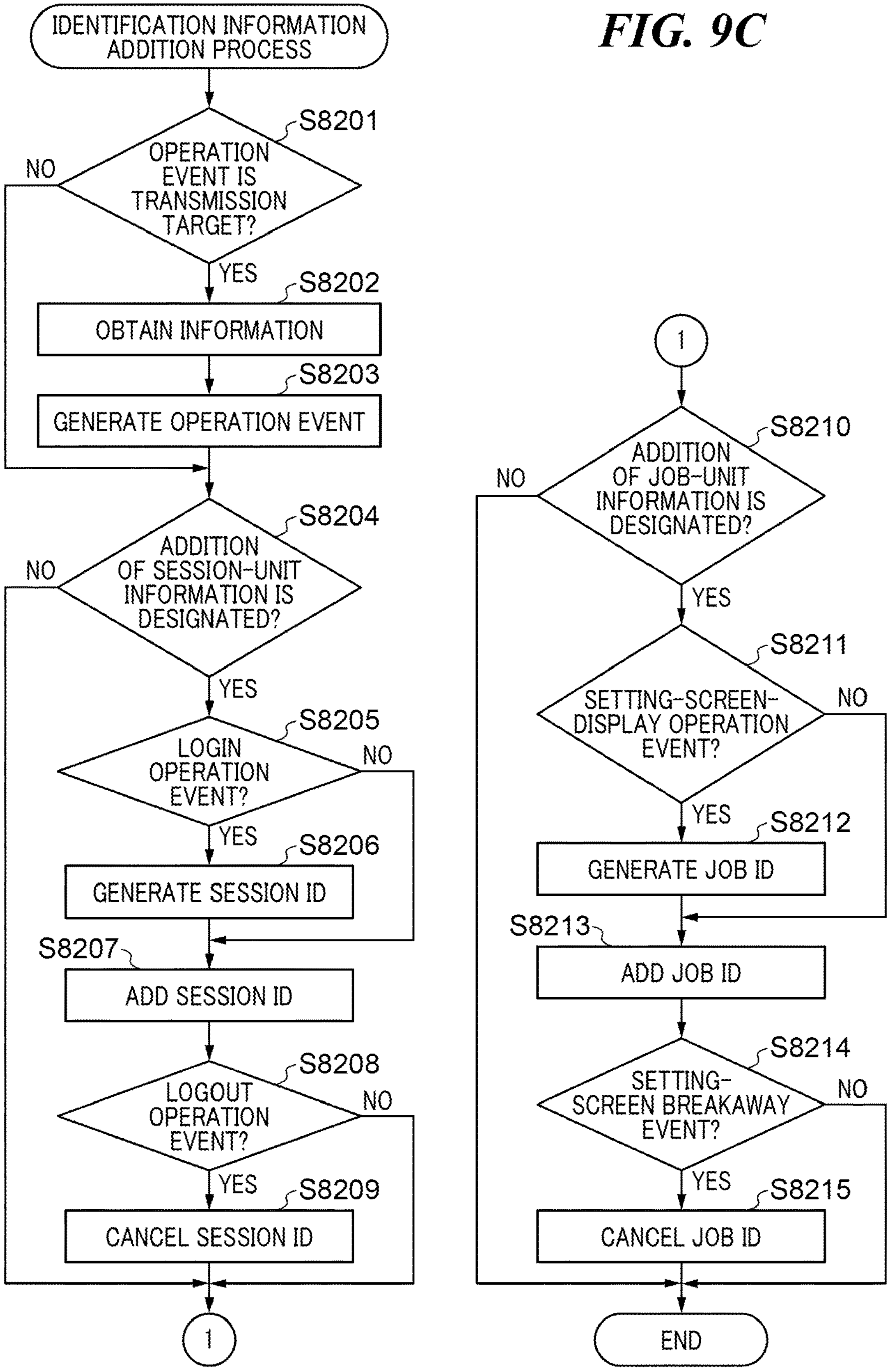
FIG. 9C is a flowchart showing a flow of an identification information addition process of the first embodiment executed in S8108 in FIG. 9B.

The event collection module 411 determines whether a setting of identification information addition is saved in the notification setting storage module 403 (S8107). At this time, the event collection module 411 determines to be YES in S8107, when one of a UserOperated event, UserOperatedInSession event, and UserOperatedInJob event in FIG. 7 is set to be notified. When determining to be YES in S8107, the event collection module 411 executes an identification information addition process (S8108). The identification information addition process is executed to add information for identifying a series of user operations that are given from login to logout as shown in FIG. 9C mentioned later. In the meantime, when determining to be NO in S8107, the event collection module 411 proceeds with the process to S8109 without executing the identification information addition process.

The event collection module 411 saves (memorizes) the generated event in the message buffer 412. Then, the event transmission module 413 transmits the information about the transmission events saved in the message buffer 412 as a log to the server 1120 through the network communication module 401 (S8109). A transmission event as a log may be transmitted for each event generation. Alternatively, transmission events may be collectively transmitted when an amount of transmission events reaches a fixed value. Then, the internal event notification process is finished. The MFP 1100 repeatedly executes the processing of FIG. 9B as needed.

FIG. 9C is a flowchart showing a flow of the identification information addition process executed in S8108 in FIG. 9B. The event collection module 411 determines whether the received internal event is an operation event of a transmission target (S8201). The event collection module 411 has held the information about an operation event of a transmission target beforehand. The operation event of the transmission target, which is a criterion of the determination of S8201, is an operation event that is generated by a user operation that is directly given to the touch panel 201. A screen change trigger event and a set value obtainment trigger event are not the transmission target. When determining to be NO in S8201, the event collection module 411 proceeds with the process to S8204. In the meantime, when determining to be YES in S8201, the event collection module 411 obtains information required to generate a transmission event from the received internal event (S8202). The information obtained is information to be added to the user name 7106, target 7107, and parameter 7108 in FIG. 8B, for example. Although these pieces of information may be added to the internal event itself, it may be obtained from the function applications 409 or the setting history holding module 410.

The event collection module 411 generates the operation event to be transmitted (S8203). The event collection module 411 may file the event information of each line in FIG. 8B by shaping into the JSON format etc. and may save it in the message buffer 412. Then, the event collection module 411 determines whether addition of session-unit information (session ID) is designated (S8204). The event collection module 411 determines to be YES in S8204, when a notification setting of a UserOperatedInSession event in FIG. 7 is saved in the notification setting storage module 403. When determining to be NO in S8204, the event collection module 411 proceeds with the process to S8210 from a terminal "1". When determining to be YES in S8204, the event collection module 411 determines whether the generated event is an operation event of the login operation like No. 2 in FIG. 8B (S8205).

When determining to be YES in S8205, the event collection module 411 generates a session ID (S8206). A session ID is generated for each login and is a unique ID that is not dependent on a user and a device. For example, a session ID is a UUID (Universally Unique Identifier). The event collection module 411 holds the generated session ID. Then, the event collection module 411 adds the held session ID to the generated event (S8207). When the generated event is an operation event, the event collection module 411 changes the event name to UserOperatedInSession at this time. When determining to be NO in S8205, the event collection module 411 proceeds with the process to S8207 without generating a session ID.

Next, the event collection module 411 determines whether the generated event is an operation event indicating a logout operation like No. 15 in FIG. 8B (S8208). When determining to be YES in S8208, the event collection module 411 cancels the held session ID (S8209). Then, the process proceeds to S8210 from the terminal "1". In the meantime, when determining to be NO in S8208, the event collection module 411 proceeds with the process to S8210 from the terminal "1" without performing the process of S8209.

Next, the event collection module 411 determines whether addition of job-unit information (job ID) is designated (S8210). The event collection module 411 determines to be YES in S8210, when a notification setting of a UserOperatedInJob event in FIG. 7 is saved in the notification setting storage module 403. When the event collection module 411 determines to be NO in S8210, the identification information addition process is finished. In the meantime, when determining to be YES in S8210, the event collection module 411 determines whether the generated event is an operation event of displaying a setting screen (S8211). The event collection module 411 determines to be YES in S8211, when the generated event is an operation event indicating transition to a setting screen like No. 5 in FIG. 8B.

When determining to be YES in S8211, the event collection module 411 generates a job ID (S8212). A job ID is a unique ID (for example, a UUID) generated for each unit that is from setting of a job to execution of the job. The event collection module 411 holds the generated job ID. Then, the event collection module 411 adds the held job ID to the generated event (S8213). In the meantime, when determining to be NO in S8211, the event collection module 411 proceeds with the process to S8213 without generating a job ID. When the generated event is an operation event, the event collection module 411 changes the event name into UserOperatedInJob.

Moreover, the event collection module 411 determines whether the generated event is a transition event (breakaway event) from a setting screen (S8214). The event collection module 411 determines to be YES in S8214, when the generated event is an operation event indicating transition from a setting screen due to execution of a job like No. 10 in FIG. 8B. The operation event indicating transition also includes not only an event due to execution of a job but also an event of transition to the smart home screen without executing a job. When determining to be YES in S8214, the event collection module 411 cancels the held job ID (S8215). Then, the identification information addition process is finished. When the event collection module 411 determines to be NO in S8214, the identification information addition process is finished.

Operation events are generated as mentioned above and the same session ID is added to a series of operation events from login to logout. Moreover, the same job ID is added to a series of operation events from setting of a job to execution of the job. Accordingly, a series of operations performed from login to logout and a series of operation from setting of a job to execution of the job can be extracted easily. This improves efficiency of analysis of a user's operation behavior to the MFP 1100 or analysis of screen operability.

Figure 10:
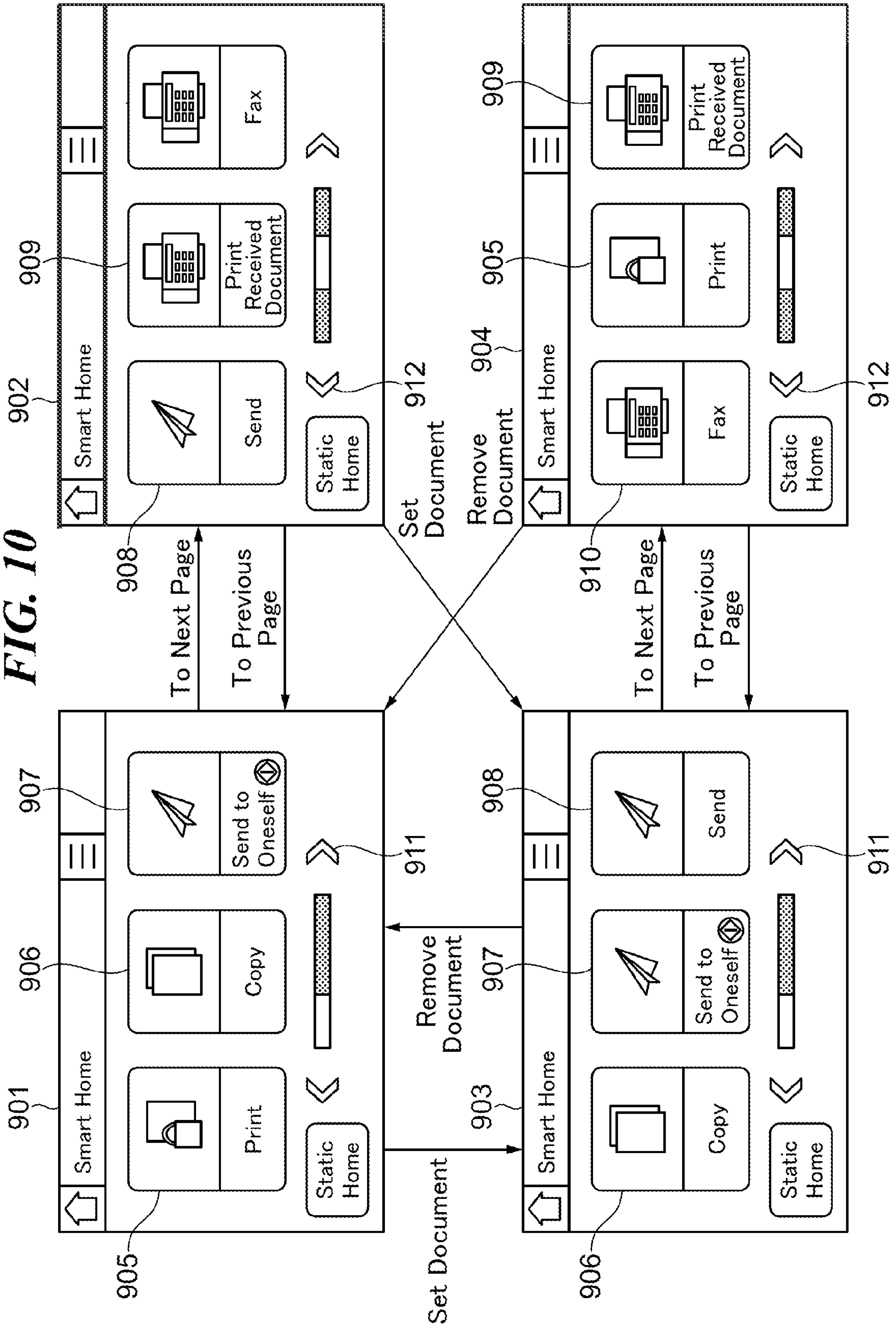
FIG. 10 is a view showing a first example of screen transition in the first embodiment.

Next, a dynamic change of a display screen displayed on the touch panel 201 of the operation unit 111 will be described. FIG. 10 is a view showing a first example of screen transition in the first embodiment. First page screens 901 and 903, and second page screens 902 and 904 in FIG. 10 are the smart home screens mentioned above. The dynamic change of the layout of the smart buttons according to a matter that is other than a direct user operation to the touch panel 201 will be described. The first page screen 901 is an initial screen displayed after a user performs a login operation. The second page screen 902 is a next page screen of the screen 901 displayed when a next page button 911 on the first page screen 901 is operated. Three smart buttons that are different from that on the first page screen 901 are displayed on the second page screen 902. Moreover, when a previous page button 912 on the second page screen 902 is operated, the first page screen 901 is displayed.

The first page screen 903 is displayed when a document is set on the ADF 1802 while the screen 901 or 902 is displayed on the touch panel 201. The second page screen 904 is a next page screen of the first page screen 903 displayed when the next page button 911 on the first page screen 903 is operated. Moreover, when the previous page button 912 on the second page screen 904 is operated, the first page screen 903 is displayed. Moreover, the first page screen 901 is displayed when the document is removed from the ADF 1802 while the screen 903 or 904 is displayed on the touch panel 201.

As shown in FIG. 10, the layouts of the smart buttons displayed on the screens 901 to 904 are different mutually. The arrangement of the smart buttons is changed dynamically. When a document is set on the ADF 1802, the CPU 101 recognizes that a user will execute a job accompanied by scan of the document, and the CPU 101 displays the smart buttons corresponding to the applications that execute jobs accompanied by scan on the first page screen. In the example in FIG. 10, the CPU 101 displays a copy button 906, a send-to-oneself button 907, and a send button 908 on the first page screen 903. The copy button 906 corresponds to an application that scans a document and prints scanned data. The send-to-oneself button 907 corresponds to the application that scans a document and sends scanned data to a user's terminal. The send button 908 corresponds to the application that scans a document and sends scanned data to another terminal. The send button 908 displayed on the second page screen 902 is moved to the first page screen 903. Moreover, a print button 905 displayed on the first page screen 901 is displayed on the second page screen 904.

As mentioned above, the CPU 101 guesses what a user does according to occurrence of a matter other than a direct user operation to the touch panel 201. And the CPU 101 changes the layout of the smart buttons dynamically so that the smart buttons suitable for the guess result may be displayed on the first page screen. Thereby, the user can execute a job efficiently in fewer procedures. A matter other than a direct user operation is not limited to the matter of the document setting on the ADF 1802 mentioned above. For example, a matter other than a direct user operation may be reception of facsimile by the MFP 1100. In this case, the CPU 101 displays a print-received-document button 909 on a first page screen. Moreover, when a print job of the user who logs in to the MFP 1100 is entered, the CPU 101 displays the print button 905 on a first page screen.

The screen change trigger event mentioned above indicates the above screen change. For example, the server 1120 can easily determine whether the screen change has been useful for the user by analyzing the screen change trigger event. It should be noted that the analysis may be conducted by an apparatus other than the server 1120. The server 1120 retrieves the DisplayChangeTriggerOccurred events that are screen change trigger events from the log shown in FIG. 8B. The events of No. 3 and No. 26 are the DisplayChangeTriggerOccurred events. Moreover, the events of No. 3 and No. 26 show that the screen changes are due to the ADF document setting. That is, it is recognized that the screen has been changed owing to a matter other than a direct user operation. It is understandable whether the screen change has been useful for the user by verifying an operation event just behind each of the events of No. 3 and No. 26.

In the case of the example of FIG. 8B, it is understood that the smart button has been selected from the contents of the event of No. 4 just behind the event of No. 3. Thereby, it can be analyzed that the layout change has been useful for the user because the smart button displayed on the screen immediately after changing the layout of the first page screen has been selected. In the meantime, the operation event of No. 27 just behind the event of No. 26 is an event of the button operation of the transition to the next page. Then, the operation event of No. 28 following the operation event of No. 27 is an event of the button operation of the transition to the previous page. In this case, it can be surmised that the user once performed the transition operation to the next page and performed the transition operation to the previous page because a target smart button was not displayed on the next page. Accordingly, it can be analyzed that the above-mentioned layout change of the screen has not been useful for the user.

As mentioned above, the information about the events in FIG. 8B includes the information about the events of No. 3 and No. 26 that are accompanied by the screen transition and the information about the following operation events. Thereby, it is easily analyzed whether the layout change of the smart buttons has been useful by extracting a screen change trigger event from the events and by checking the following operation event. That is, since the screen change trigger event is used in the first embodiment, it is easily analyzed whether the layout change of the smart buttons has been useful. If there is no screen change trigger event, analysis using the screen change trigger event is impossible. In such a case, it is difficult to determine whether the operated smart button is displayed by the layout change. Accordingly, the above-mentioned analysis becomes difficult.

Next, the trigger event process executed in S8104 in FIG. 9B will be described. FIG. 11 is a flowchart showing a flow of the trigger event process. The event collection module 411 determines whether the received internal event is a trigger event for changing operation screen (S1001). The event collection module 411 determines to be YES in S1001, when it is notified of an event that the position of the smart buttons on the smart home screen have been changed from one of the function applications 409. When the event collection module 411 determines to be NO in S1001, the trigger event process is finished.

When determining to be YES in S1001, the event collection module 411 obtains information required to generate a transmission event (S1002). The required information is information to be added to the operation content 7105, user name 7106, target 7107, and parameter 7108 in FIG. 8B. For example, the information determining whether the trigger matter of the operation screen change is the document setting on the ADF 1802 or the print job entry is obtained about the operation content 7105. Then, the event collection module 411 generates and saves the screen change trigger event that will be transmitted (S1003). The event collection module 411 files the event information like No. 5 in FIG. 8B by shaping into the JSON format etc. and saves it in the message buffer 412. After that, the trigger event process is finished.

As mentioned above, when the change of the operation screen display like the layout change of the smart buttons occurs owing to a matter other than a direct user operation, the operation screen change event is generated together with the information about the content that becomes the trigger of change. Accordingly, as mentioned above, it is verifiable whether the change of the operation screen display has been useful by analyzing the operation event following the operation screen change event.

Figure 12A:
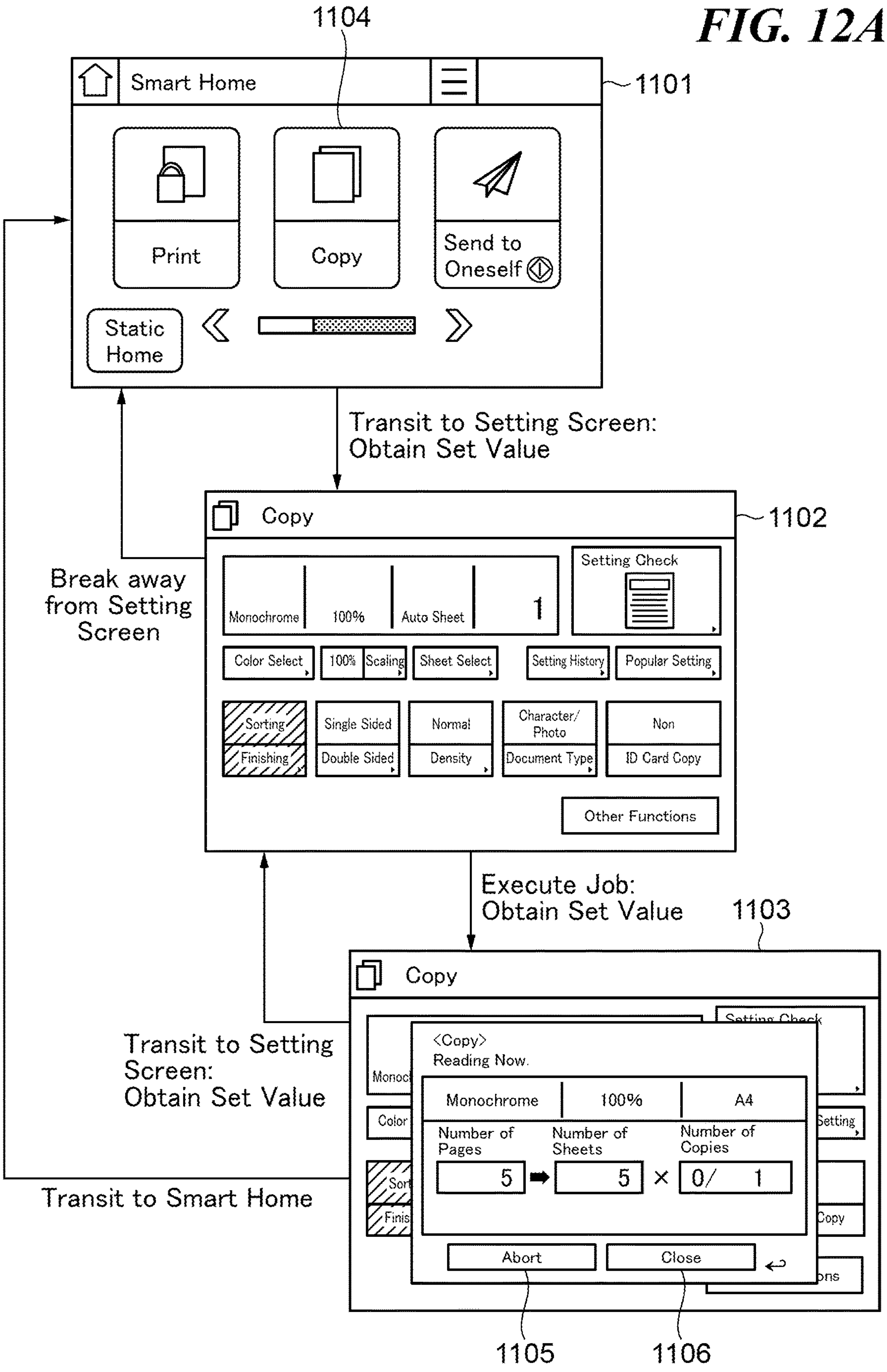
FIG. 12A is a view showing a second example of screen transition in the first embodiment.

Next, obtainment of set values at a time of transition of an application setting screen will be described. FIG. 12A is a view showing a second example of screen transition in the first embodiment. A screen 1101 is a smart home screen. A screen 1102 is a setting screen of the copy function displayed when a smart button 1104 of the copy function is operated on the screen 1101. In order to register (preset) a part of settings of the copy function, information that matches set values 1501C shown in FIG. 12B mentioned later is registered into the smart button 1104. When the smart button 1104 is operated, the set values 1501C matched are read. Then, the registered setting contents are applied to the copy function by notifying the copy function of the read information as the setting information, and transition to the screen 1102 occurs. There is no set value matched to a function button to which a part of settings is not preset. Accordingly, when such a function button is pressed, set values registered as default settings of the function are read and the function application is notified of the set values. Then, transition to a screen reflecting the set values occurs.

A screen 1103 for executing the copy job is displayed when the start key 203 is operated to instruct execution of the job while displaying the screen 1102. On the screen 1103, a dialog is displayed over the screen 1102 in an overlapped fashion. When a job abort key 1105 or a close key 1106 for closing the dialog under job execution is operated on the screen 1103, the CPU 101 causes screen transition of the screen displayed on the touch panel 201 to the screen 1102. Moreover, when the home key 209 mentioned above is operated while displaying the screen 1102 or the screen 1103, the CPU 101 causes screen transition of the screen displayed on the touch panel 201 to the screen 1101. When the screen transition from the screen 1101 to the screen 1102 occurs, the CPU 101 generates the SettingsSnapshottedAtTransition event. The CPU 1010 reads the job set values set to the copy function of the time of generation of the event, converts them into an event writable format, and adds them to the event. The set values are initial values of a time of starting the setting of the copy function. In this way, when a smart button is pressed, predetermined set values preset are added to an event in the first embodiment. When the copy button is pressed, the predetermined set values that are set as default settings are added to the event. It is the same in a case of screen transition from the screen 1103 to the screen 1102.

On the screen 1102, various settings, such as a setting about the number of copies, a setting about an output sheet, and a setting about a print layout, about the copy can be performed. When various kinds of setting buttons (for example, buttons for setting sorting) are operated while the screen 1102 is displayed, the CPU 101 generates the UserOperated events. By analyzing the generated UserOperated events in order, the functions set by the user and the order of the settings can be recognized.

When the user operates to instruct execution of a job by pressing the start key 203 outside the screen while the screen 1102 is displayed, the transition to the screen 1103 occurs and the job is executed according to set values 1502C that are finally determined contents. At this time, the CPU 101 saves the contents of the set values 1502C, which are settings of the executed job, as the setting history. Then, the CPU 101 generates the SettingsSnapshottedAtTransition event, reads the set values of the copy function saved when the event has been generated (specifically, reads the set values 1502C shown in FIG. 12B) from the setting history, converts them into the event writable format, and adds them to the event. These set values are the final set values of the time of actually executing the job after completing the setting of the copy function. The settings performed on the screen 1102 can be easily grasped by comparing the initial set values reported at the time of the transition to the screen of the copy function with the final set values of the time of executing the job.

In the example of FIG. 8B, the settings by the user on the application setting screen are easily analyzed by comparing the set values added to the SettingsSnapshottedAtTransition events of No. 5 and No. 10. This is the same for the SettingsSnapshottedAtTransition events of No. 30 and No. 34. For example, this is particularly useful in a case where the analysis of the order of settings is unnecessary and the settings that the user performed or the user did not perform are analyzed. Although the example about the copy function has been described above, the same process can be applied to cases of other functions, such as a transmission function and a print function.

FIG. 12B is a view showing a part of set values obtained for each screen in the first embodiment. The set values in FIG. 12B are recorded in a format that matches the set values with the setting items of the copy function, transmission function, and print function. The setting history holding module 410 saves the set values as one configuration that summarizes a plurality of setting items reported as settings of one job. The set values 1501C are setting contents of the set values matched with the smart button 1104. When the smart button 1104 is pressed, the matched set values 1501C are read and are reported to the copy function, and the setting contents of the set values 1501C are applied. The set values 1501C include the set values matched with the smart button 1104 and the other set values relevant to the copy function. The set values 1502C are a part of set values saved in the setting history holding module 410 as the setting history of the time of the transition to the screen 1103 in response to a user's instruction to execute a job on the screen 1102.

Next, the screen-set-value obtainment process executed in S8106 in FIG. 9B will be described. FIG. 13 is a flowchart showing a flow of the screen-set-value obtainment process. The event collection module 411 determines whether the received internal event is a transition event to a setting screen (S1201). The event collection module 411 sets up so as to receive a notification of transition to each application setting screen as an event from the function application platform 408 that controls switching of a screen. Then, the event collection module 411 determines to be YES in S1201, when the notified event is a transition event to a setting screen.

When the event collection module 411 determines to be YES in S1201, the process proceeds to S1203. When determining to be NO in S1201, the event collection module 411 determines whether the received internal event is an event for a job start instruction (S1202). The event collection module 411 sets up so as to receive a notification of a job reception event from the job control module 406 or sets up the function applications 409 so as to receive a notification of a job execution instruction as an event. Then, the event collection module 411 determines to be YES in S1202, when the notified event is the event for the job start instruction mentioned above.

When the event collection module 411 determines to be NO in S1202, the screen-set-value obtainment process is finished. In the meantime, when determining to be YES in S1202, the event collection module 411 obtains set values required to generate a transmission event (S1203). The set values are added to the user name 7106, operation content 7105, target 7107, and parameter 7108 in FIG. 8B, and are mainly added to the parameter 7108 to execute the job. The set values set to the job among the information are determined according to the internal event that the event collection module 411 receives. When the internal event is a setting-screen transition event with a preset setting, the matched set values are obtained. When the internal event is a setting-screen transition event without a preset setting, default job set values of a function of transition destination are obtained. When the internal event is an event of a job start instruction, the job set values recorded in connection with the job start instruction are obtained from the setting history holding module 410. The event collection module 411 generates information by converting the obtained set values into the format of the event (set-value obtainment event) that will be transmitted and saves the information (S1204). Then, the screen-set-value obtainment process is finished.

At this time, the event collection module 411 reads the job set values that are obtained in S1203 and can be used as preset settings of the job. Then, the event collection module 411 converts each of the job set values into a combination of each setting item and a set value and saves the combination in order to convert the set values into the format that can be output as an event. For example, since a job set value is configured to have a function, a layer of a setting item, and a value of the setting item in the XML format as shown in FIG. 12B, the function and the layer of the setting item are combined to be converted into an item corresponding to the target 7107. Then, the job set values are recorded so as to become values of the item corresponding to the parameter 7108. When the set values 1501C are converted, the target 7107 of the item that designates the job function is converted into "FUNCTIONTYPE" and the parameter 7108 is converted into "Copy". A job setting item of each function thereafter is converted so as to become a group of the target 7107 that is connected to the layer of the setting item and the parameter 7108 of the set value for each set value.

For example, in the set values 1501C, the target 7107 is converted into "COLOR_MODE.COLOR_MODE" and the parameter 7108 is converted into "BLACK_AND_WHITE". The above-mentioned set-value obtainment event is output by shaping the information collected to be written in an event and the information that is converted from the job set values in S1203 into a single format as the event of No. 5 or No. 10 in FIG. 8B. At this time, the event may be filed and saved in the message buffer 412. Then, the screen-set-value obtainment process is finished. It should be noted that the conversions of the set value and setting item in S1204 may hold the layered structure as the format after the conversions. For example, the target 7107 and parameter 7108 may be expressed by the layered structure in the format of "COLOR_MODE: {COLOR_MODE:"BLACK_AND_WHITE"}".

As mentioned above, the set values of the time of transition of each application setting screen and the set values of the time of execution of the job are saved in the single format while associating with the set value and setting item. The contents that the user sets up on the setting screen are easily identified without analyzing the operation events by comparing the values of the same setting item of the saved events. Moreover, when the job set values are recorded in the common format to the other events, the data including the events are easily analyzed. As a result, the efficiency of analyses, such as recommendation settings to a user, improves.

Figure 14:
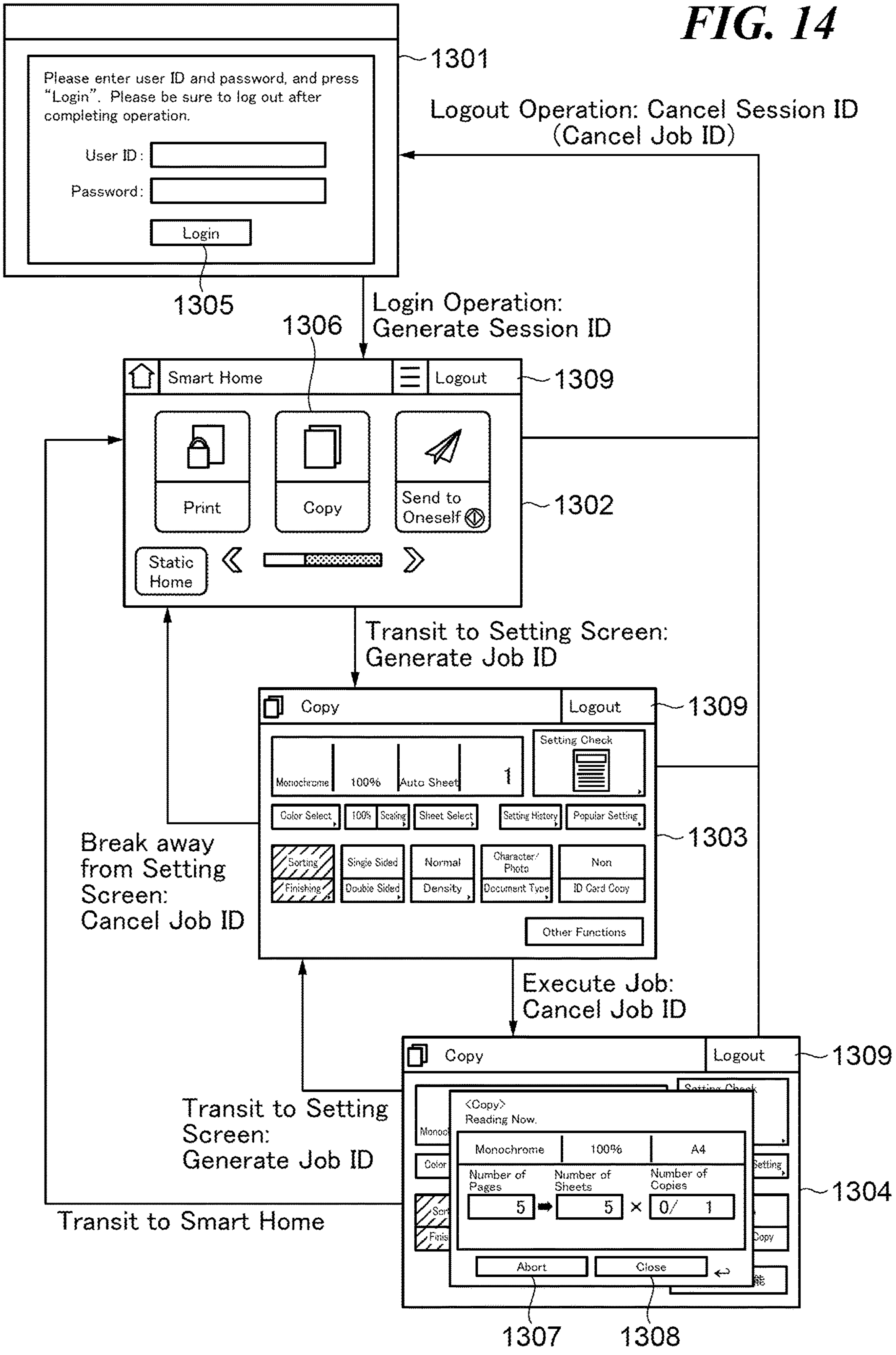
FIG. 14 is a view showing a third example of screen transition in the first embodiment.

Next, addition of an ID will be described. FIG. 14 is a view showing a third example of screen transition in the first embodiment. A screen 1301 is a screen for logging in to the MFP 1100. On the screen 1301, authentication information including a user ID and a password can be entered. When a login button 1305 is operated after entering the authentication information, authentication is performed. When the authentication succeeded, the transition of the displayed screen to a screen 1302 occurs. When the authentication failed, the screen 1301 is displayed again to urge reentry of the authentication information including a user ID and a password.

A screen 1302 is a screen where a logout button 1309 is added to the screen 1101 (smart home screen) in FIG. 12A. A smart button 1306 is equivalent to the smart button 1104 in FIG. 12A. A screen 1303 is equivalent to the screen 1102 (copy setting screen) in FIG. 12A. A screen 1304 is a screen where the logout button 1309 is added to the screen 1103 (job execution screen) in FIG. 12A. A job abort key 1307 and a close key 1308 are respectively equivalent to the job abort key 1105 and a close key 1106 in FIG. 12A. The transition conditions of the respective screens are the same as that of the screens in FIG. 12A. Moreover, when logout is performed by pressing the ID key 207 or the logout button 1309 on one of the screens 1302, 1303, and 1304, the screen transition of the displayed screen to the screen 1301 occurs. When login is executed on the screen 1301, a session ID is generated, and the same session ID is added to subsequent operation events until logout is executed. Moreover, the generated session ID is added to all operation events generated until the session ID is canceled by executing the logout process. Thereby, a series of operations between the user's login and logout are specified by the session ID.

Values of the session ID are different for every login. For example, a session ID "A001" is added to the events from No. 2 to No. 15 in the example of FIG. 8B. In the meantime, a different session ID "C003" is added to the events of No. 26 to No. 40 in spite of the same user's login. Thereby, the events between login and logout are specified as one unit by the session ID. When the screen transition from the screen 1302 or 1304 to the screen 1303 occurs, a job ID is generated. The same job ID is added to all operation events on the screen 1303. Moreover, the job ID is canceled when the screen transition to the screen 1304 by executing a job on the screen 1303 or the screen transition to the screen 1301 or 1302 occurs. Furthermore, whenever the screen transition to the screen 1303 occurs, a new job ID is generated. Thereby, the user operations for executing the job on the application setting screen are specified easily for every job.

Figure 15:
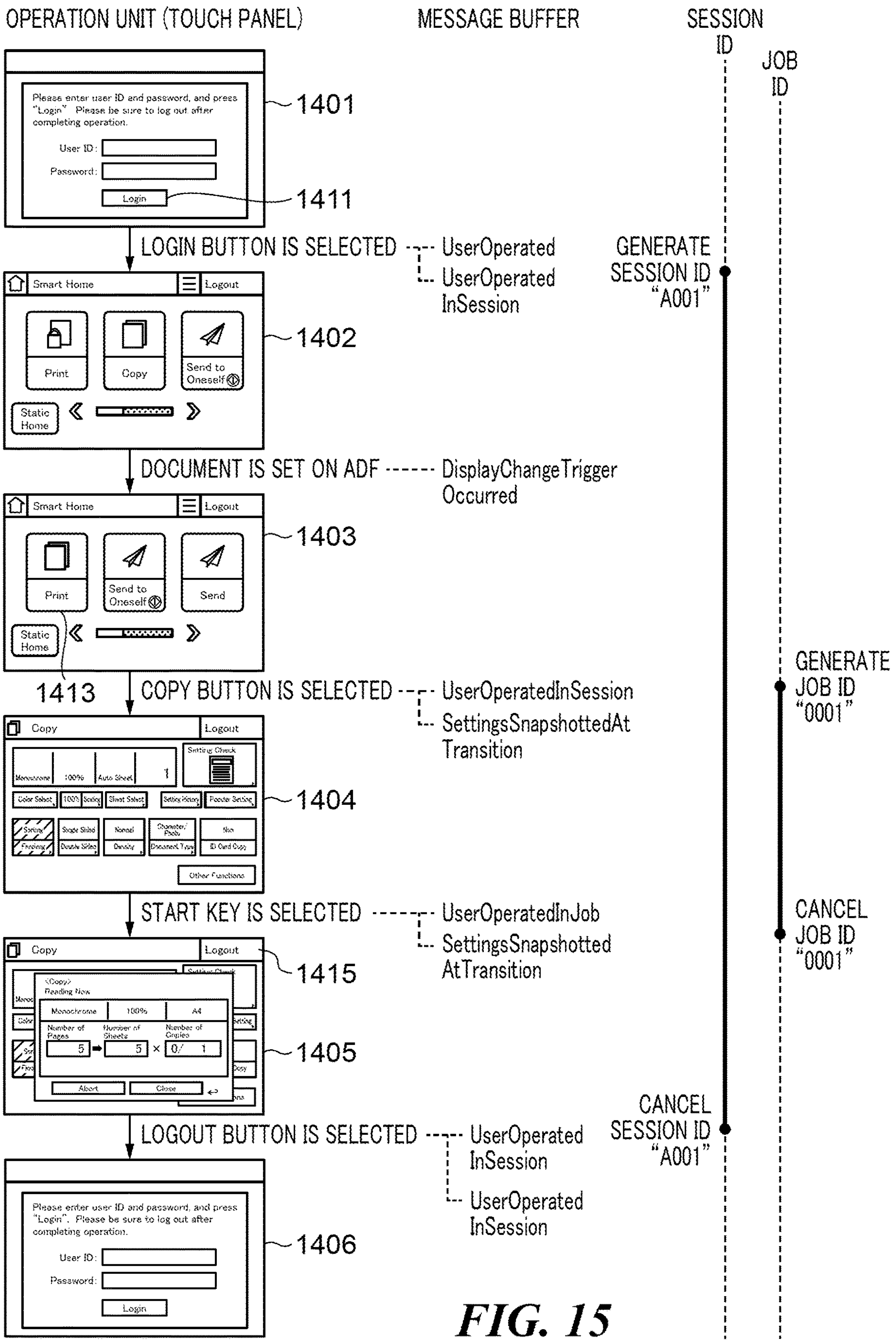
FIG. 15 is a view showing screen transition corresponding to user operations and generation/cancellation of information corresponding to the screen transition in the first embodiment.

Next, transitions of the screens displayed on the touch panel 201 of the operation unit 111, and generation/cancellation of information in accordance with screen transitions will be described. FIG. 15 is a view showing the screen transitions in response to the user operations and generation/cancellation of information of the time of the screen transitions in the first embodiment. FIG. 15 shows the event name stored in the message buffer 412, the session ID held by the event collection module 411 holds, and the job ID as the information. FIG. 15 shows an example in which the events of No. 1 to No. 10, No. 14, and No. 15 in FIG. 8B are saved in the message buffer 412.

When a user ID and password are entered and a login button 1411 is operated on a screen 1401 for login, the authentication is performed. The authentication shall succeed in this description. At this time, the event collection module 411 is notified of a login event. The event collection module 411 generates a session ID "A001". Moreover, the event collection module 411 generates the UserOperated event of No. 1 and the UserOperatedInSession event of No. 2 in FIG. 8B. Then, the event collection module 411 adds the session ID "A001" to the information about each of the generated events and saves it in the message buffer 412. When the authentication succeeded, a screen 1402 (smart home screen) is displayed on the touch panel 201.

When setting of a document on the ADF 1802 is detected in a state where the screen 1402 is displayed, the event collection module 411 is notified of a screen change trigger event. The event collection module 411 generates the DisplayChangeTriggerOccurred event of No. 3, adds the session ID "A001", and saves it in the message buffer 412. Moreover, a screen 1403 in which the layout of the smart buttons is changed is displayed in response to the notification of the screen change trigger event. When a copy button 1413 is operated in a state where the screen 1403 is displayed, the event collection module 411 is notified of a button operation event. The event collection module 411 generates the UserOperatedInSession event of No. 4, adds the session ID "A001", and saves it in the message buffer 412. The event collection module 411 generates a job ID "0001".

Next, the event collection module 411 generates the SettingSnapthottedAtTransition event of No. 5, adds the session ID "A001" and the job ID "0001", and saves it in the message buffer 412. Then, the screen 1404 for setting the copy function is displayed on the touch panel 201.

When a double-sided setting button, a double-sided button, and an OK button are operated in a state where the screen 1404 is displayed, the event collection module 411 generates the UserOperatedInJob events of No. 6 to No. 8. Then, the event collection module 411 adds the session ID "A001" and the job ID "0001" to the information about each of the generated events and saves it in the message buffer 412. After that, when the start key 203 is operated, the event collection module 411 is notified of the event of the job execution instruction. The event collection module 411 generates the UserOperatedInJob event of No. 9 and the SettingSnapthottedAtTransition event of No. 10. The event collection module 411 adds the session ID "A001" and the job ID "0001" to the information about each of the generated events and saves it in the message buffer 412. Then, the event collection module 411 cancels the job ID "0001" held. At this time, the screen 1404 for setting the copy job is displayed on the touch panel 201.

When a logout button 1415 is operated in a state where the screen 1405 is displayed, the event collection module 411 is notified of a logout event. The event collection module 411 generates the UserOperatedInSession event of No. 14 and the UserOperatedInSession event of No. 15. Then, the event collection module 411 adds the session ID "A001" to the information about each of the generated events and saves it in the message buffer 412. Then, the event collection module 411 cancels the session ID "A001". A screen 1406 for login is displayed on the touch panel 201. The screen 1406 is the same as the screen 1401. As mentioned above, the screen transition on the touch panel 201 occurs by interlocking with the user operation to the touch panel 201, the information about the event is saved in the message buffer 412, and the session ID and job ID are generated and canceled.

In the example of FIG. 8B, the events from No. 5 to No. 10 are a series of operation events performed to the job execution. And the events from No. 30 to No. 34 are another series of operation events. This is specified from the job ID. Accordingly, the operations and their order between the user's login to the MFP 1100 and its logout can be specified easily. Moreover, the operations performed for each job are also specified easily. Thereby, the efficiency of analysis about settings performed by the user is improved.

As mentioned above, the smart buttons are operation objects. When the user operates a smart button, a predetermined function corresponding to the smart button starts. As mentioned above, the events from No. 5 to No. 10 are a series of operation events and correspond to the information about the operations performed between the start and end of the predetermined function. In the meantime, the events from No. 2 to No. 4 correspond to the information preceding the start of the predetermined function. Then, the same session ID "A001" is added to the information about each of the events from No. 2 to No. 10 and is stored. That is, the information about the operations performed between the start and end of the predetermined function and the information about the operations preceding the start of the predetermined function can be stored while associating them to each other.

In the first embodiment, the MFP 1100 manages the information about a screen change trigger event by which a screen is changed and an event relevant the screen change trigger event as history information (the log shown in FIG. 8B) about operations. In the example of FIG. 8B, the same session ID is added to the event about a series of operations performed between a login operation and a logout operation. Then, the history information of each event is managed as a log. That is, the MFP 1100 stores the information about the operations that are performed between the start and end of the predetermined function and the information about the operations preceding the start of the predetermined function while associating them to each other. Thereby, the information about the operations preceding start of usage of a function can be managed while associating with the information about the operations performed between the start and end of usage of the function. Accordingly, even if a user action may be affected by a factor preceding an operation of the predetermined function, user operations can be analyzed while including its effect.

Moreover, as mentioned above, the history information of each event is managed as the log. The predetermined set values preset to the smart button that the user presses are added to the event in the common format to another information. That is, the information about the operations performed between the start and end of usage of the function and the information about the set values preset at the time the start of the predetermined function are stored while associating them to each other by unifying them into one format. Thereby, the information between the start and end of usage of the function is managed while associating with the information about the set values preset at the time of the start of the usage of the function. Accordingly, the log that considers the set values preset at the time of the start of the usage of the function and the set values of the time of the execution can be analyzed easily.

Next, a second embodiment will be described. The second embodiment differs from the first embodiment in the timings of generation and cancellation of the session ID set to the event. Since the other portions are common to the first embodiment, descriptions about the overlapping portions are omitted. In the second embodiment, when a user who logs in to the MFP 1100 and executes a job executes another job without logging out, an event is saved in accordance with a user operation and the execution of the job. When the user executes different jobs while logging in to the MFP 1100, operations from the login operation by the user until starting the first job become a series of operations. Then, operations performed after completion of the execution of the first job until starting the second job become a following series of operations.

In the second embodiment, the event collection module 411 generates a session ID that uniquely identifies a series of operations when the login operation event occurs, and then holds the generated session ID until executing the job. Moreover, the event collection module 411 adds the held session ID to the information about the events relating to all the operations subsequent to the occurrence of the login operation event until executing the job. Then, when the job is executed, the event collection module 411 cancels the held session ID and generates a new session ID. The newly generated session ID is an unused ID that is different from the cancelled session ID. Then, whenever a job is executed, the event collection module 411 cancels the held session ID and newly generates an unused session ID. When the logout operation is performed, the event collection module 411 cancels the held session ID and newly generates an unused session ID.

FIG. 16 is a view showing an example of an event log in a system of the second embodiment. The event log of FIG. 16 shows an example where two jobs are entered after performing the login operation and where the logout operation is further performed. Although the items (from the event name 7101A to the parameter 7108A) of the log in FIG. 16 are the same as the items (from the event name 7101 to the parameter 7108) in FIG. 8B, the contents of the respective items differ. The log as shown in FIG. 16 is saved in the message buffer 412 and then, is transmitted to the server 1120.

Figure 17:
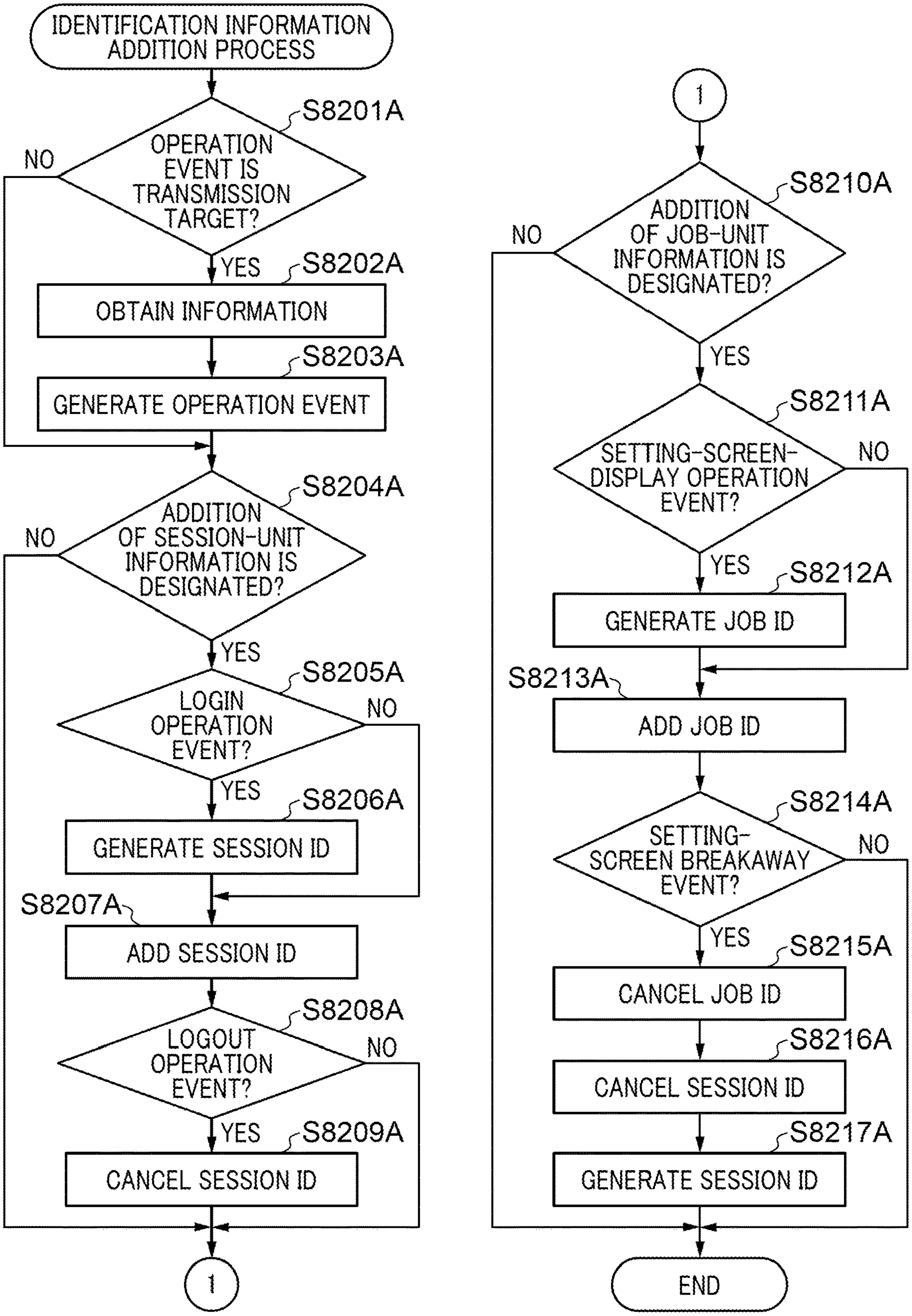
FIG. 17 is a flowchart showing a flow of an identification information addition process of the second embodiment.

FIG. 17 is a flowchart showing a flow of an identification information addition process of the second embodiment. The identification information addition process of FIG. 17 is executed in S8108 in FIG. 9B in the second embodiment. Since the processes from S8201A to 58215A in FIG. 17 are the same as the processes from S8201 to S8215 in FIG. 9C, their descriptions are omitted. The event collection module 411 determines to be YES in S8214A, when the generated event is an operation event indicating transition from a setting screen due to execution of a job like No. 7 in FIG. 16. That is, the event collection module 411 determines to be NO in S8214A, when the generated event is not accompanied by execution of a job. In such a case, the identification information addition process is finished.

After cancelling the job ID in S8215A, the event collection module 411 cancels a session ID if holding the session ID (S8216A). Then, the event collection module 411 newly generates a session ID for managing the following operation (S8217A). A newly generated session ID is used to manage a series of operations concerning the second job after entering the first job, and is a unique ID that is independent of a user, a device, etc. A newly generated session ID may be an ID of the same system as the UUID. Accordingly, a newly generated session ID is an unused ID. The event collection module 411 holds the generated session ID. Then, the identification information addition process is finished.

Figure 18:
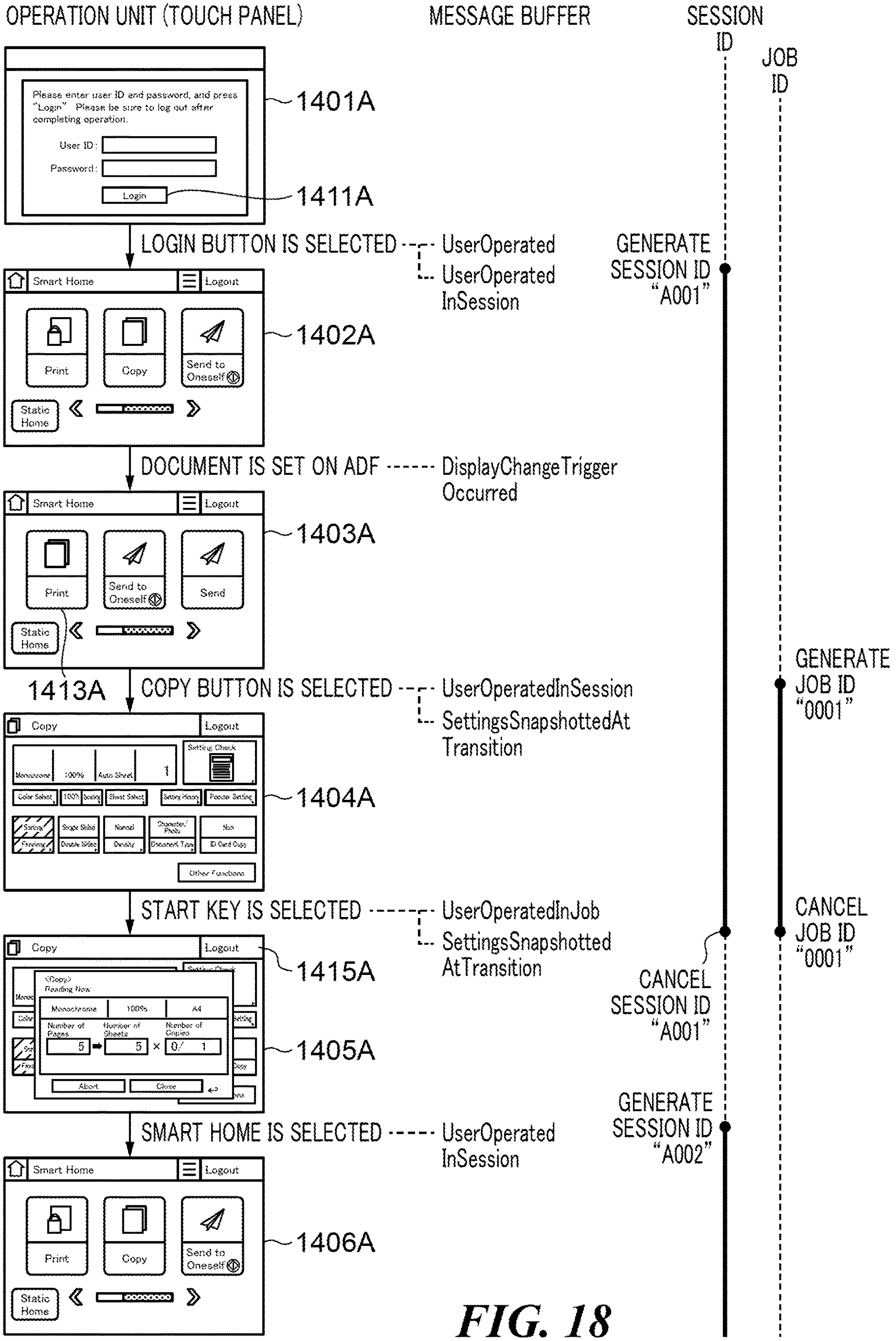
FIG. 18 is a view showing screen transition corresponding to user operations and generation/cancellation of information corresponding to the screen transition in the second embodiment.

FIG. 18 is a view showing screen transition and generation/cancellation of information corresponding to the screen transition in the second embodiment. Events shown in FIG. 18 respectively correspond to the events from No. 1 to No. 11 in FIG. 16. The screen transition from a screen 1401A for login to a screen 1404A for setting of the copy function, and generation/cancellation of the information are the same as that from the screen 1401 to the screen 1404 in FIG. 15 of the first embodiment. When the start key 203 is operated (selected) in a state where the screen 1404A is displayed, the event collection module 411 is notified of an event of a job execution instruction. The event collection module 411 generates the UserOperatedInJob event of No. 6 and the SettingSnapthottedAtTransition event of No. 7 and saves information about the generated event in the message buffer 412.

After the SettingSnapthottedAtTransition event of No. 7 is generated, the execution of the job starts. Then, the event collection module 411 cancels the job ID "0001" and the session ID "A001" that are held. Moreover, a screen 1405A for executing the copy job is displayed on the touch panel 201. The screens 1402A through 1405A include a logout button 1415A for a logout operation.

When the home key 209 is operated in a state where the screen 1405A is displayed, the event collection module 411 is notified of a screen transition event. The event collection module 411 generates a new session ID "A002". Moreover, the event collection module 411 generates the UserOperatedInSession event of No. 11 and saves information about the generated event in the message buffer 412. After this, when generating an event accompanied by an operation, the event collection module 411 adds the session ID "A002" held to the generated event. Then, a screen 1406A (smart home screen) is displayed on the touch panel 201.

In the second embodiment, when a plurality of jobs are entered in the state where the user is logging in, the MFP 1100 adds the same session ID to the information about the operation events that are the series of operation events from an advanced operation of each job to the entry of the job. Moreover, the MFP 1100 add the same job ID to the information about a series of operation events from start of a job setting to execution of the job. Accordingly, even when a plurality of jobs are entered during user's one login, the information about user operations to each job and the information about user operations from start of a job setting to execution of the job are extracted easily. Thereby, when the user operation history of the MFP 1100 is analyzed, the analysis of the operation history for each user and the analysis of the operation history for each job become easy. Accordingly, the screen operability is efficiently analyzable.

As shown in FIG. 16, the event collection module 411 does not add session ID to the information about the events of No. 8 to No. 10 and the information about the events of No. 18 to No. 20. Each of the events of No. 8 and No. 18 indicates that a job is entered. Each of the events of No. 9 and No. 19 indicates that execution of the job starts. Each of the events of No. 10 and No. 20 indicates that the job is completed. Accordingly, the events of No. 8 to No. 10 and No. 18 to No. 20 do not relate to an operation. The event collection module 411 does not add a session ID to the information about an event that does not relate to an operation. This point is common to the first embodiment and a third embodiment.

Next, a third embodiment will be described. The third embodiment differs from the first and second embodiments at a point where the MFP 1100 does not perform authentication using the user management function. Since the other portions are common to the first embodiment, descriptions about the overlapping portions are omitted. In the third embodiment, the MFP 1100 is operable by a user without displaying the login screen on which a user ID and a password are entered on the touch panel 201. Moreover, since the third embodiment does not perform authentication using the user management function, the MFP 1100 recognizes operations from start of user operations to the operation unit 111 to completion of the user operations as a series of operations by the user. A session ID that identifies a series of operations uniquely is generated when the user starts operations and is canceled when the operations are completed.

In the third embodiment, the MFP 1100 recognizes the start of user operations, when restoring from the sleep state. The MFP 1100 may recognize the start of the user operations, when the operation unit 111 accepts an operation after clearing the screen because no operation is accepted in a fixed period. Moreover, the MFP 1100 recognizes the completion of the user operations, when it transits to the sleep state. The MFP 1100 may recognize the completion of the user operations, when the screen is cleared because no operation is accepted in the fixed period.

FIG. 19 is a view showing an example of an event log in a system of the third embodiment. The event log of FIG. 19 shows an example where a job is entered after restoring from the sleep state and where the MFP 1100 again transits to the sleep state. Although the items (from the event name 7101B to the parameter 7108B) of the log in FIG. 19 are the same as the items (from the event name 7101 to the parameter 7108) in FIG. 8B, the contents of the respective items differ. Since user authentication is not performed in the third embodiment, a user name is not specified. Accordingly, no information is set up to the user name 7106B of each event in the log of FIG. 19. The log as shown in FIG. 19 is saved in the message buffer 412 and then, is transmitted to the server 1120.

Figure 20:
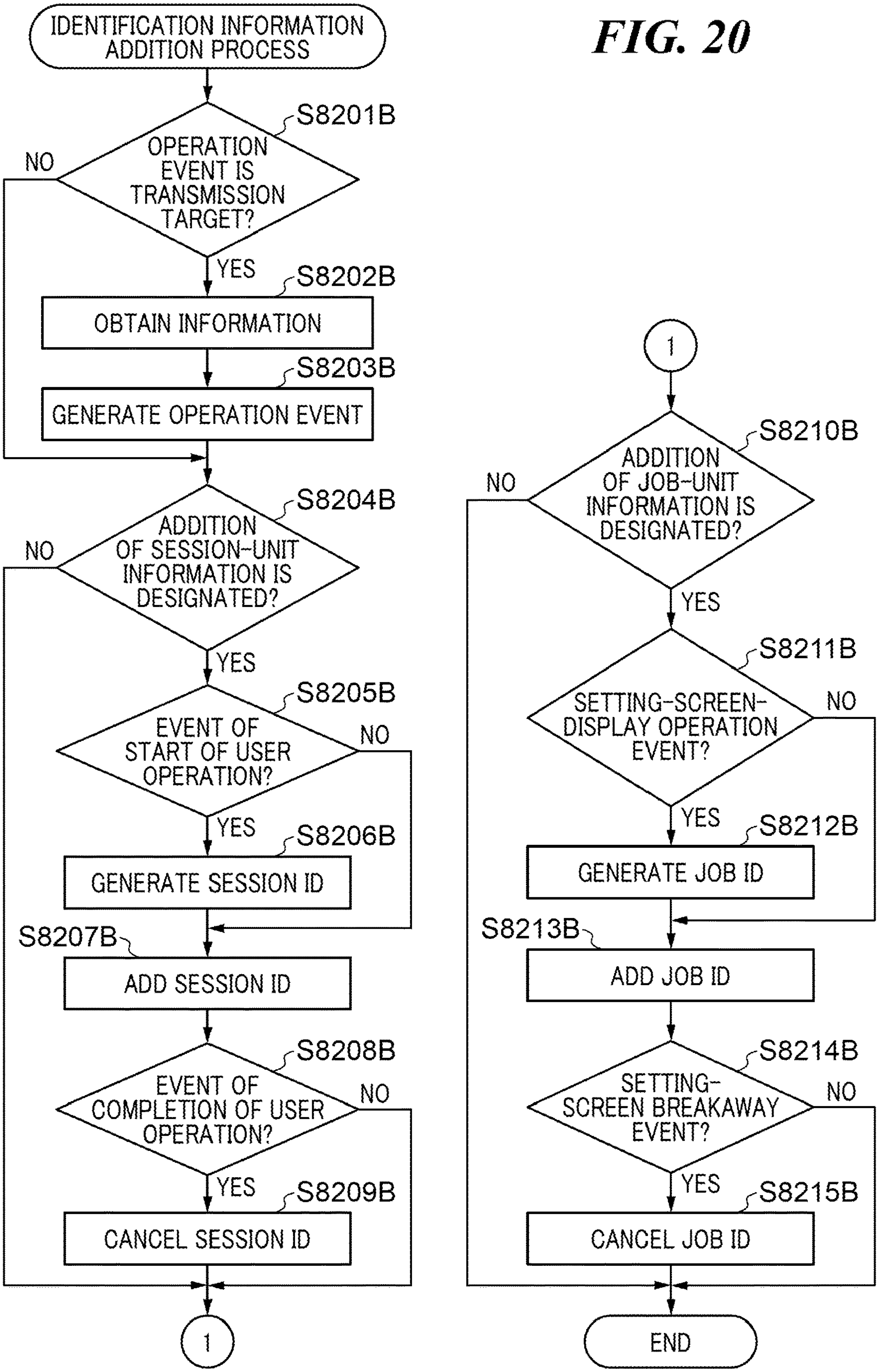
FIG. 20 is a flowchart showing a flow of an identification information addition process of the third embodiment.

FIG. 20 is a flowchart showing a flow of an identification information addition process of the third embodiment. The identification information addition process of FIG. 20 is executed in S8108 in FIG. 9B in the third embodiment. Processes in S8201B through S8204B are respectively identical to the processes in S8201 through S8204 in FIG. 9C in the first embodiment. When determining to be YES in S8204B, the event collection module 411 determines whether the generated event is an event of start of a user operation (S8205B). When the generated event is the event of start of the user operation like the event of No. 3 in FIG. 19, the event collection module 411 determines to be YES in S8205B. When determining to be YES in S8205B, the event collection module 411 proceeds with the process to S8206B. In the meantime, when determining to be NO in S8205B, the event collection module 411 proceeds with the process to S8207B. Processes in S8206B and S8207B are respectively identical to the processes in S8206 and S8207 in FIG. 9C in the first embodiment.

After the process of S8207B is performed, the event collection module 411 determines whether the generated event is an event of completion of the user operation (S8208B). When the generated event is an event for transition to the sleep state like the event of No. 13 in FIG. 19, the event collection module 411 determines to be YES in S8208B. When determining to be YES in S8208B, the event collection module 411 proceeds with the process to S8209B. In the meantime, when determining to be NO in S8208B, the event collection module 411 proceeds with the process to S8210B from a terminal "1". Processes in S8209B through S8215B are respectively identical to the processes in S8209 through S8215 in FIG. 9C in the first embodiment. Then, the identification information addition process is finished.

Figure 21:
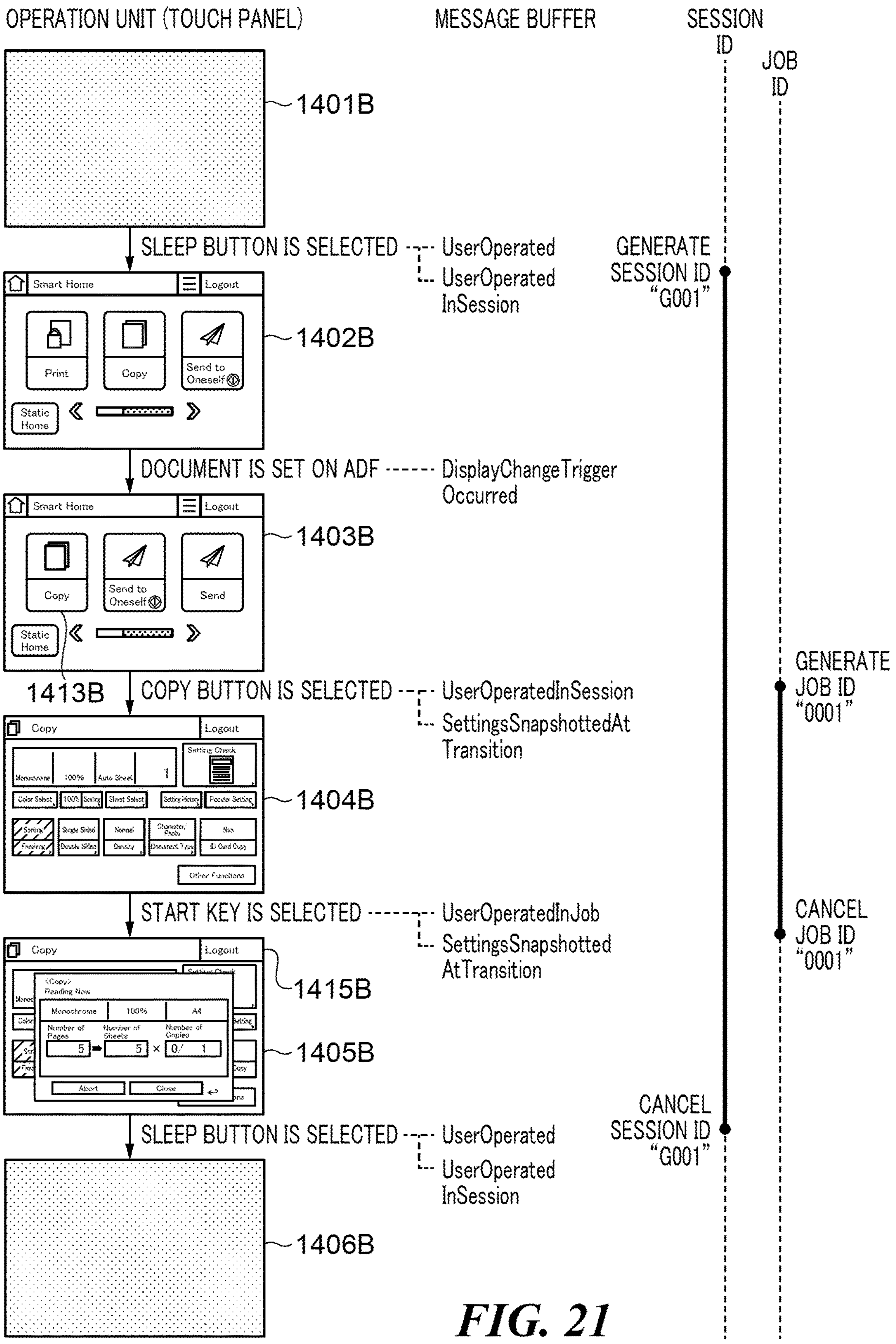
FIG. 21 is a view showing screen transition corresponding to user operations and generation/cancellation of information corresponding to the screen transition in the third embodiment.

FIG. 21 is a view showing screen transition and generation/cancellation of information corresponding to the screen transition in the third embodiment. Events shown in FIG. 21 respectively correspond to the events of No. 1 to No. 8, No. 12, and No. 13 in FIG. 19. A screen 1401B shows a sleep screen displayed on the touch panel 201 in the sleep state. When the sleep button 210 is operated in the state where the sleep screen is displayed, a restoration process from the sleep state is performed and the event collection module 411 is notified of a restoration event from the sleep state. The event collection module 411 generates a session ID "G001" and holds the generated session ID. The event collection module 411 generates the UserOperated event of No. 1 and the DeviceSleepReverted event of No. 2 in FIG. 19, and saves the information about the generated events in the message buffer 412. The event collection module 411 generates the UserOperatedInSession event of No. 3, adds the session ID "G001" to the generated event, and saves it in the message buffer 412. When the MFP 1100 is restored from the sleep state, a screen 1402 (smart home screen) is displayed on the touch panel 201. The screen transition from the screen 1402B to a screen 1405B for setting up the copy function and the transition of the information are the same as that of the first embodiment. The event collection module 411 holds the session ID "G001" and adds the held session ID "G001" to information about an event concerning an operation.

When the sleep button 210 is operated in a state where the screen 1405B is displayed, the event collection module 411 is notified of a sleep transition event. The event collection module 411 generates the UserOperated event of No. 12 in FIG. 19 concerning the operation of the sleep button. The event collection module 411 generates the UserOperatedInSession event of No. 13 in FIG. 19, adds the session ID "G001", and saves it in the message buffer 412. Then, the event collection module 411 cancels the held session ID "G001". Then, a screen 1406B (sleep screen) is displayed on the touch panel 201. The screens 1406B is displayed in the sleep state as with the screen 1401B.

In the third embodiment, the same session ID is added to a series of operation events generated between the restoration operation of the MFP 1100 from the sleep state and the transition operation to the sleep state. Thereby, even when the user authentication is not performed, all the user operations and the operations performed from the job setting to the execution of the job are extracted easily. When the restoration operation from the sleep state is performed, it can be assumed that a user who operates the MFP 1100 has been switched. In this case, since the session ID is changed, the operation history of each user is stored. Accordingly, the operation behavior to the MFP 1100 of each user is analyzed easily, and the screen operability is analyzed efficiently.

Next, a fourth embodiment will be described. The fourth embodiment differs from the first, second, and third embodiments in contents of a screen-set-value obtainment process executed in S8106 in FIG. 9B. Since the other portions are common to the first embodiment, descriptions about the overlapping portions are omitted. In the fourth embodiment, when the screen transition from the screen 1101 that is the smart home screen shown in FIG. 12A to each application setting screen (the setting screen 1102, for example) occurs, no event is generated but the information that indicates the job set values set to the screen 1102 is temporarily stored in the RAM 102 etc. Moreover, the same process is performed also when the screen transition from the job executing screen (screen 1103, for example) to the screen 1102 occurs. Next, when a user changes the set values set to the screen 1102 and instructs to execute the job, the screen transition from the screen displayed on the operation unit 111 to the screen 1103 occurs, and the SettingsSnapshottedAtTransition event is generated. At this time, both the set values (pre-change set values) set to the job from the information indicating the set values stored temporarily and the job set values (post-change set values) saved as the histories of the set values and the job are added to the event. Thereby, the server 1120 transmits the job set values only when the job is executed. Accordingly, since the information is not transmitted when check of an application setting screen or a job is canceled, the settings of the executed job are easily analyzable.

Figure 22:
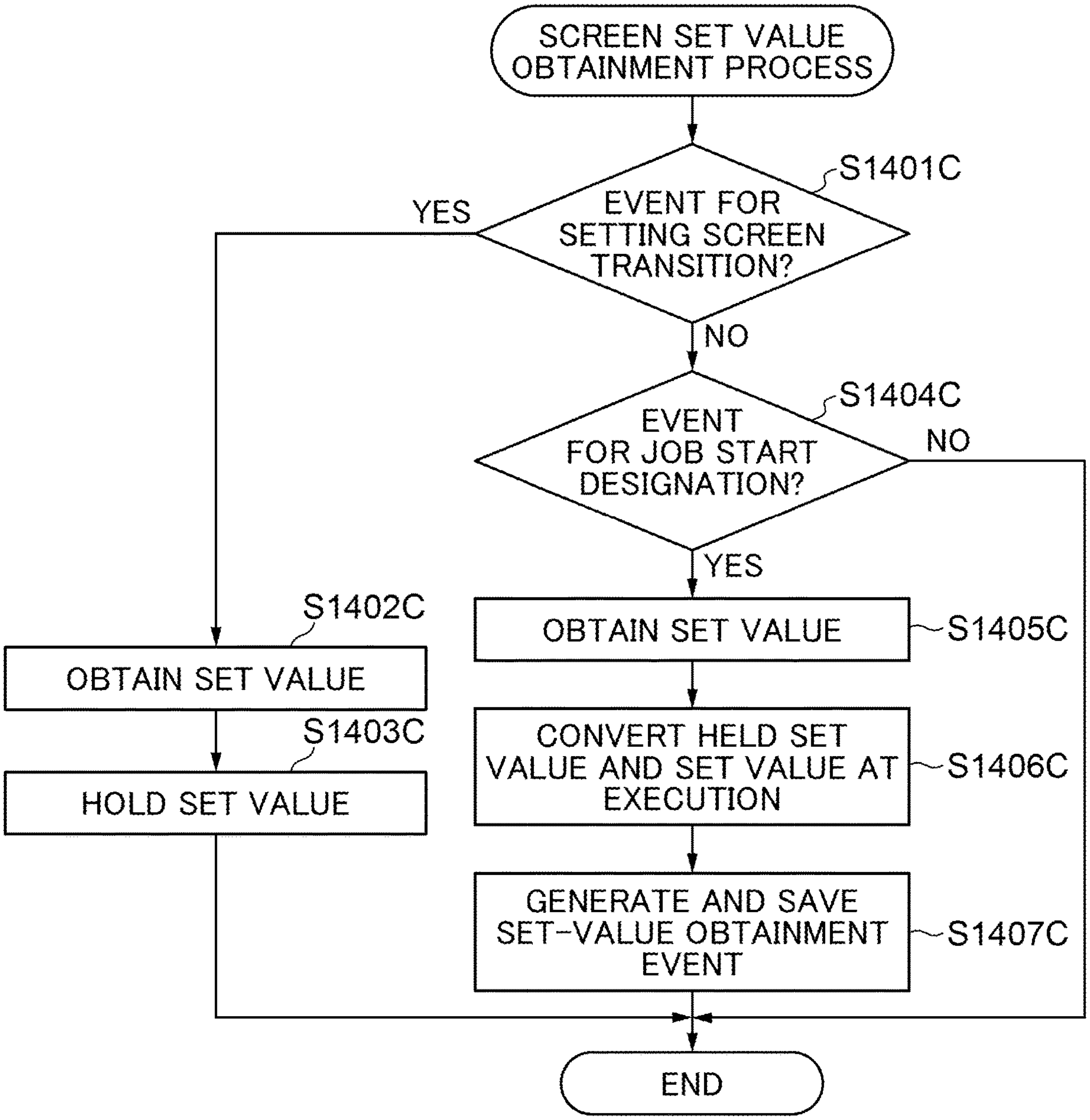
FIG. 22 is a flowchart showing a screen-set-value obtainment process in a fourth embodiment.

FIG. 22 is a flowchart of a screen-set-value obtainment process that the MFP 1100 of the fourth embodiment executes in S8106 in FIG. 9B. The process of the flowchart of FIG. 22 is achieved because the CPU 101 runs a control program stored in the HDD 104.

In FIG. 22, the event collection module 411 determines whether the received internal event is a transition event to a setting screen (S1401C). The event collection module 411 sets up so as to receive a notification of transition to each application setting screen as an event from the function application platform 408 that controls switching of a screen. Then, the event collection module 411 determines to be YES in S1401C, when the notified event is a transition event to a setting screen. When determining to be NO in S1401C, the event collection module 411 proceeds with the process to S1404C. In the meantime, when determining to be YES in S1401C, the event collection module 411 obtains the job set values set to the application setting screen after the transition (S1402C). It should be noted that the set values obtained in S1402C are the set values corresponding to the internal event. For example, when the internal event is a setting-screen transition event and a job setting is preset to the job, the matched set values are obtained. In the meantime, when there is no preset setting, the default job set values of the function of the transition destination are obtained. Next, the event collection module 411 temporarily stores the information indicating the obtained set values to the RAM 102 (S1403C) and finishes the screen-set-value obtainment process. It should be noted that the information indicating the obtained set values may be a name of a file in which the set values are described. Moreover, the obtained information may be stored in the HDD 104 rather than the RAM 102.

When determining to be NO in S1401C, the event collection module 411 determines whether the received internal event is an event for the job start instruction (S1404C). The event collection module 411 sets up so as to receive a notification of a job reception event from the job control module 406 or sets up the function applications 409 so as to receive a notification of a job execution instruction as an event. Then, the event collection module 411 determines to be YES in S1404C, when the notified event is the event for the job start instruction mentioned above.

When the event collection module 411 determines to be NO in S1404C, the screen-set-value obtainment process is finished. In the meantime, when determining to be YES in S1404C, the event collection module 411 obtains set values required to generate a transmission event and records the information indicating the set values (S1405C). The set values are added to the user name 7106, operation content 7105, target 7107, and parameter 7108 in FIG. 8B, and are mainly added to the parameter 7108 to execute the job. It should be noted that the set values obtained in S1405C are set to the application setting screen at the time of the user's instruction of execution of the job. The set values are recorded in connection with the event for the job start instruction received by the event collection module 411 and are obtained from the setting history holding module 410. For example, the set values are the changed set values (post-change set values) that are different from the set values that the user obtained in S1402C. It should be noted that the information indicating the obtained set values may be a name of a file in which the set values are described. Moreover, the obtained information may be stored in the HDD 104 rather than the RAM 102.

The event collection module 411 converts the job set values into the format of the transmission event (set-value obtainment event) on the basis of the information indicating the job set values that are recorded at the time of transition to the application setting screen and the information indicating the set values of the time of execution of the job (S1406C). The event collection module 411 reads the job set values from the information indicating the job settings that are obtained in S1402C and S1405C. Then, the event collection module 411 converts each of the job set values into a combination of each setting item and a set value and saves the combination in order to convert the set values into the format that can be output as an event. The information indicating the default set value of the job and the set value of the time of execution is given to each job set value.

For example, since a job set value is configured to have a function, a layer of a setting item, and a value of the setting item in the XML format as shown in FIG. 12B, the value corresponding to Fn Type is set to the target 7107. The item that combining the layers of the settings and the corresponding item are recorded in the parameter 7108 so that they make a pair. When there are a plurality of settings, pairs of setting and value for all the settings are combined and set to the parameter 7108. When the set values 1501C are converted, "Copy" that is the value of Fn Type is set to the target 7107 and the job set item and the value are converted and set to the parameter 7108. The job set item of the set values 1501C is set to the parameter 7108 by converting into "COLOR_MODE.COLOR_MODE": "BLACK_AND_WHITE", for example. Since there are a plurality of settings in the set values 1501C, results obtained by converting the set values are combined and all the set values are set to the parameter 7108.

Next, the event collection module 411 generates a transmission event (set-value obtainment event) on the basis of difference between the set values stored in the RAM 102 and the set values obtained in S1405 and saves the generated event (S1407C). The event is output by shaping the information collected to be written in the event and the information that is converted from the job set values in S1406C into a single format as the event of No. 10 in FIG. 8B. At this time, the event may be filed and saved in the message buffer 412. Then, the screen-set-value obtainment process is finished.

In the fourth embodiment, the MFP 1100 is controlled so as to output the set values (pre-change set values) preset to the smart button that the user selected on the screen 1101 at the time of job execution and the set values (post-change set values) used by the job executed according to selection of the smart button. Thereby, which setting has been changed is easily analyzable when the job has been actually executed.

Next, a fifth embodiment will be described. The fifth embodiment differs from the first through fourth embodiments in contents of a screen-set-value obtainment process executed in S8106 in FIG. 9B. Since the other portions are common to the first embodiment, descriptions about the overlapping portions are omitted. In the fifth embodiment, when the screen transition from the screen 1101 that is the smart home screen to a setting screen of each application (the setting screen 1102, for example) occurs, no event is generated but the information that indicates the job set values set to the screen 1102 is temporarily stored in the RAM 102 etc. Moreover, the same process is performed also when the screen transition from the job executing screen (screen 1103, for example) to the screen 1102 occurs. Next, when a user changes the set values set to the screen 1102 and instructs to execute the job, the screen transition from the screen displayed on the operation unit 111 to the screen 1103 occurs, and the SettingsSnapshottedAtTransition event is generated. At this time, information about difference between the set values (pre-change set values) set to the job from the information indicating the set values stored temporarily and the job set values (post-change set values) saved as the histories of the set values and the job is added to the event. Thereby, the server 1120 easily analyzes which setting has been changed on the application setting screen on the basis of the above-mentioned information indicating the difference.

Figure 23:
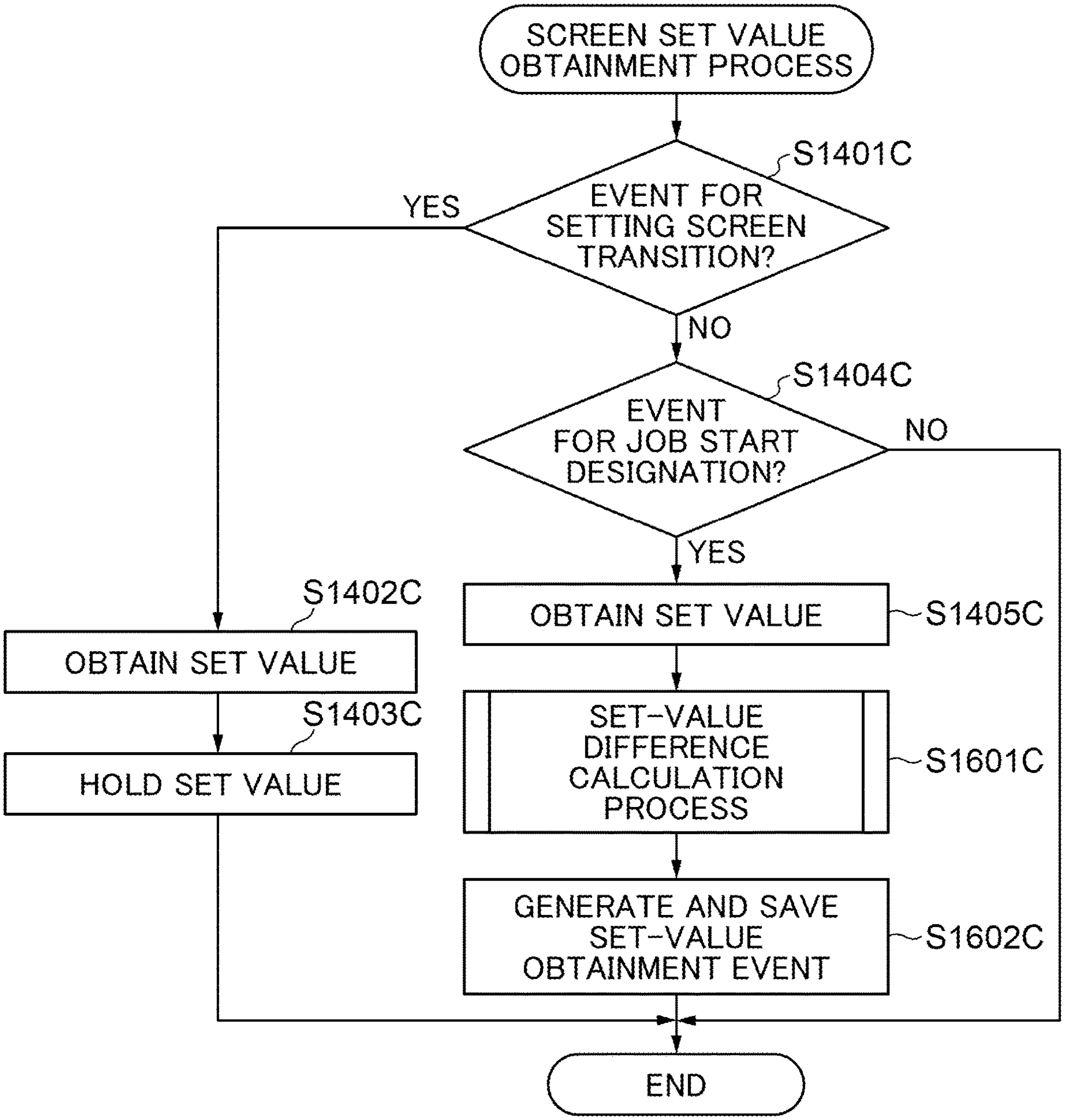
FIG. 23 is a flowchart showing a screen-set-value obtainment process in a fifth embodiment.

FIG. 23 is a flowchart of the screen-set-value obtainment process that the MFP 1100 of the fifth embodiment executes in S8106 in FIG. 9B. The process of the flowchart of FIG. 23 is achieved because the CPU 101 runs a control program stored in the HDD 104.

Since processes of S1401C to S1405C in FIG. 23 are respectively identical to the processes in FIG. 22 of the fourth embodiment, their descriptions are omitted. After the process of S1405C, the event collection module 411 executes a set-value-difference calculation process on the basis of the information indicating the job set values of the time of transition recorded in S1402 and the information indicating the job set values of the time of job execution recorded in S1405C (S1601C). Then, the event collection module 411 generates the transmission event (set-value obtainment event) on the basis of the difference calculated in S1601 and save it (S1602C). The event is output by shaping the information collected to be written in the event and the additional information indicating the difference between the job set values calculated in S1601C into a single format as the event of No. 10 in FIG. 8B. At this time, the event may be filed and saved in the message buffer 412. Then, the screen-set-value obtainment process is finished.

Figure 24:
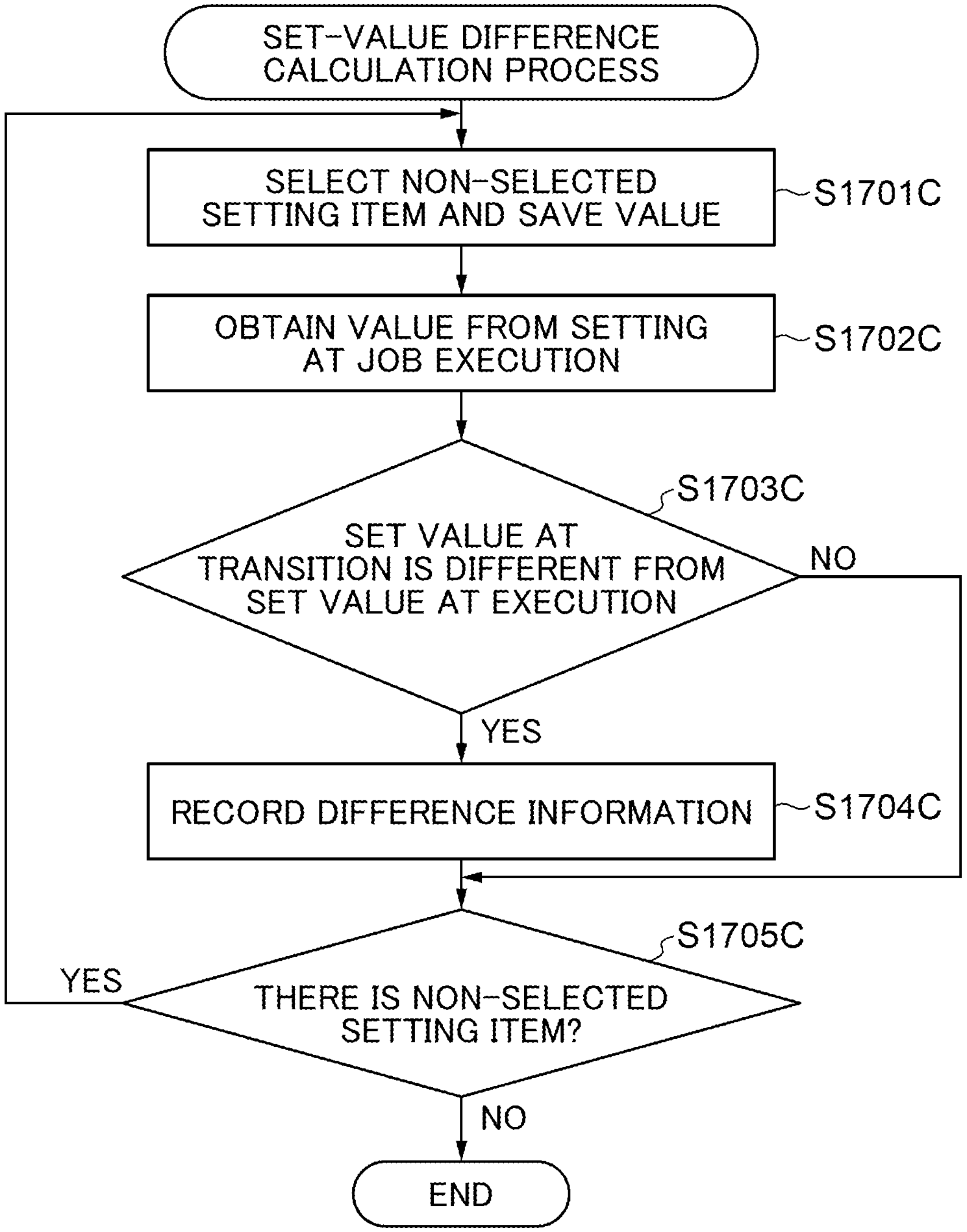
FIG. 24 is a flowchart showing a flow of a set-value-difference calculation process executed in S1601C in FIG. 23.

Next, the set-value-difference calculation process executed in S1601C in FIG. 23 will be described. FIG. 24 is a flowchart showing a flow of the set-value-difference calculation process. The event collection module 411 selects a non-selected setting item from among the job set values of the time of the setting screen transition and holds the setting item and value (S1701C). The event collection module 411 refers the job setting values read from the information indicating the job setting values from the top, selects one non-selected setting item, and holds the selected setting item and its value. For example, when the event collection module 411 reads the set values 1501C in FIG. 12B, "DOCUMENT_SIZE.DOCUMENT_SIZE" is held as the setting item and "AUTO" is held as the value. The event collection module 411 searches the job set values of the time of job execution for the setting item selected in S1701C and obtains the value set up as the item of the time of execution (S1702C). For example, when the event collection module 411 selects "DOCUMENT_SIZE.DOCUMENT_SIZE" as the setting item and targets the set values 1502C, since the value is set to "A4", this value is held as the value of the time of execution.

The event collection module 411 determines whether the job set value of the time of the transition obtained in S1701C differs from the job set value of the time of the job execution obtained in S1702C (S1703C). When determining to be NO in S1703C, the event collection module 411 proceeds with the process to S1705C. When determining to be YES in S1703C, the event collection module 411 records the selected setting item and the difference between the set value of the time of the transition and the set value of the time of the job execution as the difference information (S1704C). For example, when "DOCUMENT_SIZE.DOCUMENT_SIZE" is selected as the setting item, the event collection module 411 records the difference between the pre-change set value "AUTO" before change and the post-change set value "A4" as the difference information.

Then, the event collection module 411 determines whether there is a non-selected setting item from among the job set values of the time of transition to the setting screen (S1705C). When the event collection module 411 determines to be NO in S1705C, the set-value-difference calculation process is finished. In the meantime, when the event collection module 411 determines to be YES in S1705C, the processing returns to S1701C and the process about a non-selected item is continued.

According to the above-mentioned process in FIG. 24, a setting item of which the set value of the time of transition differs from the set value of the time of job execution is extracted from among a plurality of setting items, and the extracted setting item, pre-change set value, and post-change set value can be obtained. In the fifth embodiment, the MFP 1100 stores the information indicating difference between the set values (pre-change set values) preset to the smart button that the user selected on the screen 1101 and the set values (post-change set values) used by the job executed according to selection of the smart button. This enables easy analysis about which setting has been changed on the application setting screen on the basis of the above-mentioned information indicating the difference.

Next, a sixth embodiment will be described. In the sixth embodiment, more detailed information about a screen change is added to the trigger event of a dynamic change of the operation screen of the first embodiment shown in FIG. 7. Moreover, the contents of the trigger event process differ from the first embodiment. Thereby, the profitability of a screen change is analyzable with better efficiency. Since the other portions are common to the first embodiment, descriptions about the overlapping portions are omitted. FIG. 25 is a view showing examples of events that the MFP 1100 of the sixth embodiment transmits to the server 1120. The examples in FIG. 25 include a UserOperationDisplayChangeDetail collection 1410D in addition to the examples in FIG. 7. Items in FIG. 25 (a collection 1401D to an operation analysis system column 1404D) are respectively equivalent to the items in FIG. 7 (the collection 601 to the operation analysis system column 604). The collections in FIG. 25 (a Power collection 1405D to a UserOperation collection 1409D) are respectively equivalent to the collections in FIG. 7 (the Power collection 605 to the UserOperation collection 609). The UserOperationDisplayChangeDetail collection 1410D is designated when obtaining more detailed information by a change trigger of screen display. The events reported by the UserOperationDisplayChangeDetail collection 1410D are almost common to the event of same as the UserOperation collection 1409D. In the meantime, the difference from the first embodiment is that a DisplayChangeTriggerOccurredDetail event rather than the DisplayChangeTriggerOccurred even is reported. When the trigger event of display screen change occurs, the DisplayChangeTriggerOccurredDetail event is transmitted while adding the pre-change information and the post-change information about which screen change has occurred.

FIG. 26 is a view showing an example of an event log in a system of the sixth embodiment. As with the event log of FIG. 8B of the first embodiment, although the events are expressed in a table format in FIG. 26, a notification event reported to the server 1120 may be data in the JSON format etc. A second parameter 1509 is added to the event log of FIG. 26. The second parameter 1509 is different from the first parameter 1508 in a type. Items in FIG. 26 (an event name 1501 to a target 1507) are respectively equivalent to the items in FIG. 8B (the event name 7101 to the target 7107). The first parameter 1508 is equivalent to the parameter 7108 in FIG. 8B.

Hereinafter, the flow of the sequence chart of FIG. 6B when the UserOperationDisplayChangeDetail collection 1410D is designated will be described. The UserOperation collection 1409D shall be designated also in the sixth embodiment as with the first embodiment. The difference between the sixth embodiment and the first embodiment is only the DisplayChangeTriggerOccurredDetail event of No. 3. Detailed information about the screen change is added to the second parameter 1509 of the DisplayChangeTriggerOccurredDetail event of No. 3.

FIG. 27 is a view showing an example of the detailed information about the screen change in the sixth embodiment. The detailed information of the screen change is added to the DisplayChangeTriggerOccurredDetail event. Hereinafter, a change of display order of the smart buttons on the smart home screen shown in FIG. 10 will be described as an example of the dynamic screen change. A "Page" item 1601 indicates a page of a screen on which the smart buttons are displayed. An "Order" item 1602 indicates the display order of a smart button displayed on the page. A "Previous" item 1603 indicates an ID of a smart button before a screen change occurs. An "After" item 1604 indicates an ID of a smart button later than occurrence of a screen change. An ID of a smart button may be arbitrary information as long as the information can uniquely specify a content of a smart button displayed on a screen. As shown in FIG. 27, the "Previous" item 1603 and the "After" item 1604 are stored while associating with each other. Moreover, the "Previous" item 1603 and the "After" item 1604 are stored while associating with the "Order" item 1602.

The column of the "Previous" item 1603 in FIG. 27 indicates an arrangement order of the buttons from the left before a screen change occurs. The first page indicates the arrangement order of the buttons from the left on the screen 901 in FIG. 10. Moreover, the second page indicates the arrangement order of the buttons from the left on the screen 902. The column of the "After" item 1604 indicates the arrangement order of the buttons later than occurrence of the screen change. The first page indicates the arrangement order of the buttons from the left on the screen 903 in FIG. 10. The second page indicates the arrangement order of the buttons from the left on the screen 904. The above-mentioned detailed information about the screen change enables easy analysis of how the arrangement order of the buttons has been changed by the screen change.

Figure 28:
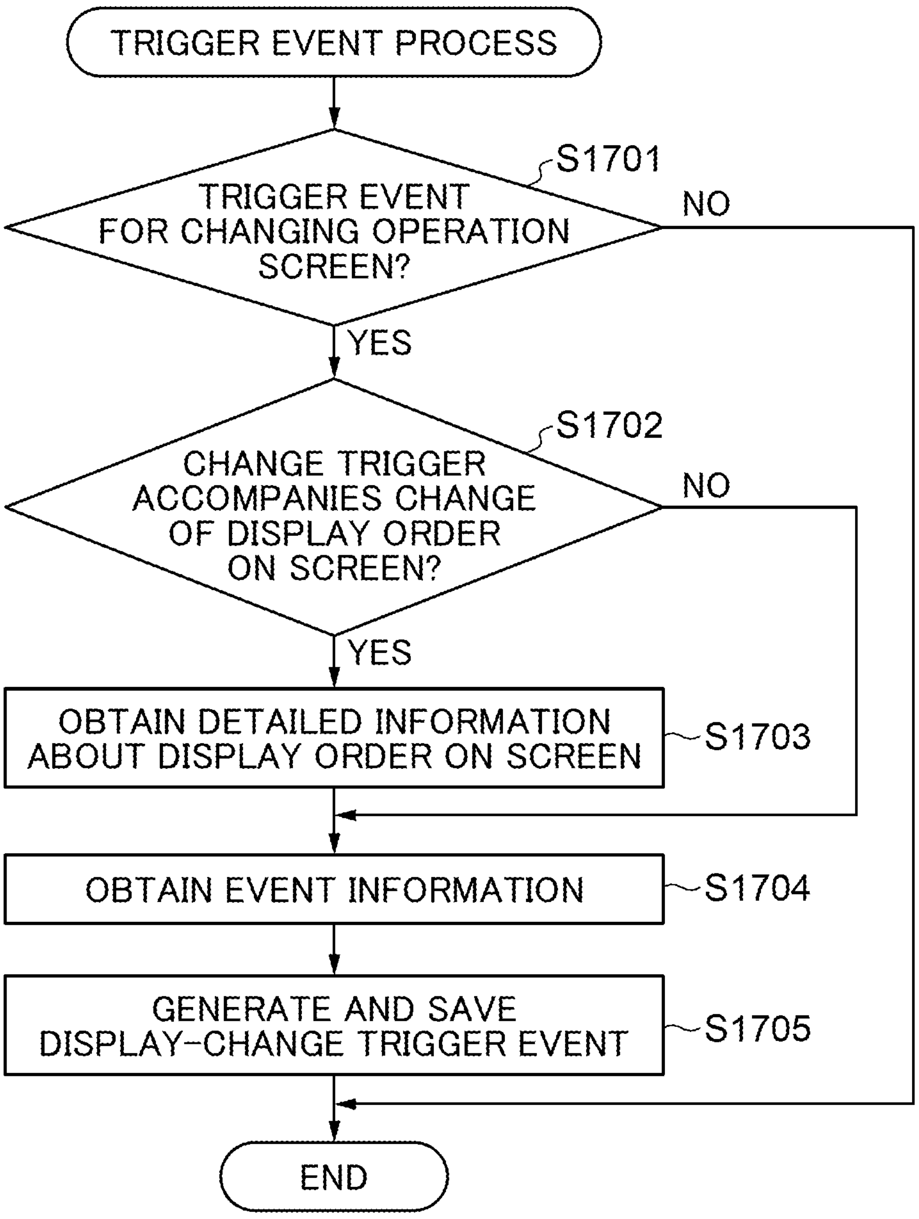
FIG. 28 is a flowchart showing a flow of a trigger event process of the sixth embodiment.

FIG. 28 is a flowchart showing a flow of a trigger event process of the sixth embodiment. The process of the flowchart of FIG. 28 is achieved because the CPU 101 runs a control program. As with S1001 in FIG. 11, the event collection module 411 determines whether the received internal event is an event (a trigger event) for changing operation screen (S1701). When the event collection module 411 determines to be NO in S1701, the trigger event process is finished. In the meantime, when determining to be YES in S1701, the event collection module 411 determines whether the trigger event is accompanied by a change of a display order on a screen (S1702). The event collection module 411 may determine to be YES in S1702, when being notified that the display order of the smart buttons has been changed from the function application 409 of the smart home screen. Moreover, the event collection module 411 may perform the determination of S1702 by inquiring the function application 409 of the smart home screen.

When determining to be YES in S1702, the event collection module 411 obtains the detailed information about the screen display order as additional information (S1703). In the meantime, when determining to be NO in S1702, the event collection module 411 proceeds with the process to S1704 without executing the process of S1703. The event collection module 411 executes the process of S1703 by inquiring the function application 409 of the smart home screen of the button information about the display orders before and after the change. Then, the event collection module 411 obtains information required to generate an event (S1704). Moreover, the event collection module 411 generates and saves the screen change trigger event that will be transmitted (S1705).

As mentioned above, in the sixth embodiment, even when the display screen change not resulting from a user operation occurs, concrete change contents can be added to the trigger event generated. Thereby, when the usefulness of the dynamic change of the display screen is analyzed, presence of absence of the dynamic change as the analysis target is specified easily and promptly. Then, since the detailed information before and after the change is added, what kind of dynamic change has been performed is easily analyzed. That is, since the display orders of the smart buttons before and after the dynamic change of the display screen can be specified, the usefulness of the dynamic change of the display screen can be analyzed in more detail.

Next, a seventh embodiment will be described. The seventh embodiment differs from the first embodiment in the software configuration of the MFP 1100. Since the other portions are common to the first embodiment, descriptions about the overlapping portions are omitted. Each embodiment is configured to switch the home screen between the static home screen of FIG. 29 on which displayed buttons are statically arranged according to a setting and the smart home screen of FIG. 4 on which the displayed buttons are dynamically changed by a user operation.

Figure 29:
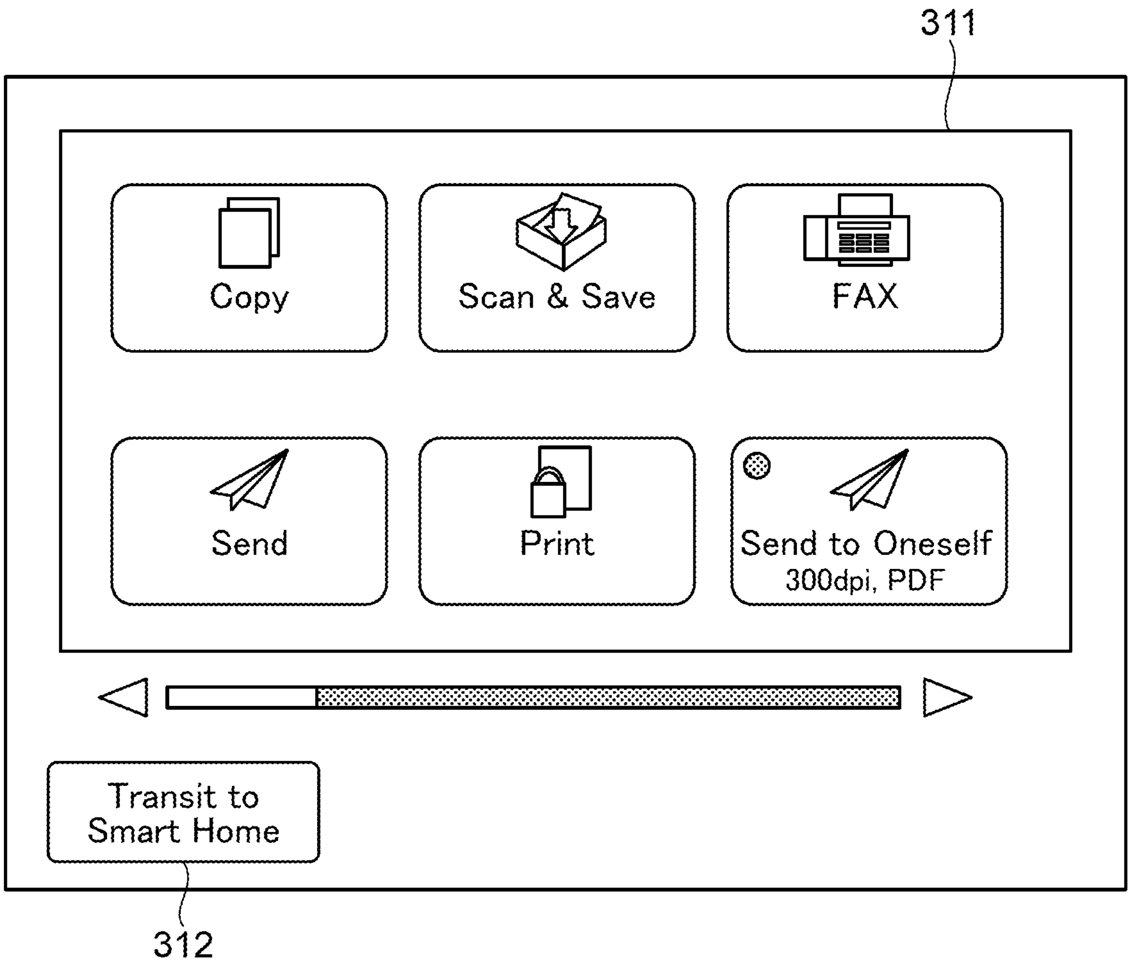
FIG. 29 is a view showing an example of a static home screen.

As shown in FIG. 29, a button list area 311 in which buttons that instruct transitions to application setting screens that can be used by a user is arranged in the static home screen. When a button in the button list area 311 is selected, the screen is switched to a function setting screen on which items about the copy function or the facsimile transmission function are set. Moreover, the layout and arrangement order of the buttons displayed on the button list area 311 can be changed by a user setting. It should be noted that the layout and arrangement order of the buttons displayed on the static home screen are static and are changed only when the user changes set values. A transit-to-smart-home button 312 is a button for switching a screen from the static home screen to the smart home screen.

Figure 30:
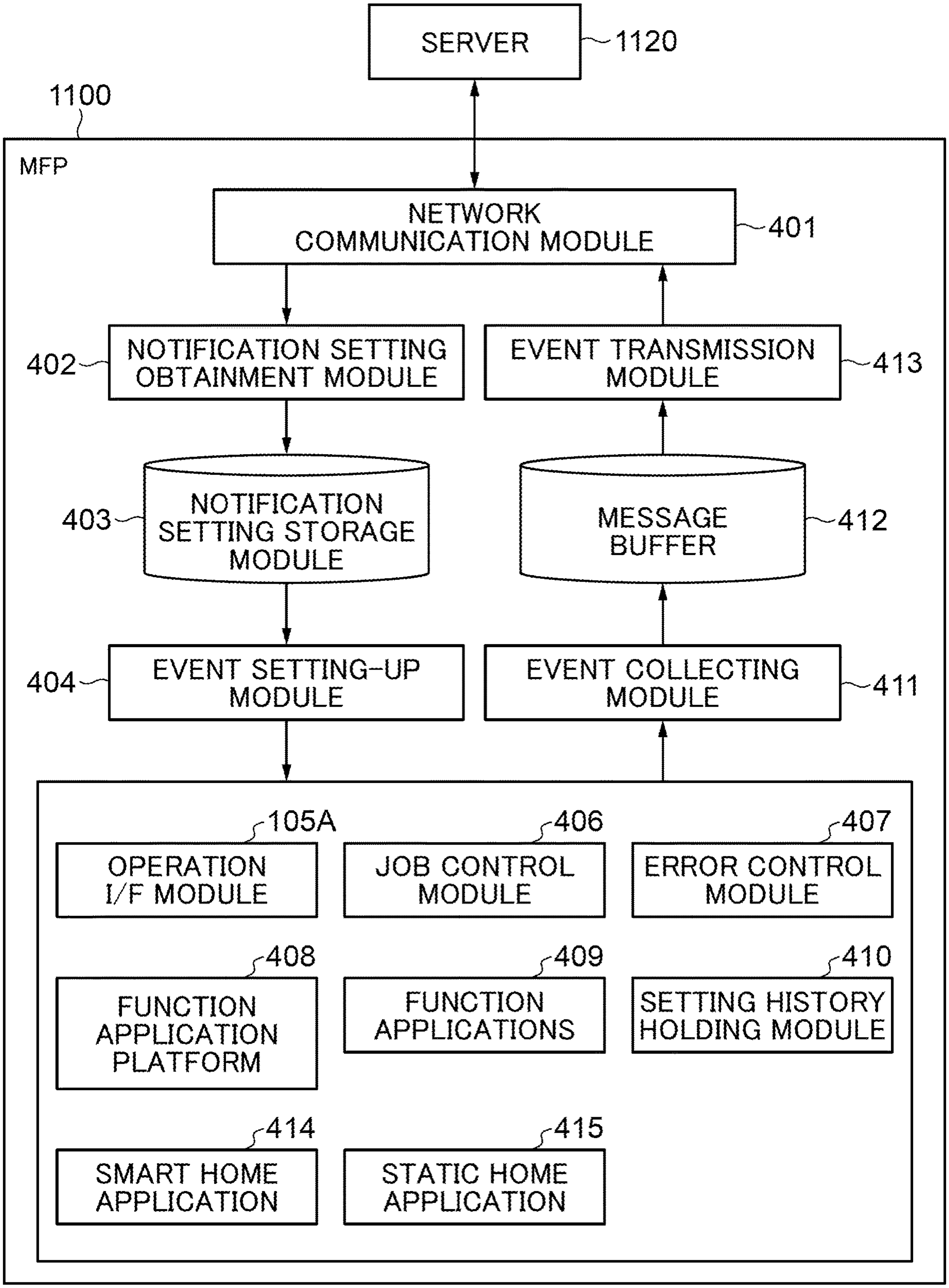
FIG. 30 is a functional block diagram of an MFP of a seventh embodiment.

Next, a software configuration of the MFP 1100 of the seventh embodiment will be described. FIG. 30 is a functional block diagram of the MFP 1100. A smart home application 414 and a static home application 415 are added to the configuration of the first embodiment shown in FIG. 5.

The smart home application (a first UI application) 414 is the application for displaying the smart home screen of FIG. 4. The smart home application 414 controls the display and layout change of the smart buttons on the smart home screen, switch of a screen page, etc. The smart home application 414 reports (outputs) the events corresponding to the UserOperation collection 609 in FIG. 7 mentioned above. These events are used for the display control of the smart home screen. The static home application (a second UI application) 415 is the application for displaying the static home screen of FIG. 29. The static home application 415 controls the display of the buttons on the static home screen, switch of a screen page, etc. The display control of the static home screen uses the above-mentioned set values that a user sets up but does not use the events corresponding to the UserOperation collection 609 in FIG. 7. The static home application 415 does not report (output) the events corresponding to the UserOperation collection 609 in FIG. 7.

When the MFP 1100 of the seventh embodiment receives an event notification instruction that designates the UserOperation collection 609 from the server 1120 in S5203 in FIG. 6B, the event setting-up module 404 applies the setting for obtaining the events about a user operation to each application. According to this setting, the function applications 409 and smart home application 414 report a button operation event etc. as the UserOperated event, for example. Moreover, the function applications 409 report a display-screen transition event and a job execution event as the SettingSnapshottedAtTransition events. Furthermore, the smart home application 414 reports an event about a display change of an operation screen as the DisplayChangeTriggerOccurred event. In this way, in the seventh embodiment, an application and a controller that report an event are switched according to contents of a collection. This enables to obtain only an operation event corresponding to an analysis object according to the instructed content of the collection.

Next, an eighth embodiment will be described. In the eighth embodiment, a user operation as an event is classified as a direct operation to hardware or an indirect operation to an object displayed by software, and they are obtained while associating with each other. Since the other portions are common to the first embodiment, descriptions about the overlapping portions are omitted.

FIG. 31 is a view showing examples of events that the MFP 1100 of the eighth embodiment transmits to the server 1120. In the examples in FIG. 31, an UserOperationHardware collection 1410X is added to the examples in FIG. 7. Items in FIG. 31 (a collection 1401X to an operation analysis system column 1404X) are respectively equivalent to the items in FIG. 7 (the collection 601 to the operation analysis system column 604). The collections in FIG. 31 (a Power collection 1405X to a UserOperation collection 1409X) are respectively equivalent to the collections in FIG. 7 (the Power collection 605 to the UserOperation collection 609). The UserOperationHardware collection 1410X is designated when an operation event different from the events in the UserOperation collection 1409X is reported. When the UserOperationHardware collection 1410X is designated, a UserOperated event and a UserOperatedHardware event are reported.

The UserOperated event is the same as what is described in the examples in FIG. 7. However, the information added to the UserOperated event in the eighth embodiment differs from the content described in the examples in FIG. 7. The UserOperatedHardware event is transmitted when a user gives an instruction to the operation unit 111. The instruction is a direct operation to hardware, such as a touch to the touch panel that constitutes the operation unit 111, a press of a hard key, or the like.

FIG. 32 is a view showing an example of an event log in a system of the eighth embodiment. As with the event log of FIG. 8B of the first embodiment, although the events are expressed in a table format in FIG. 32, a notification event reported to the server 1120 may be data in the JSON format etc. A second parameter 1509X is added to the event log of FIG. 32. The second parameter 1509X is different from a first parameter 1508X in a type. Items in FIG. 32 (event names 1501X to a target 1507X) are respectively equivalent to the items in FIG. 8B (the event names 7101 to the target 7107). The first parameter 1508X is equivalent to the parameter 7108 in FIG. 8B.

Hereinafter, the flow of the sequence chart of FIG. 6B when the UserOperationHardware collection 1410X is designated will be described. In the eighth embodiment, only the UserOperatedHardware collection 1410X shall be designated in order to facilitate the description. First, the processes in S5201 through S5204 in FIG. 6B are performed.

When a user presses a login button on a login screen displayed on the LCD panel 202 as a login operation, the MFP 1100 accepts the login operation in S5205. In S5205, the MFP 1100 determines that the login operation is accepted when the user touches a login button icon displayed on the LCD panel 202 with a finger. When the MFP 1100 determines that the login operation is accepted, the UserOperated event that is the event of the operation to the touch panel 201 and the UserOperatedHardware event that is the event of the operation to the login button are generated.

The UserOperatedHardware events of No. 1 and No. 2 in FIG. 32 are the operation events corresponding to the operations of the login button by the user. The event of No. 1 indicates a press operation to the touch panel 201 and the event of No. 2 indicates a finger lift operation from the touch panel 201.

In the event of No. 1, a TouchDown identifier indicating the press of the touch panel 201 is set to an operation content 1505X. A TouchPanell identifier indicating the touch panel 201 as an operation target is set to a target 1507X. Coordinate information indicating a position at which the touch panel 201 is pressed is set to the first parameter 1508X. An HD0001 identifier identifying an operation of this hardware itself is set to the second parameter 1509X.

In the event of No. 2, a TouchUp identifier indicating the finger lift from the touch panel 201 is set to the operation content 1505X. A TouchPanell identifier indicating the touch panel 201 as an operational target is set as the target 1507X. Coordinate information indicating a position at which the finger touched just before lifting the finger from the touch panel 201 is set to the first parameter 1508X. An HD0002 identifier identifying an operation of this hardware itself is set to the second parameter 1509X. The identifier set to the second parameter 1509X is an ID that identifies this operation event itself such as the UUID, such as the session ID in the first embodiment.

The UserOperated event of No. 3 indicates the indirect operation to the object displayed by the software, and specifically, indicates that the login button icon displayed on the LCD panel 202 is selected. In the event of No. 3, the identifiers in the operation content 7105 and target 7107 of the event of No. 1 in FIG. 8B are respectively set to the operation content 1505X and target 1507X. The identifiers of the event of the operation, which causes this login button selection, on the touch panel 201 are added to the second parameter 1509X. That is, the HD001 identifier and HD002 identifier included in the second parameters of the UserOperatedHardware events of No. 1 and No. 2 are added to the second parameter of No. 3. Thereby, the operation information about the button etc. displayed by the software and the information about the direct operation to the hardware for operating it can be associated easily.

About the events from No. 4, the operation information about the button etc. displayed by the software and the information about the direct operation to the hardware for operating it are generated, and the generated operation information is associated using the identifier.

Figure 33:
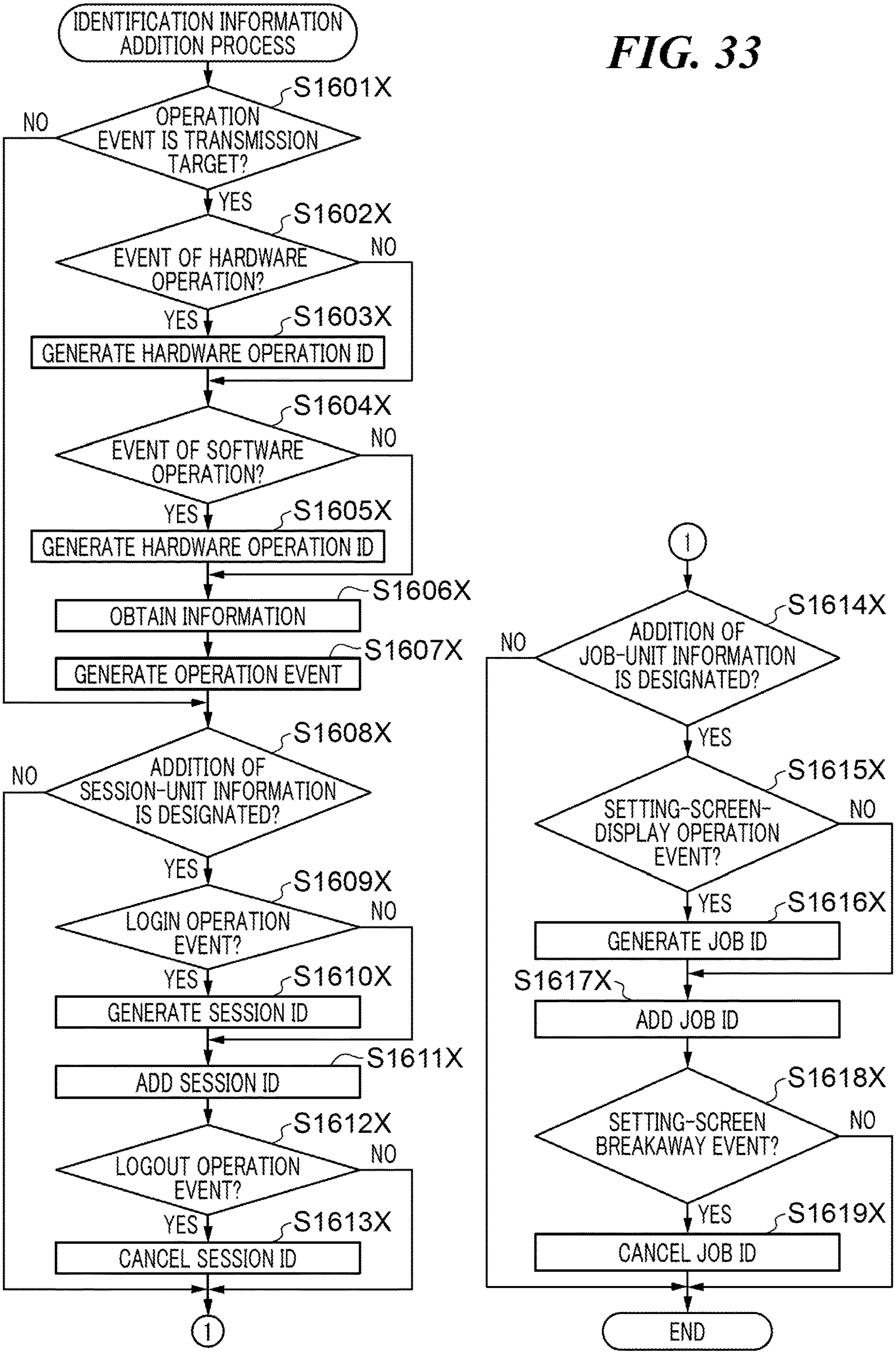
FIG. 33 is a flowchart showing a flow of an identification information addition process that the MFP of the eighth embodiment executes.

FIG. 33 is a flowchart showing a flow of an identification information addition process that the MFP 1100 of the eighth embodiment executes. The process of the flowchart of FIG. 33 is achieved because the CPU 101 runs a control program. Moreover, the process of the flowchart of FIG. 33 is similar to the process of the flowchart of FIG. 9C of the first embodiment. Hereinafter, only difference from the process of the flowchart of FIG. 9C will be described.

The event collection module 411 first executes the same process as S8201 in FIG. 9C in S1601X. Specifically, the event collection module 411 determines whether the received internal event is an operation event of a transmission targe. When determining to be NO in S1601X, the event collection module 411 proceeds with the process to S1608X. In the meantime, when determining to be YES in S1601X, the event collection module 411 determines whether the received internal event is an event of a hardware operation (S1602X). In S1602X, the event collection module 411 determines whether the received internal event is received from the operation I/F module 105A or the function application platform 408 and is equivalent to a UserOperatedHardware event.

When determining to be NO in S1602X, the event collection module 411 proceeds with the process to S1604X. In the meantime, when determining to be YES in S1602X, the event collection module 411 generates a hardware operation ID (S1603X). This ID of the hardware operation is an identifier that is added to the second parameter 1509X in FIG. 32 and identifies the event of the hardware operation. This identifier is temporarily saved in the event collection module 411 together with the received internal event information.

Next, the event collection module 411 determines whether the received internal event is an operation event by a software process (S1604X). In S1604X, the event collection module 411 determines whether the received internal event is received from a function application 409 and is an operation event of a button etc. controlled by the software. When determining to be NO in S1604X, the event collection module 411 proceeds with the process to S1606X. In the meantime, when determining to be YES in S1604X, the event collection module 411 obtains the hardware operation ID (S1605X). Next, the event collection module 411 executes the same process as S8202 in FIG. 9C in S1606X. Specifically, the event collection module 411 obtains information required to generate a transmission event from the received internal event.

Subsequently, the event collection module 411 generates the operation event to be transmitted (S1607X). The process of S1607X includes a process to add the information obtained in S1605X to the second parameter in addition to the process of S8203 in FIG. 9C. Next, the event collection module 411 executes the same processes as S8204 through S8215 in FIG. 9C in S1608X through S1619X.

In the eighth embodiment, the information about the direct operation to the hardware of the operation unit 111 and the information about the indirect operation to the object displayed by the software are output to the server 1200. Thereby, the hardware operation event and the relevant operation event by the software process can be analyzed while preventing occurrence of the above-mentioned bad influence, which improves the user's operability.

Moreover, in the eighth embodiment, the information about the physical direct operation to the hardware of the operation unit 111 is associated with the information about the indirect operation to the object displayed by the software on the basis of the hardware operation ID. Thereby, the MFP 1100 is able to output the information including the operation history of the hardware operation in the operation unit 111 and the operation history of the software button operation to the server 1200 easily, which improves the user's operability.

Figure 34:
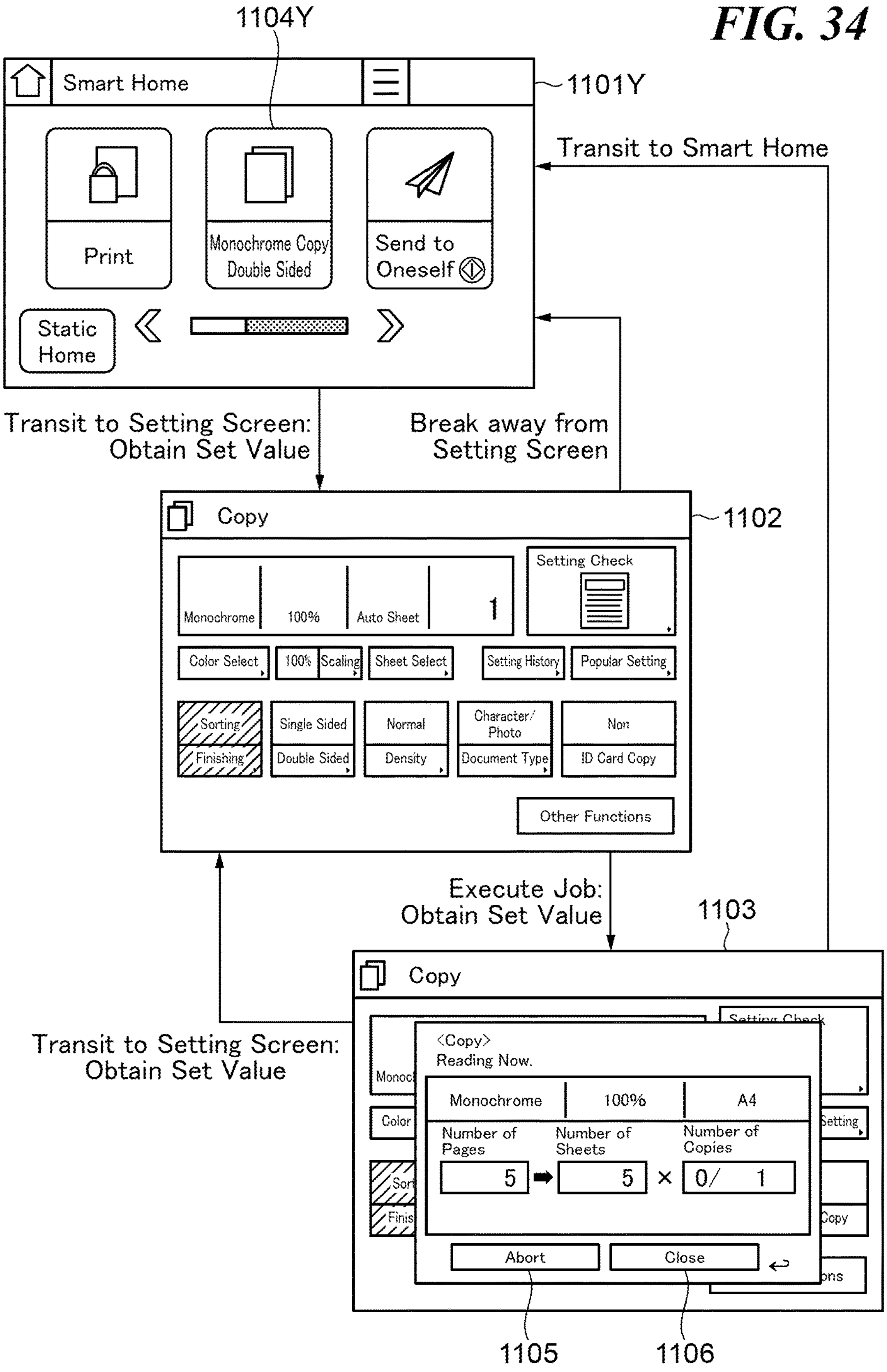
FIG. 34 is a view showing an example of screen transition in a ninth embodiment.

Next, a ninth embodiment will be described. FIG. 34 is a view showing an example of screen transition in the ninth embodiment. A screen 1101Y is a smart home screen. A screen 1102 is a setting screen of the copy function displayed when a smart button 1104Y of the copy function is operated on the screen 1101Y. A part of settings (monochrome and double sided) of the copy function are registered (preset) to the smart button 1104Y. When the smart button 1104Y is operated, setting contents like the set values 1501C of FIG. 12B are applied to the copy function, and transition to the screen 1102 occurs. It should be noted that the set values 1501C include the set values displayed on the smart button 1104Y and the other set values relevant to the copy function. The set values 1502C are a part of set values that are set at the time of the transition to the screen 1103 in response to a user's instruction to execute a job on the screen 1102.

The screen 1103 for executing the copy job is displayed when the start key 203 is operated to instruct execution of the job while displaying the screen 1102. When a job abort key 1105 or a close key 1106 for closing the dialog under job execution is operated on the screen 1103, the CPU 101 causes screen transition of the screen displayed on the touch panel 201 to the screen 1102. Moreover, when the home key 209 mentioned above is operated while displaying the screen 1102 or the screen 1103, the CPU 101 causes screen transition of the screen displayed on the touch panel 201 to the screen 1101Y. When the screen transition from the screen 1101Y to the screen 1102 occurs, the CPU 101 generates the SettingsSnapshottedAtTransition event and adds the set values of the copy function of the time of generation to the event. The set values are regarded as initial values of the time of starting the setting of the copy function. For example, the above-mentioned set values are equivalent to the set values 1501C preset to the smart button 1104Y. In this way, in the ninth embodiment, the predetermined set values preset to the smart button are added to the event. It is the same in a case of screen transition from the screen 1103 to the screen 1102.

On the screen 1102, various settings, such as a setting about the number of copies, a setting about an output sheet, and a setting about a print layout, about the copy can be performed. When various kinds of setting buttons (for example, buttons for setting sorting) are operated while the screen 1102 is displayed, the CPU 101 generates the UserOperated events. By analyzing the generated UserOperated events in order, the functions set by the user and the order of the settings can be recognized.

When the user operates so as to instruct execution of the job on the screen 1102, transition to the screen 1103 occurs, and the job is executed according to the set values 1502C that are the final setting contents. At this time, the CPU 101 generates the SettingsSnapshottedAtTransition event and adds the set values of the copy function of the time of generation of the event. Specifically, the set values 1502C are added. These set values can be considered as the final set values of the time of actually executing the job after completing the setting of the copy function. The settings performed on the screen 1102 can be easily grasped by comparing the initial set values 1501C with the final set values 1502C of the copy function.

As with the first embodiment, in the ninth embodiment, the MFP 1100 manages the information about a screen change event by which a screen is changed and an event relevant the screen change event as history information (the log shown in FIG. 8B) about operations. In the example of FIG. 8B, the same session ID is added to the event about a series of operations performed between a login operation and a logout operation. Then, the history information of each event is managed as a log. The predetermined set values preset to the smart button that the user presses are added to the event. That is, the MFP 1100 stores the information about the operations that are performed between the start and end of usage of the predetermined function and the information about the settings that are preset at the time of the start of the predetermined function while associating them to each other. Thereby, the information about the operations performed between the start and end of usage of the function is managed while associating with the information about the settings preset at the time of the start of the usage of the function. Accordingly, the log can be analyzed in consideration of the settings preset at the time of the start of the usage of the function.

Next, a tenth embodiment will be described. Descriptions about the portions that overlap with the first embodiment are omitted. In the tenth embodiment, when the transition from the smart home screen to each application setting screen occurs, the set values set on the setting screen and the information about another smart button, which calls the same function that is called by the selected smart button, are obtained. This process is not performed when the transition to the job executing screen occurs but is performed only when the transition from the smart home screen to the application setting screen occurs.

Figure 35:
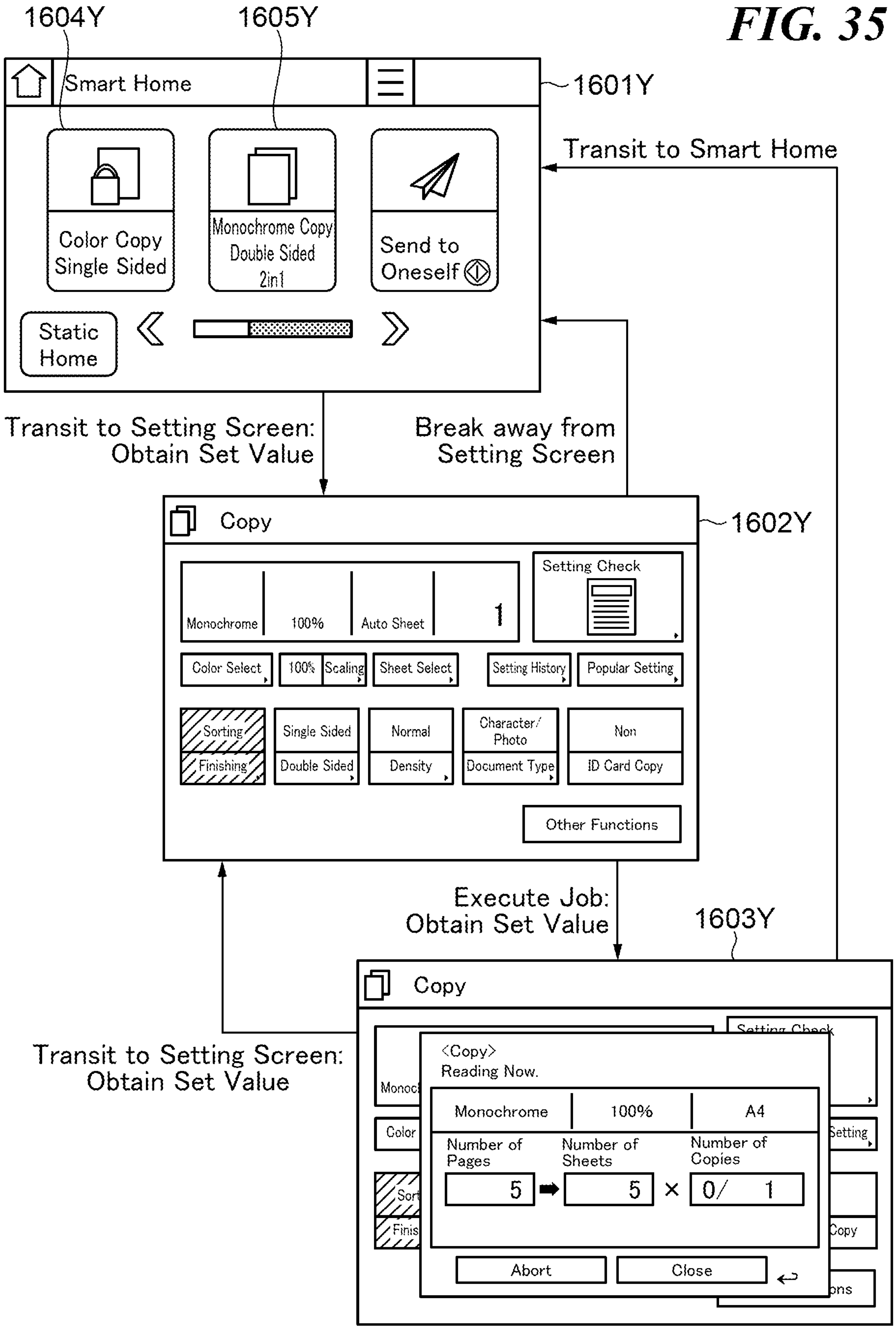
FIG. 35 is a view showing an example of screen transition in a tenth embodiment.

FIG. 35 is a view showing an example of screen transition in the tenth embodiment. A screen 1601Y is a smart home screen. Two kinds of smart buttons about the copy function are displayed on the screen 1601Y. Although these two smart buttons 1604Y and 1605Y are buttons to call the copy function, setting contents registered are different. A setting of single sided copy and a setting of full color as a print color setting are registered to the smart button 1604Y. A setting of double sided copy and a setting of monochrome as the print color setting are registered to the smart button 1605Y.

A screen 1602Y is a setting screen of the copy function displayed when a user selects the smart button 1605Y on the screen 1601Y. The setting contents registered to the smart button 1605Y are set to the screen 1602Y. A screen 1603Y is an execution screen of a copy job displayed when the user instructs to execute the job by selecting the start key 203 while displaying the screen 1602Y.

When the transition from the screen 1601Y to the screen 1602Y occurs, the MFP 1100 generates the SettingsSnapshottedAtTransition event. Moreover, the MFP 1100 adds the set values set to the screen 1602Y (i.e., the set values preset to the smart button 1605Y that the user selects on the screen 1601Y) to the generated event. Furthermore, the MFP 1100 adds the information about the smart button 1605Y selected in order to cause the screen transition to the screen 1602 to the above-mentioned event. The information about the smart button 1605Y includes the position of the smart button 1605Y displayed on the screen 1601Y and the character string displayed on the smart button 1605Y, for example. When a plurality of smart buttons that call a similar function are displayed on the screen 1601Y, the MFP 1100 adds the information about all the applicable smart buttons to the above-mentioned event. Since the smart buttons 1604Y and 1605Y that call the copy function are displayed on the screen 1601Y, the MFP 1100 adds the information about the smart buttons 1604Y and 1605Y to the above-mentioned event. These information contents are regarded as the set values set to the screen 1602Y of the time when the user starts the setting of the copy function and are also regarded as the settings of their candidates. The information about the smart button is not added to the event generated by the transition from the screen 1603Y to the screen 1602Y.

Figure 36:
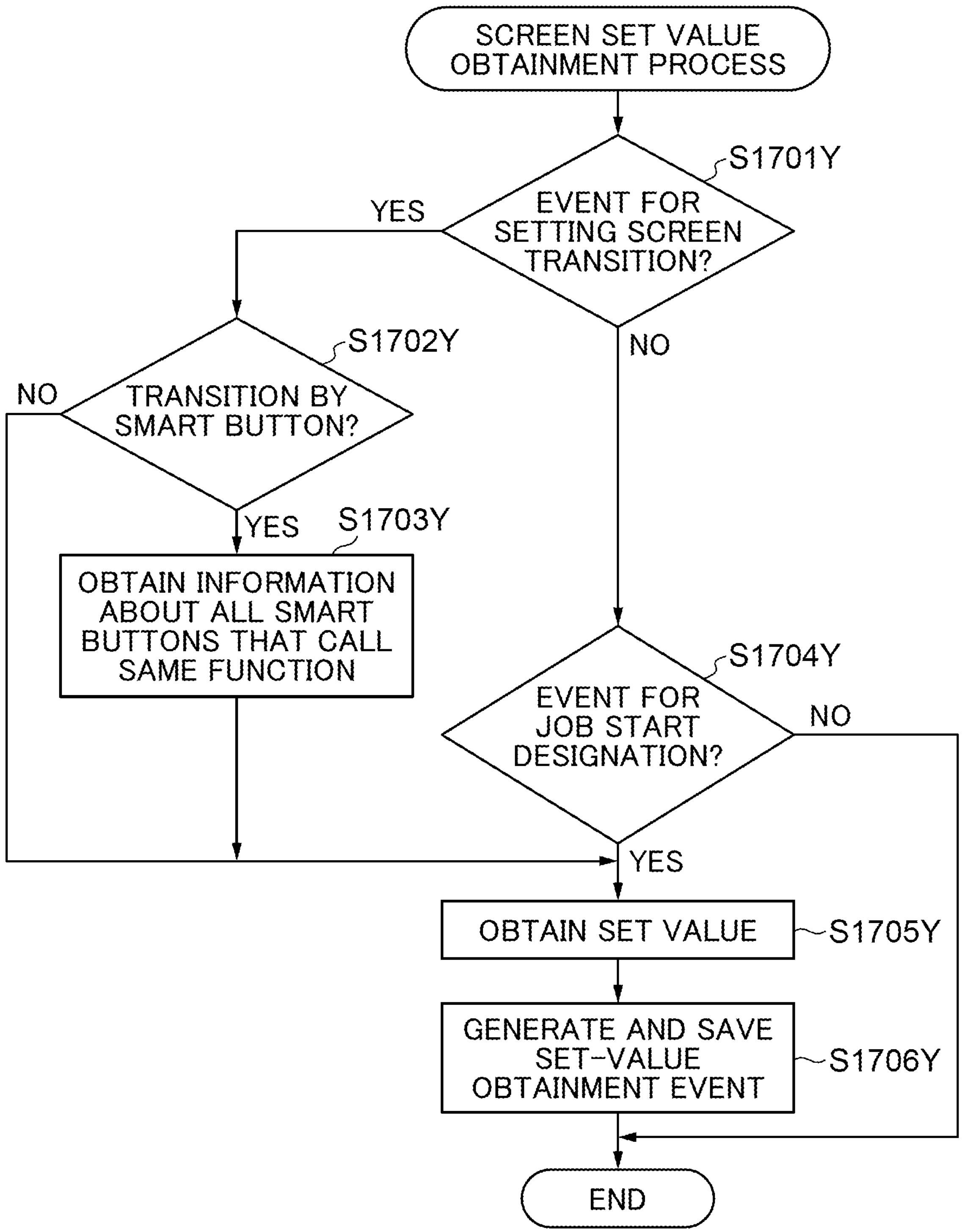
FIG. 36 is a flowchart of a screen-set-value obtainment process that an MFP of the tenth embodiment executes in S8106 in FIG. 9B.

FIG. 36 is a flowchart of a screen-set-value obtainment process that the MFP 1100 of the tenth embodiment executes in S8106 in FIG. 9B. The process of the flowchart of FIG. 36 is achieved because the CPU 101 runs a control program stored in the HDD 104.

In FIG. 36, the event collection module 411 determines whether the received internal event is a transition event to a setting screen (S1701Y). The event collection module 411 sets up so as to receive a notification of transition to each application setting screen as an event from the function application platform 408 that controls switching of a screen. Then, the event collection module 411 determines to be YES in S1701Y, when the notified event is a transition event to a setting screen. When determining to be NO in S1701Y, the event collection module 411 proceeds with the process to S1704Y. In the meantime, when determining to be YES in S1701Y, the event collection module 411 determines whether the transition event to the setting screen is caused by a smart button (S1702Y). Specifically, the event collection module 411 determines in S1702Y on the basis of a notification content from the function application platform 408. When determining to be NO in S1702Y, the event collection module 411 proceeds with the process to S1705Y. In the meantime, when determining to be YES in S1702Y, the event collection module 411 obtains the set values preset to the selected smart button. Moreover, the event collection module 411 obtains the information about all the applicable smart buttons that call the same function that is called by the selected smart button from among the smart buttons displayed on the smart home screen (S1703Y). Next, the event collection module 411 proceeds with the process to S1705Y.

In S1704Y, the event collection module 411 determines whether the received internal event is an event for the job start instruction. The event collection module 411 sets up so as to receive a notification of a job reception event from the job control module 406 or sets up the function applications 409 so as to receive a notification of a job execution instruction as an event. Then, the event collection module 411 determines to be YES in S1704Y, when the notified event is the event for the job start instruction mentioned above.

When the event collection module 411 determines to be NO in S1704Y, the screen-set-value obtainment process is finished. In the meantime, when determining to be YES in S1704Y, the event collection module 411 obtains set values required to generate a transmission event (S1705Y). The set values are added to the user name 7106, operation content 7105, target 7107, and parameter 7108 in FIG. 8B, and are mainly added to the parameter 7108 to execute the job. Next, the event collection module 411 generates the transmission event (set-value obtainment event)(S1706Y). The information about the smart button obtained in S1703Y and the set values preset to the selected smart button are added to the set-value obtainment event concerned, for example. The event collection module 411 files the event information like No. 5 or No. 10 in FIG. 8B by shaping into the JSON format etc. and saves it in the message buffer 412. Then, the screen-set-value obtainment process is finished.

In the tenth embodiment, when the transition from the smart home screen to each application setting screen occurs, the set values that are preset to the selected smart button are obtained, and the information about a smart button that calls the same function that is called by the selected smart button is also obtained. That is, the information about a smart button to which different set values are preset that calls the same function that is called by the selected smart button is collected in addition to the information about the smart button that the user selects on the smart home screen. This enables the analysis of the set values that the user requires in the function that the user selects, which enables the detailed analysis about the usefulness of the dynamic change of the display screen.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-057827, filed Mar. 27, 2020, No. 2020-068570, filed Apr. 6, 2020, No. 2020-068571, filed Apr. 6, 2020, No. 2020-094418, filed May 29, 2020, No. 2020-123847, filed Jul. 20, 2020, and No. 2021-005020, filed Jan. 15, 2021, which are hereby incorporated by reference herein in their entireties.

What is claimed is:

1. An information processing apparatus comprising:

an operation panel configured to have a display function of a user interface that dynamically changes according to a predetermined event regarding an operation of the information processing apparatus and to accept an operation from a user; and one or more controllers configured to:

detect the predetermined event regarding the operation of the information processing apparatus, the predetermined event being different from an operation event corresponding to an operation to the operation panel, and arrange a predetermined operation object dynamically on a screen of the operation panel in response to occurrence of the predetermined event; and record history information about a user operation to the operation panel received in response to the predetermined operation object being dynamically arranged on the screen of the operation panel, the history information about the user operation to the operation panel being recorded in association with information about the predetermined event that differs from the operation event corresponding to the operation to the operation panel.

2. The information processing apparatus according to claim 1, wherein the predetermined operation object is a button, and operation of the button causes a change of the screen.

3. The information processing apparatus according to claim 1, wherein the one or more controllers are configured to add an icon, to the predetermined operation object, indicating that a change of the screen is accompanied by execution of a job.

4. The information processing apparatus according to claim 2, wherein the one or more controllers are configured to record information about an event generated by an operation to the operation panel later than an operation of the button accompanied by the change of the screen.

5. The information processing apparatus according to claim 2, wherein the one or more controllers are configured to record information that identifies an event generated by a first operation of the button accompanied by the change of the screen and information that identifies an event generated by a second operation of the button accompanied by the change of the screen as a common value.

6. The information processing apparatus according to claim 1, wherein the one or more controllers are configured to record information that identifies the predetermined event.

7. The information processing apparatus according to claim 1, wherein the one or more controllers are configured to record information about the predetermined operation object displayed before changing the screen and information about the predetermined operation object displayed after changing the screen while associating them to each other.

8. The information processing apparatus according to claim 7, wherein the one or more controllers are configured to record information about an arrangement order of the predetermined operation object displayed before changing the screen and information about the arrangement order of the predetermined operation object displayed after changing the screen while associating them to each other.

9. The information processing apparatus according to claim 1, wherein the one or more controllers are configured to, in response to occurrence of the predetermined event, generate and save a screen change trigger event.

10. The information processing apparatus according to claim 1, further comprising:

a scanner; and a document feeder including a document tray and being configured to feed a document set on the document tray to the scanner, wherein the predetermined event is the document being set on the document tray.

11. The information processing apparatus according to claim 1, wherein the predetermined event is reception of a facsimile by the information processing apparatus.

12. The information processing apparatus according to claim 1, wherein the predetermined event is entry of a print job of a user who logs into the information processing apparatus.

13. The information processing apparatus according to claim 1, wherein the one or more controllers are configured to associate the history information about the user operation to the operation panel received in response to the predetermined operation object being dynamically arranged on the screen and the information about the predetermined event with a session identifier.

14. The information processing apparatus according to claim 13, wherein the one or more controllers are configured to (i) generate the session identifier in response to log in of a user and (ii) associate a plurality of operation events with the session identifier in a case where the occurrence of the predetermined event and the plurality of operation events occur after the log in of the user and before a log out of the user.

15. The information processing apparatus according to claim 1, wherein the one or more controllers are configured to transmit, to a server, the history information about the user operation to the operation panel received in response to the predetermined operation object being dynamically arranged on the screen and the information about the predetermined event.

16. The information processing apparatus according to claim 1, wherein the predetermined operation object is an object that, when selected, is configured to cause execution of a predetermined function, to which a predetermined setting is preset, of the information processing apparatus.

17. The information processing apparatus according to claim 16, wherein the one or more controllers are configured to store the predetermined setting and a setting used when the predetermined function is performed in association with each other.

18. An information processing apparatus according to claim 1, wherein the predetermined event is at least one of placement of a sheet on an auto document feeder of the information processing apparatus and inputting a print job, the screen displayed on the operation panel dynamically changes in accordance with the detection of the predetermined event, and recorded history information is extractable from log information of the information processing apparatus.

19. A control method for an information processing apparatus provided with an operation panel that has a display function of a user interface that dynamically changes according to a predetermined event regarding an operation of the information processing apparatus and accepts an operation from a user, the control method comprising:

detecting the predetermined event regarding the operation of the information processing apparatus, the predetermined event being different from an operation event corresponding to an operation to the operation panel;

arranging a predetermined operation object dynamically on a screen of the operation panel in response to occurrence of the predetermined event; and recording history information about a user operation to the operation panel received in response to the predetermined operation object being dynamically arranged on the screen of the operation panel, the history information about the user operation to the operation panel being recorded in association with information about the predetermined event that differs from the operation event corresponding to the operation to the operation panel.

20. A non-transitory computer-readable storage medium storing a control program causing a computer to execute a control method for an information processing apparatus provided with an operation panel that has a display function of a user interface that dynamically changes according to a predetermined event regarding an operation of the information processing apparatus and accepts an operation from a user, the control method comprising:

detecting the predetermined event regarding the operation of the information processing apparatus, the predetermined event being different from an operation event corresponding to an operation to the operation panel;

arranging a predetermined operation object dynamically on a screen of the operation panel in response to occurrence of the predetermined event; and recording history information about a user operation to the operation panel received in response to the predetermined operation object being dynamically arranged on the screen of the operation panel, the history information about the user operation to the operation panel being recorded in association with information about the predetermined event that differs from the operation event corresponding to the operation to the operation panel.

21. A non-transitory computer-readable storage medium according to claim 20, wherein the predetermined event is at least one of placement of a sheet on an auto document feeder of the information processing apparatus and inputting a print job, a screen displayed on the operation panel dynamically changes in accordance with the detection of the predetermined event, and recorded history information is extractable from log information of the information processing apparatus.

* * * * *